US008055563B2

(12) United States Patent
Horowitz

(10) Patent No.: US 8,055,563 B2
(45) Date of Patent: *Nov. 8, 2011

(54) FINANCIAL ACTIVITY BASED ON NATURAL WEATHER EVENTS

(75) Inventor: Kenneth A. Horowitz, Palm Beach, FL (US)

(73) Assignee: Weather Risk Solutions, LLC, Palm Beach, FL (US)

(*) Notice: Subject to any disclaimer, the term of this patent is extended or adjusted under 35 U.S.C. 154(b) by 193 days.

This patent is subject to a terminal disclaimer.

(21) Appl. No.: 12/460,334

(22) Filed: Jul. 17, 2009

(65) Prior Publication Data

US 2009/0287612 A1    Nov. 19, 2009

Related U.S. Application Data

(63) Continuation of application No. 11/312,783, filed on Dec. 20, 2005, now Pat. No. 7,584,133.

(60) Provisional application No. 60/637,784, filed on Dec. 21, 2004.

(51) Int. Cl.
*G06Q 40/00*    (2006.01)

(52) U.S. Cl. ............................................. 705/35; 705/36

(58) Field of Classification Search ................ 705/35–45
See application file for complete search history.

(56) References Cited

U.S. PATENT DOCUMENTS

| | | | |
|---|---|---|---|
| 3,573,747 A | 4/1971 | Adams |
| 3,874,584 A | 4/1975 | Foley |
| 4,235,001 A | 11/1980 | Matino |
| 4,323,770 A | 4/1982 | Dieulot et al. |
| 4,334,270 A | 6/1982 | Towers |
| 4,346,442 A | 8/1982 | Musmanno |
| 4,376,978 A | 3/1983 | Musmanno |
| 4,412,287 A | 10/1983 | Braddock, III |
| 4,554,418 A | 11/1985 | Toy |
| 4,566,066 A | 1/1986 | Towers |
| 4,674,044 A | 6/1987 | Kalmus et al. |
| 4,722,055 A | 1/1988 | Roberts |
| 4,739,478 A | 4/1988 | Roberts et al. |
| 4,751,640 A | 6/1988 | Lucas et al. |

(Continued)

FOREIGN PATENT DOCUMENTS

EP    0752135    9/1995

(Continued)

OTHER PUBLICATIONS

"Dynamic Hedging Strategies"; Simon Benninga and Zvi Wiener; vol. 7 No. 1 (1998); 5 pp.

(Continued)

*Primary Examiner* — Rajesh Khattar
(74) *Attorney, Agent, or Firm* — Hughes Socol Piers Resnick & Dym, Ltd.; Michael A. Hierl

(57) ABSTRACT

A financial activity network includes a central managing system connected to a plurality of participant terminals. Rules governing operation of the financial activity are stored for future reference. A participant provides investment information such as a map location for the predicted strike by the natural event and, optionally, one or more secondary parameters relating to the natural event, such as the time interval between the time of investment and the time of all event strike and/or the severity of the event strike according to an established scale. In one example, an external objective independent information source is consulted, with the external objective independent information source providing monitoring, interpretation and derived determination of parameters pertaining to the natural event. Methods and articles of manufacture are also disclosed.

11 Claims, 22 Drawing Sheets

U.S. PATENT DOCUMENTS

| | | |
|---|---|---|
| 4,752,877 A | 6/1988 | Roberts et al. |
| 4,766,539 A | 8/1988 | Fox |
| 4,823,264 A | 4/1989 | Deming |
| 4,823,265 A | 4/1989 | Nelson |
| 4,831,526 A | 5/1989 | Luchs et al. |
| 4,839,804 A | 6/1989 | Roberts et al. |
| 4,842,278 A | 6/1989 | Markowicz |
| 4,903,201 A | 2/1990 | Wagner |
| 4,933,842 A | 6/1990 | Durbin et al. |
| 4,953,085 A | 8/1990 | Atkins |
| 4,975,840 A | 12/1990 | DeTore et al. |
| 4,980,826 A | 12/1990 | Wagner |
| 5,077,665 A | 12/1991 | Silverman et al. |
| 5,101,353 A | 3/1992 | Lupien et al. |
| 5,126,936 A | 6/1992 | Champion et al. |
| 5,136,501 A | 8/1992 | Silverman et al. |
| 5,148,365 A | 9/1992 | Dembo |
| 5,220,500 A | 6/1993 | Baird et al. |
| 5,275,400 A | 1/1994 | Weingardt et al. |
| 5,444,819 A | 8/1995 | Negishi |
| 5,491,629 A | 2/1996 | Fox et al. |
| 5,519,605 A | 5/1996 | Cawlfield |
| 5,568,378 A | 10/1996 | Wojsznis |
| 5,608,620 A | 3/1997 | Lundgren |
| 5,663,547 A | 9/1997 | Ziarno |
| 5,665,952 A | 9/1997 | Ziarno |
| 5,671,363 A | 9/1997 | Cristofich et al. |
| 5,689,649 A | 11/1997 | Altman et al. |
| 5,689,650 A | 11/1997 | McClelland et al. |
| 5,689,799 A | 11/1997 | Dougherty et al. |
| 5,696,366 A | 12/1997 | Ziarno |
| 5,712,985 A | 1/1998 | Lee et al. |
| 5,717,989 A | 2/1998 | Tozzoli et al. |
| 5,732,400 A | 3/1998 | Mandler et al. |
| 5,745,383 A | 4/1998 | Barber |
| 5,749,785 A | 5/1998 | Rossides |
| 5,794,207 A | 8/1998 | Walker et al. |
| 5,796,932 A | 8/1998 | Fox et al. |
| 5,802,500 A | 9/1998 | Ryan et al. |
| 5,806,048 A | 9/1998 | Kiron et al. |
| 5,819,238 A | 10/1998 | Fernholz |
| 5,830,068 A | 11/1998 | Brenner et al. |
| 5,830,069 A | 11/1998 | Soltesz et al. |
| 5,832,456 A | 11/1998 | Fox et al. |
| 5,845,266 A | 12/1998 | Lupien et al. |
| 5,848,396 A | 12/1998 | Gerace |
| 5,855,514 A | 1/1999 | Kamille |
| 5,873,782 A | 2/1999 | Hall |
| 5,878,141 A | 3/1999 | Daly et al. |
| 5,911,136 A | 6/1999 | Atkins |
| 5,926,800 A | 7/1999 | Baronowski et al. |
| 5,931,467 A | 8/1999 | Kamille |
| 5,946,666 A | 8/1999 | Nevo et al. |
| 5,953,707 A | 9/1999 | Huang et al. |
| 5,970,479 A | 10/1999 | Shepherd |
| 5,987,433 A | 11/1999 | Crapo |
| 5,991,735 A | 11/1999 | Gerace |
| 6,015,345 A | 1/2000 | Kail |
| 6,024,641 A | 2/2000 | Sarno |
| 6,026,364 A | 2/2000 | Whitworth |
| 6,064,985 A | 5/2000 | Anderson |
| 6,078,901 A | 6/2000 | Ching |
| 6,078,904 A | 6/2000 | Rebane |
| 6,078,905 A | 6/2000 | Pich-Le Winter |
| 6,085,174 A | 7/2000 | Edelman |
| 6,085,175 A | 7/2000 | Gugel et al. |
| 6,088,686 A | 7/2000 | Walker et al. |
| 6,089,981 A | 7/2000 | Brenner et al. |
| 6,099,409 A | 8/2000 | Brenner et al. |
| 6,105,005 A | 8/2000 | Fuhrer |
| 6,134,536 A | 10/2000 | Shepherd |
| 6,135,884 A | 10/2000 | Hedrick et al. |
| 6,151,588 A | 11/2000 | Tozzoli et al. |
| 6,167,378 A | 12/2000 | Webber, Jr. |
| 6,224,486 B1 | 5/2001 | Walker et al. |
| 6,229,810 B1 | 5/2001 | Gerszberg et al. |
| 6,236,972 B1 | 5/2001 | Shkedy |
| 6,236,973 B1 | 5/2001 | Dillard |
| 6,236,977 B1 | 5/2001 | Verba et al. |
| 6,269,101 B1 | 7/2001 | Gerszberg et al. |
| 6,269,343 B1 | 7/2001 | Pallakoff |
| 6,278,983 B1 | 8/2001 | Ball |
| 6,292,787 B1 | 9/2001 | Scott et al. |
| 6,315,666 B1 | 11/2001 | Mastera et al. |
| 6,317,726 B1 | 11/2001 | O'Shaughnessy |
| 6,317,727 B1 | 11/2001 | May |
| 6,319,122 B1 | 11/2001 | Packes, Jr. et al. |
| 6,321,212 B1 | 11/2001 | Lange |
| 6,330,551 B1 | 12/2001 | Burchetta et al. |
| 6,336,103 B1 | 1/2002 | Baker |
| 6,336,105 B1 | 1/2002 | Conklin et al. |
| 6,345,239 B1 | 2/2002 | Bowman-Amuah |
| 6,363,525 B1 | 3/2002 | Dougherty et al. |
| 6,368,216 B1 | 4/2002 | Hedrick et al. |
| 6,370,516 B1 | 4/2002 | Reese |
| 6,375,571 B1 | 4/2002 | Ohnuma et al. |
| 6,405,179 B1 | 6/2002 | Rebane |
| 6,415,267 B1 | 7/2002 | Hagan |
| 6,421,653 B1 | 7/2002 | May |
| 6,427,132 B1 | 7/2002 | Bowman-Amuah |
| 6,430,542 B1 | 8/2002 | Moran |
| 6,453,687 B2 | 9/2002 | Sharod et al. |
| 6,460,029 B1 | 10/2002 | Fries et al. |
| 6,470,321 B1 | 10/2002 | Cumming et al. |
| 6,508,710 B1 | 1/2003 | Paravia et al. |
| 6,513,031 B1 | 1/2003 | Fries et al. |
| 6,527,172 B1 | 3/2003 | Lewis et al. |
| 6,527,270 B2 | 3/2003 | Maksymec et al. |
| 6,546,375 B1 | 4/2003 | Pang et al. |
| 6,554,708 B1 | 4/2003 | Brenner et al. |
| 6,554,709 B1 | 4/2003 | Brenner et al. |
| 6,560,580 B1 | 5/2003 | Fraser et al. |
| 6,591,232 B1 | 7/2003 | Kassapoglou |
| 6,601,059 B1 | 7/2003 | Fries |
| 6,625,582 B2 | 9/2003 | Richman et al. |
| 6,662,195 B1 | 12/2003 | Langseth et al. |
| 6,666,769 B2 | 12/2003 | Stronach |
| 6,671,715 B1 | 12/2003 | Langseth et al. |
| 6,717,943 B1 | 4/2004 | Schwering |
| 6,722,980 B2 | 4/2004 | Stronach |
| 6,738,738 B2 | 5/2004 | Henton |
| 6,741,980 B1 | 5/2004 | Langseth et al. |
| 6,751,606 B1 | 6/2004 | Fries et al. |
| 6,754,639 B2 | 6/2004 | Ginsberg |
| 6,836,537 B1 | 12/2004 | Zirngibl et al. |
| 6,850,907 B2 | 2/2005 | Lutnick et al. |
| 6,856,973 B1 | 2/2005 | Bott |
| 6,904,412 B1 | 6/2005 | Broadbent et al. |
| 6,912,510 B1 | 6/2005 | Shepherd |
| 6,963,853 B1 | 11/2005 | Smith |
| 7,006,991 B2 | 2/2006 | Keiser et al. |
| D519,570 S | 4/2006 | Amaitis et al. |
| 7,069,232 B1 | 6/2006 | Fox et al. |
| 7,144,011 B2 | 12/2006 | Asher et al. |
| 7,233,922 B2 | 6/2007 | Asher et al. |
| 2001/0014875 A1 | 8/2001 | Young et al. |
| 2001/0021911 A1 | 9/2001 | Ohmoto et al. |
| 2001/0037282 A1 | 11/2001 | Yoneda |
| 2001/0037287 A1 | 11/2001 | Broadbent et al. |
| 2001/0044767 A1 | 11/2001 | Madoff et al. |
| 2001/0047326 A1 | 11/2001 | Broadbent et al. |
| 2001/0056396 A1 | 12/2001 | Goino |
| 2002/0032644 A1 | 3/2002 | Corby et al. |
| 2002/0032646 A1 | 3/2002 | Sweeney et al. |
| 2002/0040339 A1 | 4/2002 | Dhar et al. |
| 2002/0046137 A1 | 4/2002 | Odom et al. |
| 2002/0046144 A1 | 4/2002 | Graff |
| 2002/0069155 A1 | 6/2002 | Nafeh et al. |
| 2002/0073021 A1 | 6/2002 | Ginsberg et al. |
| 2002/0120558 A1 | 8/2002 | Reid |
| 2002/0130899 A1 | 9/2002 | Ryan et al. |
| 2002/0138390 A1 | 9/2002 | May |
| 2002/0138413 A1 | 9/2002 | Creamer et al. |
| 2002/0138417 A1 | 9/2002 | Lawrence |
| 2002/0147670 A1 | 10/2002 | Lange |
| 2002/0161681 A1 | 10/2002 | Richman et al. |
| 2003/0009419 A1 | 1/2003 | Chavez et al. |

| | | |
|---|---|---|
| 2003/0023534 A1 | 1/2003 | Kadambe |
| 2003/0023546 A1 | 1/2003 | Shepherd |
| 2003/0078869 A1 | 4/2003 | Williams |
| 2003/0087701 A1 | 5/2003 | Paravia et al. |
| 2003/0088532 A1 | 5/2003 | Hampshire, II |
| 2003/0120426 A1 | 6/2003 | Baron et al. |
| 2003/0126059 A1 | 7/2003 | Hensley et al. |
| 2003/0126073 A1 | 7/2003 | Lawrence |
| 2003/0135441 A1 | 7/2003 | Ginsberg |
| 2003/0149657 A1 | 8/2003 | Reynolds et al. |
| 2003/0177083 A1 | 9/2003 | Mont et al. |
| 2003/0177087 A1 | 9/2003 | Lawrence |
| 2003/0191707 A1 | 10/2003 | Shepherd |
| 2003/0195841 A1 | 10/2003 | Ginsberg et al. |
| 2003/0208429 A1 | 11/2003 | Bennett |
| 2003/0225687 A1 | 12/2003 | Lawrence |
| 2003/0236738 A1 | 12/2003 | Lange et al. |
| 2003/0236742 A1 | 12/2003 | Lawrence |
| 2004/0006528 A1 | 1/2004 | Fung |
| 2004/0006532 A1 | 1/2004 | Lawrence et al. |
| 2004/0006533 A1 | 1/2004 | Lawrence |
| 2004/0019557 A1 | 1/2004 | Yaruss et al. |
| 2004/0024693 A1 | 2/2004 | Lawrence |
| 2004/0024694 A1 | 2/2004 | Lawrence et al. |
| 2004/0044617 A1 | 3/2004 | Lu |
| 2004/0048656 A1 | 3/2004 | Krynicky |
| 2004/0059627 A1 | 3/2004 | Baseman et al. |
| 2004/0064402 A1 | 4/2004 | Dreyer et al. |
| 2004/0073505 A1 | 4/2004 | Wright |
| 2004/0078321 A1 | 4/2004 | Lawrence |
| 2004/0083158 A1 | 4/2004 | Addison et al. |
| 2004/0083165 A1 | 4/2004 | Lawrence |
| 2004/0103003 A1 | 5/2004 | Mayers et al. |
| 2004/0103058 A1 | 5/2004 | Hamilton |
| 2004/0109031 A1 | 6/2004 | Deaton et al. |
| 2004/0111358 A1 | 6/2004 | Lange et al. |
| 2004/0133502 A1 | 7/2004 | Sadre |
| 2004/0133508 A1 | 7/2004 | Lawrence |
| 2004/0148243 A1 | 7/2004 | Rosenblatt |
| 2004/0167850 A1 | 8/2004 | Dreyer et al. |
| 2004/0204232 A1 | 10/2004 | Asher et al. |
| 2004/0210507 A1 | 10/2004 | Asher et al. |
| 2004/0215551 A1 | 10/2004 | Eder |
| 2004/0230521 A1 | 11/2004 | Broadbent et al. |
| 2004/0235542 A1 | 11/2004 | Stronach et al. |
| 2004/0236659 A1 | 11/2004 | Cazalet et al. |
| 2004/0236676 A1 | 11/2004 | Takezawa et al. |
| 2004/0267660 A1 | 12/2004 | Greenwood et al. |
| 2005/0004862 A1 | 1/2005 | Kirkland et al. |
| 2005/0027643 A1 | 2/2005 | Amaitis et al. |
| 2005/0027645 A1 | 2/2005 | Lui et al. |
| 2005/0027649 A1 | 2/2005 | Cech |
| 2005/0043078 A1 | 2/2005 | Sundstrom |
| 2005/0044029 A1 | 2/2005 | Griffin et al. |
| 2005/0044037 A1 | 2/2005 | Lawrence et al. |
| 2005/0049956 A1 | 3/2005 | Ballman |
| 2005/0049962 A1 | 3/2005 | Porter et al. |
| 2005/0055306 A1 | 3/2005 | Miller et al. |
| 2005/0055308 A1 | 3/2005 | Meyer et al. |
| 2005/0071266 A1 | 3/2005 | Eder |
| 2005/0075963 A1 | 4/2005 | Balabon |
| 2005/0080702 A1 | 4/2005 | Modi |
| 2005/0086143 A1 | 4/2005 | Vlazny et al. |
| 2005/0096124 A1 | 5/2005 | Stronach |
| 2005/0108148 A1 | 5/2005 | Carlson |
| 2005/0131789 A1 | 6/2005 | Mintz |
| 2005/0139661 A1 | 6/2005 | Eglen et al. |
| 2005/0144114 A1 | 6/2005 | Ruggieri et al. |
| 2005/0149458 A1 | 7/2005 | Eglen et al. |
| 2005/0160032 A1 | 7/2005 | Lutnick et al. |
| 2005/0171878 A1 | 8/2005 | Pennock |
| 2005/0176495 A1 | 8/2005 | Stronach |
| 2005/0176499 A1 | 8/2005 | Stronach |
| 2005/0181868 A1 | 8/2005 | Vlazny et al. |
| 2005/0182704 A1 | 8/2005 | Winbom |
| 2005/0187020 A1 | 8/2005 | Amaitis et al. |
| 2005/0187850 A1 | 8/2005 | Horowitz et al. |
| 2005/0197190 A1 | 9/2005 | Amaitis et al. |
| 2005/0202873 A1 | 9/2005 | Asher et al. |
| 2005/0245305 A1 | 11/2005 | Asher et al. |
| 2005/0245306 A1 | 11/2005 | Asher et al. |
| 2005/0245308 A1 | 11/2005 | Amaitis et al. |
| 2005/0245310 A1 | 11/2005 | Amaitis et al. |
| 2005/0267836 A1 | 12/2005 | Crosthwaite et al. |
| 2005/0288081 A1 | 12/2005 | Amaitis et al. |
| 2006/0085286 A1 | 4/2006 | Lutnick et al. |
| 2006/0085310 A1 | 4/2006 | Mylet et al. |
| 2006/0100951 A1 | 5/2006 | Mylet et al. |
| 2006/0105839 A1 | 5/2006 | Graeve et al. |
| 2006/0105840 A1 | 5/2006 | Graeve |
| 2006/0111951 A1 | 5/2006 | Jain |
| 2006/0116917 A1 | 6/2006 | Jain |
| 2006/0173774 A1 | 8/2006 | Frankel |
| 2006/0199631 A1 | 9/2006 | McGill et al. |
| 2006/0240891 A1 | 10/2006 | Klinkhammer et al. |
| 2006/0264253 A1 | 11/2006 | Trobia |
| 2006/0265313 A1 | 11/2006 | Fung et al. |
| 2006/0271475 A1 | 11/2006 | Brumfield et al. |
| 2007/0005481 A1 | 1/2007 | Kedia et al. |
| 2007/0011619 A1 | 1/2007 | Chang et al. |
| 2007/0016861 A1 | 1/2007 | Salomaa et al. |
| 2007/0021165 A1 | 1/2007 | Ma et al. |
| 2007/0083458 A1 | 4/2007 | Rosenthal et al. |
| 2007/0185653 A1 | 8/2007 | Bresch et al. |

FOREIGN PATENT DOCUMENTS

| | | |
|---|---|---|
| EP | 0789884 | 4/1996 |
| EP | 0770967 A2 | 2/1997 |
| EP | 1345145 A2 | 9/2003 |
| KR | 1020080049126 A | 11/2006 |
| NL | 1002790 | 4/1996 |
| WO | WO 94/18640 | 8/1994 |
| WO | WO 95/19614 | 7/1995 |
| WO | WO 95/22883 | 8/1995 |
| WO | WO 95/26005 | 9/1995 |
| WO | WO 96/12242 | 4/1996 |
| WO | WO 96/21192 | 7/1996 |
| WO | WO 97/22073 | 6/1997 |
| WO | WO 98/13776 | 4/1998 |
| WO | WO 99/09500 | 2/1999 |
| WO | WO 99/10815 | 3/1999 |
| WO | WO 99/19821 | 4/1999 |
| WO | WO 99/23592 | 5/1999 |
| WO | WO 99/24928 | 5/1999 |
| WO | WO 99/30261 | 6/1999 |
| WO | WO 99/31613 | 6/1999 |
| WO | WO 99/46720 | 9/1999 |
| WO | WO 99/56232 | 11/1999 |
| WO | WO 00/11570 | 3/2000 |
| WO | WO 00/17795 | 3/2000 |
| WO | WO 00/21013 | 4/2000 |
| WO | WO 00/29923 | 5/2000 |
| WO | WO 00/29973 | 5/2000 |
| WO | WO 00/58858 | 10/2000 |
| WO | WO 01/25987 A1 | 4/2001 |
| WO | WO 01/67308 A1 | 9/2001 |
| WO | WO 2004/021120 A2 | 3/2004 |
| WO | WO 2004/068286 A2 | 8/2004 |
| WO | WO 2004/075028 A2 | 9/2004 |
| WO | WO 2004/090662 A2 | 10/2004 |
| WO | WO 2005/039712 A2 | 5/2005 |
| WO | WO 2005/057339 A2 | 6/2005 |
| WO | WO 2005/074557 A2 | 8/2005 |
| WO | WO 2005/109281 A2 | 11/2005 |
| WO | WO 2006/055035 A1 | 5/2006 |
| WO | WO 2006/099382 A2 | 9/2006 |
| WO | WO 2006/115534 A2 | 11/2006 |
| WO | WO 2006/130624 A2 | 12/2006 |
| WO | WO 2007/008597 A2 | 1/2007 |
| WO | WO 2007/008601 A2 | 1/2007 |
| WO | WO 2007/008713 A2 | 1/2007 |
| WO | WO 2007/015921 A2 | 2/2007 |
| WO | WO 2007/024605 A2 | 3/2007 |
| WO | WO 2007/033198 A2 | 3/2007 |

OTHER PUBLICATIONS

"Measuring Up: What CEOs Look for in Their Chief Financial Officers"; Mintz, S L, author; Feb. 1994; pp. 1-5.

"River Runs Dry: Big Hong Kong Property Deal Falls Through"; Jonathan Karp, author; Nov. 12, 1992; pp. 1-2.

"Japanese Investment Posts Strong Momentum"; Sun Hong, author; Feb. 1997; pp. 1-2.

"Lack of Debt Trades Stunts Market-HSBC" Business World, Manila; Sep. 1998; pp. 1-2.

"Real Bonds, Real Time, Real Fast"; Tatiana D. Helenius, author; Wall Street & Technology; Apr. 1998; pp. 1-4.

"On the Use of Martingales in Monte Carlo Approaches to Multiperiod Parameter Uncertainty in Capital Investment Risk Analysis"; W. J. Hurley, author; Jan. 1998; pp. 1-6.

"Financial Risk Analysis Using Financial Risk Simulation Prog"; Sabah U. Randhawa, James A. Douglas, authors; Sep. 1993; pp. 1-4.

"Constrained Moments Simulation of Healthcare Capital Acquisitions"; D. F. Kocaoglu et al., authors; Jan. 1997; pp. 1.

"A Statistical Model for Characterizing Price Variability with Application to Dairy Investment Analysis"; Terry Ross Smith, author; Jan. 1980; pp. 1-2.

"Transparency and Liquidity: A comparison of Auction and Dealer Markets with Informed Trading"; Marco Pagano and Ailsa Röell, authors; 1996; pp. 579-611.

"Trading Mechanisms in Securities Markets"; Ananth Madhavan, author; Journal of Finance; Jun. 1992; pp. 607-641.

"Call and Continuous Trading Mechanisms Under Asymmetric Information: An Experimental Investigation"; Charles R. Schnitzlein, author; Journal of Finance; Jun. 1996; pp. 613-636.

"Electronic Call Market Trading"; Nicholas Economides and Robert A. Schwartz, authors; Journal of Portfolio Management; Spring 1995; pp. 10-18.

"Parimutuel Betting Markets as Information Aggregation Devices: Experimental Results"; C. R. Plott, J. Wit, W.C. Yang, authors; Caltech Social Science Working Paper 986; Apr. 1997.

"A Parimutuel System with Two Horses and a Continuum of Bettors"; Watanabe Takahiro, author; Journal of Mathematical Economics 28; Apr. 1994; pp. 85-100.

"Trade Using One Commodity as a Means of Payment"; Lloyd Shapley and Martin Shubik, authors; Journal of Political Economy 85; 1997; pp. 937-968.

"Implied Risk-Neutral Probability Density Functions from Option Prices: Theory and Application"; Bhupinder Bahra, author; Bank of England; 1997; ISSN 1368-5562.

"Macro Markets and Financial Security"; Stefano Athanasoulis, Robert Shiller and Eric van Wincoop, authors; FRBNY Economic Policy Review; Apr. 1999; pp. 21-39.

"A Model of a General Parimutuel System: Characterizations and Equilibrium Selection"; Takahiro Watanabe, author; International Journal of Game Theory 23; 1994; pp. 237-260.

"Integrating Call and Continuous Markets"; Robert A. Schwartz, author; Securities Traders Monthly; Sep. 1991; pp. 14-16.

"Structural Organization of Secondary Markets: Clearing Frequency, Dealer Activity and Liquidity Risk"; Kenneth D. Garbade and William L. Silber, authors; Journal of Finance 34; Jun. 1979; pp. 577-593.

"Simulation of Hurricane Risk in the U.S. Using Empirical Track Model"; P.J. Vickery, P.F. Skerlj, and L.A. Twisdale, authors; Journal of Structural Engineering, Oct. 2000, pp. 1222-1237.

Notification; International Search Report for International Application No. PCT/US05/46467; Written Opinion of the International Searching Authority for International Application No. PCT/US05/46467 (8 pp.).

"Adaptive Control Using Multiple Models"; Kumpati S. Narendra, Jeyendran Balakrishnan, authors; IEEE Transactions on Automatic Control, vol. 42, No. 2, Feb. 1997; pp. 171-187.

"Controlled Diffusion Processes"; Vivek S. Borkar, author; Probability Surveys, vol. 2 (2005); pp. 213-244.

"Theory and Applications of Adaptive Control—A Survey"; K.J. Astrom, author; Automatica, vol. 19, No. 5, pp. 471-486, 1983.

UK Decision No. BL O/366/04 from the Patent Office, Dec. 14, 2004; Applicant: CFPH L.L.C.

Fig. 16b

Stormfund

STORMFUND
THE HURRICANE PROJECT

Home    Join the Fund    Login    Hurricane Learning Library    About the Fund    Help

LOGIN    REGISTER

September 25, 2004

Search for Shares « Return to Homepage

STEP 3
Purchase Your StormFund Shares!
Enter The Numer of shares you would like to purchase below. After confirmation, the StormFund Shares will be added to your Portfolio.

Quick Facts About Palm Beach County

[%] Annual Chance of a Hurricane Strike: 8.89%

[%] Current Strike Possiblity: 10.85%

FUND D
Total Invested InFund D
$1,791,815,645

Purchase your shares for Palm Beach County, FL in Fund D.

Current cost per shares for Palm Beach: $ 470.09

Participants have bought a total of 253.890 shares in this county. The total value in the fund is currently $18,319,945.

PALM BEACH COUNTY, FL  $470.09
CURRENT VALUE PER SHARE
400.00
300.00
200.00
100.00
0.00
Jan    Jun    Nov

CALCULATE PAYOFFS
IF THIS IS THE ONLY COUNTY HIT, your payout would be $7,057 per share A hurricane will usually strike more than one county. It is a good ideal to place bets on multiple counties to compound your gains and spread your risk around the map. Use the Payout Calculator to explore different combinations of share purchases.

Stormfund

» Launch the Payout Calculator

Purchase Now!

Current value for Palm Beach County (cost per share)
$ 470.09

Number of Shares: [          ] ▨
...or purchase by dollar amount:

Dollar Amount: $ [          ] ▨

FUND E
Total Invested in Fund E
$0

Purchase your shares for Palm Beach County, FL in Fund E.

Current cost per shares for Palm Beach: $ 162.20

Participants have bought a total of 0 shares in this county. The total value in the fund is currently $0.

CALCULATE PAYOFFS

IF THIS IS THE ONLY COUNTY HIT, your payout would be $0 per share

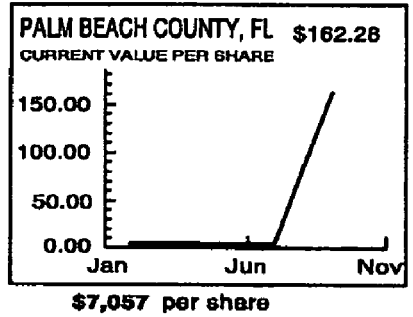

$7,057 per share

A hurricane will usually strike more than one county. It is a good ideal to place bets on multiple counties to compound your gains and spread your risk around the map. Use the Payout Calculator to explore different combinations of share purchases.

» Launch the Payout Calculator

Purchase Now!

Current value for Palm Beach County (cost per share)
$ 162.20

Number of Shares: [          ] ▨
...or purchase by dollar amount:

Dollar Amount: $ [          ] ▨

Table 1. Example illustrative share prices, in round numbers, for a range of strike probabilities $p_i$, assuming purchase on 1 June, with $F$ = $100/share.

| $p_i$ | Typical Example | Risk Assessment Stage | Round-number price |
|---|---|---|---|
| $10^{-7}$ | West Texas | I | $ 0.0002 |
| $10^{-4}$ | Northern Louisiana | I | $ 0.2 |
| 0.003 | Austin, TX | I | $ 5 |
| 0.01 | Central Louisiana | I | $ 20 |
| 0.02 | Florida Panhandle | I | $ 40 |
| 0.05 | South Florida | I | $ 100 |
| 0.1 | Weak possibility, existing storm | II | $ 200 |
| 0.2 | Moderate possibility, existing storm | II | $ 400 |
| 0.5 | Likely strike, within 5 days | III | $ 1300 |
| 0.8 | Very likely strike, within 5 days | III | $ 3000 |
| 0.9 | Imminent strike, within 5 days | III | $ 4300 |

Fig. 21

Table 2. Poisson probabilities for $\mu = 1.7$ hurricane landfalls per year, corresponding cumulative probabilities, and ratios of probabilities used in Equation (6).

| X | 0 | 1 | 2 | 3 | 4 | 5 |
|---|---|---|---|---|---|---|
| Pr{X=x} | .1827 | .3106 | .2640 | .1496 | .0636 | .0216 |
| Pr{X≥x} | .1827 | .4933 | .7573 | .9069 | .9705 | .9921 |
| Pr{X≥x}/(1−Pr{X=0}) | — | 1.0000 | .6200 | .2970 | .1139 | .0361 |

Fig. 22

Table 3. Tradeoffs involved in the choice of the number of lotteries to be run.

| Number of lotteries | % of years when 1 or more lotteries don't pay | % of years when more hurricanes occur than lotteries |
|---|---|---|
| 1 | 18% | 51% |
| 2 | 49% | 24% |
| 3 | 76% | 9% |
| 4 | 91% | 3% |
| 5 | 97% | 1% |

Fig. 23

FINANCIAL ACTIVITY BASED ON NATURAL WEATHER EVENTS

CROSS-REFERENCE TO RELATED APPLICATION

This application is a continuation of U.S. non-provisional patent application Ser. No. 11/312,783 filed Dec. 20, 2005 now U.S. Pat. No. 7,584,133 which claims the benefit of U.S. Provisional Patent Application No. 60/637,784, filed Dec. 21, 2004 all of which are incorporated by reference herein in their entirety.

BACKGROUND OF THE INVENTION

1. Field of the Invention

The present invention pertains to financial activities and in particular to such activities in which a financial return may be paid out based on a participant's prediction of naturally occurring tropical weather events, and especially such events monitored and documented by an independent external information source.

2. Description of the Related Art

Oftentimes, natural events such as hurricanes and other tropical weather systems contain sufficient energy to impose potentially significant financial burdens arising from damage to property. It is the nature of such catastrophes that they cannot be predicted with exact certainty, even in severity or number of occurrences within an event season or the exact time and/or duration of an event. These types of natural events include, for example, earthquakes, tornadoes and tropical cyclones, a term given to all circulating weather systems over tropical waters (and of special interest here, the Atlantic basin and eastern Pacific). Tropical cyclones include tropical weather systems referred to as "hurricanes" if they are sufficiently strong. Tropical cyclones which grow in intensity so as to become hurricanes originate at sea and may make landfall and travel along a land portion before dissipating or returning to the sea. Homeowners and business insurance policies typically contain deductible provisions ranging from 2% to 15% of the value of a home or worksite. Further, these same policies do not provide any coverage for the outside areas of a home or business such as landscaping, outside lighting, docks, fencing and the like. Often, property owners do not have sufficient flood insurance or have other omissions or insufficient coverage which result in catastrophic financial losses in even the lowest rated hurricanes. Great losses suffered by property owners, such as those located along coastal and outlying areas, can be overwhelming for those who cannot afford to be self-insured. Insurance companies offer substantial aid for these individuals, but economic strains caused by unusually active hurricane seasons have resulted in relatively high premiums. In order to make certain that insurance protection is available to individuals on an ongoing basis, various legislation and regulations have been enacted. However, substantial economic burdens remain, such as high deductible amounts, and excluded items, which represent damage costs which must be borne directly by the individual. Further, there are considerable delays in obtaining insurance relief, due to a number of factors outside of the owner's control, such as delays associated with adjuster scheduling, claim processing and governmental determinations. These delays are considerably extended when widescale damage occurs.

As if the present problems are not enough, it has been predicted that the increased storm activity of the past few years is likely to continue in the Atlantic basin for the next 15 to 20 years. One prediction for 2006 is that 17 named storms will occur, nine of which can become hurricanes and five of which are expected to develop into major storms, with winds of 111 mph or more. By comparison, in the year 2005, 26 named storms were reported. Of the 13 major storms that formed the past two years, seven struck the U.S., whereas, according to the historical average, only one of every three reported storms would be considered "major" storms.

In addition to increased weather severity, other factors have been cited as causes for unexpectedly large damage estimates. For example, it has been estimated that, by year 2020, a single Miami storm could cause catastrophic losses of 500 Billion—several times the damage inflicted by Hurricane Katrina. This is attributed to the rise in additional property development demanded by a growing population, along with a rise in purchasing power with greater individual wealth. These estimates have not included any consideration of inflation.

Other lessons are being learned from hurricane Katrina. For example, the Great Miami hurricane of 1926 caused about $760 million in damage, in 2004 dollars. Surprisingly, if the hurricane were to be repeated at the present time (the same magnitude following the same track) damage is estimated to be as large as $130 billion, due in large part to population expansion in the area. In the year 2020 damage estimates from the same hurricane are estimated to be as great as $500 billion. In addition to primary damage factors such as loss of property, other factors directly result from a natural event. For example, the Federal Emergency Management Agency (FEMA) has encountered significant difficulty in providing temporary housing for disaster victims. Loss of dwellings is aggravated by extensive loss of jobs, further slowing economic and personal recovery. For example, FEMA's hotel program for 2005 cost the federal government $325 million and, at its peak, covered approximately 85,000 rooms.

SUMMARY OF THE INVENTION

The invention is generally directed to conducting financial activities between a provider and a plurality of participants, based on a natural event such as a hurricane or tropical cyclone, or other tropical weather event.

Tropical cyclones are low-pressure weather systems that develop at sea and at low latitudes, beginning as relatively low-energy tropical depressions. As storm energy builds, tropical depressions begin to exhibit a rotating or circular weather pattern, and if the storm intensity is sufficient it is classified as a tropical cyclone. Tropical cyclones include "tropical storms," but the most intense tropical cyclones are referred to (depending on the ocean basin in which they occur) as "hurricanes," "typhoons," or simply "cyclones." According to the National Hurricane Center, "hurricane" is a name for a tropical cyclone that occurs in that oceanic area generally referred to as the Atlantic Basin, and which is defined by certain minimum wind speeds. "Tropical cyclone" is the generic term used for low-pressure systems of great intensity that develop in the tropics and meet a criterion for relatively high maximum sustained wind speeds. The intensity of hurricanes is measured according to the Saffir-Simpson scale.

In financial activities between a provider and a plurality of participants, the participants are given an opportunity to predict the future occurrence of the natural event, and to invest funds with the expectation of a return on their investment if their prediction should match the outcome of the natural event. For example, the financial activity may be based on the landfall or land track of a hurricane. Participants engaged in the financial activity submit their prediction as to the point of landfall and/or point along the land track of a future hurricane. If their prediction matches the observed natural event, the successful, qualifying investors will share in the accumulated pooling of investment funds. Preferably, the natural event is observed by an external objective independent information source whose observations, findings and conclusions are made available to the financial activity. The financial activity may take a variety of different forms including games of chance, games of skill, property value protection, derivative securities interests and secondary trading of financial assets by participants engaged in the financial activity.

The invention in one implementation encompasses a method directed to conducting a financial activity between a provider and a plurality of participants, based on a tropical weather event. First, a method is employed for obtaining the participants' prediction data of a predicted outcome of the tropical weather event. Next, a method is employed for obtaining the participants' investment funds, followed by a method for pooling the participants' investment funds in a common pool and a method for obtaining from an external independent information source, external information concerning the tropical weather event. A method is then employed for comparing the participants' prediction data to the external information to determine if a matching outcome exists, followed by a method for distributing funds from the pool to participants having a matching outcome.

The invention, in another implementation, is directed to a method for a participant to engage in financial activity including a plurality of other participants, conducted by a provider, based on a tropical weather event, wherein a method is employed for the participant to receive information pertaining to the tropical weather event. Next, a method is employed for the participant to provide prediction data and investment funds pertaining to the outcome of the tropical weather event, followed by a method for the participant to obtain an indication from the provider pertaining to a matching outcome of a comparison of the participants' prediction data to tropical weather event data from an external independent information source. Finally, a method is employed for the participant to receive funds from a common pool comprising, at least in part, the participant's investment funds.

In another implementation, the invention is directed to a system for conducting a financial activity based on a tropical weather event, comprising a financial activity module for facilitating financial activity between a provider and a plurality of participants, for receiving external tropical weather event information from an external independent information source and for providing financial activity information to the participants. A communication module is provided for communication between the financial activity module and an external independent information source for receiving the external tropical weather event information from the external independent information source, and the communication module further provides communication between the financial activity module and the participants, to receive prediction data from the participants pertaining to the tropical weather event. A comparing module is provided for comparing the participants' prediction data to the external tropical weather event information and for providing an indication of a matching outcome to the participants, and a distribution module for distributing funds from a common pool of funds collected from the participants, to participants having a matching outcome. If desired, various communication functions can be grouped into one or more communication units to perform one or more communication tasks.

In yet another implementation, the invention is directed to an article of manufacture including a machine readable medium for causing a computer system to conduct a financial activity between a provider and a plurality of participants, based on a tropical weather event. Included is a module for conducting financial activity between a provider and a plurality of participants, for receiving tropical weather event information from an external independent information source and for providing financial activity information to the participants. Also included is a module for conducting a communication activity communicating between the financial activity module and an external independent information source for receiving tropical weather event information from the external independent information source, and a module for conducting the communication activity to communicate between the financial activity module and the participants to receive prediction data from the participants, pertaining to the tropical weather event. A module is provided for comparing the participants' prediction data to the indication of the occurrence of the tropical weather event; along with a module for conducting the communication activity to further communicate between the financial activity module and the participants to provide to the participants an indication of a matching outcome based upon a matching outcome of the comparing step and to indicate to the participants having a protective outcome from the comparing step, the portion of funds to be paid from a common pool collected from the participants.

In one aspect, the present invention can be employed as a viable solution to the economic and financial devastation which affects citizens as well as governments and which is caused by naturally occurring catastrophes such as hurricanes. The present invention can be employed to offer an economic solution which does not use government or public funds and therefore does not require tax payer funding to replenish government reserves. In one aspect, the present invention can be employed to use only funds provided by private entities to augment governmental financial assistance for catastrophic occurrences.

BRIEF DESCRIPTION OF THE DRAWINGS

Features of exemplary implementations of the invention will become apparent from the description, the claims, and the accompanying drawings in which:

FIG. 21 is a table showing examples of illustrative share prices;

FIG. 22 is a table showing Poisson probabilities and other probabilities; and

FIG. 23 is a table illustrating trade-offs involved in choosing the number of financial activities to be run.

DETAILED DESCRIPTION OF THE PREFERRED EMBODIMENTS

Figure 1:
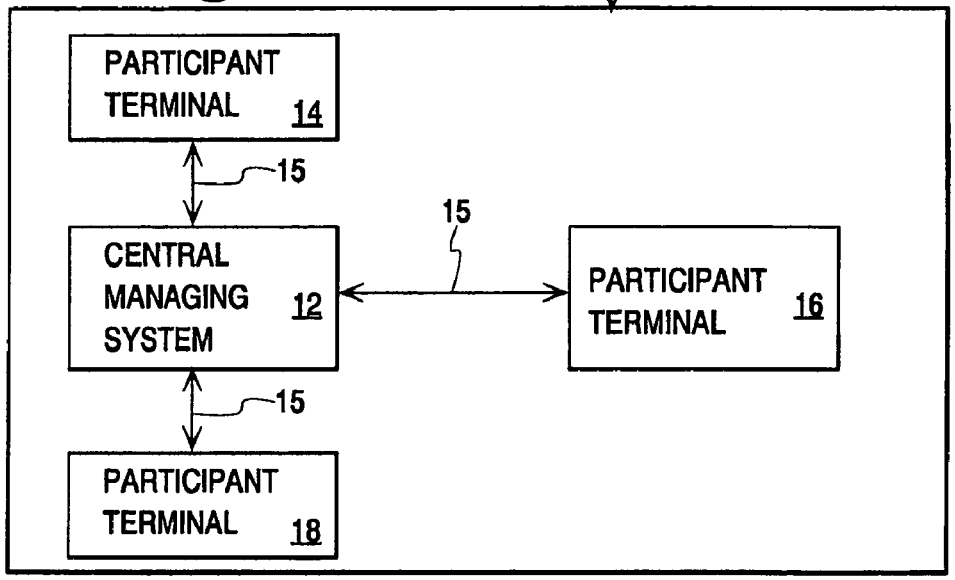
FIG. 1 is a schematic representation of a financial activity network implementing the present invention.

The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

For ease of description, financial activity networks and other systems, articles of manufacture, and apparatus embodying the present invention are described herein below in their usual assembled position as shown in the accompanying drawings and terms such as upper, lower, horizontal, longitudinal, etc., may be used herein with reference to this usual position. However, the systems, articles of manufacture and apparatus may be manufactured, transported, sold, or used in orientations other than that described and shown herein.

Introduction

On-line performances have been proposed for a variety of financial activities. These activities may be divided in a number of different ways such as gambling and non-gambling activities, for example. Gaming or gambling systems are in place which emulate traditional gambling activities in an on-line, internet software-based program, giving the users the look and feel of traditional gambling activities. Such gambling variants have been extended to nontraditional games of chance based on virtually any experience known to mankind. Although gaming activities can receive substantial benefit from implementations of the present invention, the present invention can also be employed with games of skill and non-gaming financial transactions.

In one instance, the present invention is concerned with financial activity based upon games of skill in which participants process historic and other data and apply scientific principles and acquired analytical skills to arrive at informed decisions relating to the predictions of future naturally occurring activities. In one instance, a participant makes an investment of funds based upon one or more informed decisions, thereby contributing to a common pool from which payouts are made, for example, based upon the accuracy, level of detail and timing of their prediction.

The present invention, in one instance, is also concerned with traditional financial activities which lie outside the area of gambling. More specifically, in one example, the present invention is concerned with allocating and managing a fund collected from participants, i.e. investors who seek to offset an unpredictable but nonetheless potentially catastrophic financial burden caused by property loss due to natural events. In one instance, these types of financial activities are based upon the participant's property interests. Although such financial investments do at times come with a substantial element of risk in the expectation and amount of return, it has long been recognized that such financial investments do not represent gambling activities.

The present invention finds immediate application in the field of offsetting losses of those who live or find themselves in a particular geographic area subjected to natural events which cause significant damage to their property interests (e.g. homes, businesses, rentals, and vacation shares). In one instance, the present invention is concerned with offsetting losses without governmental interaction. Examples of such natural events contemplated by the present invention, include naturally occurring phenomena without human causality, such as tropical weather systems such as hurricanes as well as other tropical weather events.

The premise of the financial activity is that investors can exercise personal initiative to research known naturally occurring activity and make certain predictions relating to forthcoming activity for a particular season or year. A return on their investment can be paid out at year's end or once a natural event has concluded, with the return being based upon certain factors such as the accuracy of their prediction, the amount of time between their investment and the occurrence of a natural event, and the skillful use of established laws of statistics and other resources available to an investor. Time and effort spent in researching natural activity can help to improve the accuracy of predictions made.

External Objective Information Sources

In one instance, the present invention incorporates conclusions, findings and reports of one or more external objective information sources such as an independent disinterested third party that provides publicly available information and conclusions. The terms "external" and "independent" refer to entities which are separate from the provider and/or participants of the financial activity. In one instance, an external objective information source provides information pertaining to a natural event (in one example an indication that a defined natural event has occurred, and in another example, that the defined natural event has concluded). In another instance, the external objective information source provides natural event data, such as a point of landfall or a land track of a storm originating at sea.

In one instance, the present invention incorporates into financial activities, independent objective information which is based upon naturally occurring events that are studied by the external objective information source (and which, in one instance, is publicly available). In one example, financial activities contemplated by the present invention are directed to predictions of natural event activity, with financial investments being made before the activity has occurred and/or concluded. Payouts or the assigning of points or other value according to a successful, matching outcome of the financial activity may be based upon multiple factors, some of which are determinable by an external objective information source. Examples include the measurable severity of the natural event, details concerning occurrence of the natural event (such as its points or path of terrestrial contact) and the timing of a participant's investment (such as the amount of lead time given by the investor prior to event conclusion).

In many instances, an external objective independent information source is relied upon for its expertise in studying, and measuring natural event phenomena as well as drawing conclusions from data collected from natural events. Oftentimes, reports made available to the public and others include inferences and conclusions drawn by an expert agency, which goes beyond a mere relating of observed facts. According to one aspect of the present invention, information which is key to carrying out a financial activity (such as the time and place of occurrence of the natural activity) is obtained from a source external to the provider of the financial activity.

As will be seen herein, it is generally preferred that the identity of the external objective information source is defined beforehand, in a rules database or in some other manner. In one instance, the external objective independent information source provides facts and conclusions which are made generally available to the public, or at least to individuals likely to participate in the financial activity. In this manner, individuals interested in participating in the financial activity and those participants already engaged in the financial activity can monitor progress of a natural event, independent of the financial activity. In one instance, the present invention contemplates that participants in the financial activity will be able to readily obtain expert information and skill-building technical intelligence from sources independent of the financial activity, thus enhancing motivation of the participants to engage in the financial activity with a greater likelihood of enjoying a successful outcome. Of particular interest here, are property owners unable to obtain adequate insurance, but who nonetheless live in an area known to be subject to destructive natural events. Such property owners will have an interest in gaining an ability to predict natural events, so as to be better able to protect their property interests and to offset unforeseen damages.

Examples of external objective independent information sources include the National Hurricane Center and the Tropical Prediction Center for hurricanes and other tropical storms.

Low-pressure tropical weather systems, or storms beginning at sea, start as relatively low energy thunderstorms. If a moving area of thunderstorms in the tropics maintains its identity for 24 hours or more, the weather system is termed a "tropical disturbance". If the weather system exhibits a rotating or circulating weather pattern, the weather system is referred to as a tropical cyclone. The lowest energy tropical cyclone is termed a "tropical depression" if its maximum sustained wind speed does not exceed 38 mph. For maximum sustained wind speeds ranging between 39 and 73 mph, the weather system is termed a "tropical storm". The most intense weather systems are referred to either as "hurricanes" or "typhoons".

According to the National Hurricane Center, "hurricane" is a name for a tropical cyclone that occurs in that oceanic area generally referred to as the Atlantic Basin or the eastern Pacific, and which is defined by maximum sustained wind speeds of 74 mph or more. "Tropical cyclone" is the generic term used for low-pressure systems exhibiting rotational characteristics that develop in the tropics and meet a criterion for relatively high maximum sustained wind speeds. The intensity of hurricanes is measured according to the Saffir-Simpson scale (categories 1 to 5).

It is well known that hurricanes and lesser storms develop from tropical depressions in the oceans where weather related factors cooperate to form and contribute energy to a low-pressure weather system. The weather system then travels across the ocean, along an unpredictable path. Of interest here are weather systems exhibiting circulating behavior which grow in intensity so as to develop into hurricanes which travel with a generally westward direction component and make landfall or otherwise contact property along well-defined geographical areas, such as the eastern coast of Canada, the United States, Mexico, and South America as well as sea islands lying in a path of travel toward those land bodies. The class of storms referred to as "hurricanes" vary in intensity and are generally free to travel along their own unique pathway or "track". Hurricanes are observed by independent expert agencies of the United States government, such as the National Hurricane Center (an example of an external objective information source), which carefully records, analyzes and later publishes reports, findings and conclusions, which are made available to the public.

Hurricanes are powered by the sea's thermal energy and by energy in the atmosphere. Generally speaking, hurricanes are directed by the easterly trade winds. Around the center, core or "eye," wind speeds accelerate to great velocities. Moving ashore, these energetic winds displace the ocean inwardly, toward land and are known to spawn tornadoes and produce torrential rains and floods. In the Atlantic Basin, for example, statistically there are 8.6 tropical storms for the years 1886-1998. Of these, 5.0, statistically, are hurricanes. The above illustrates aspects of natural events which may be employed in a rules database or program or other structure to govern operation of financial activity.

It is important to define early on those natural events which will qualify for consideration by the financial activity. For example, hurricanes considered by the financial activity may be limited to only those hurricanes which make terrestrial contact or which have a minimum strength. In another example, it is important to define natural events considered by the financial activity when the members of the public may have alternative definitions which vary from those to be considered by the financial activity. For example, participants who suffered damage during the time of a tropical cyclone may not fall within the "best-track" or other report issued by an external, independent, objective information source (such as NHC/TPC) (information employed according to one of the possible rules of operation). Contrary to popular expectations, a particular participant may suffer damage from natural phenomena lying outside of the tropical event of interest to the financial activity.

Examples of Financial Activity Models

The present invention contemplates that different types of financial activities will be carried out, typically between a financial activity provider and one or more participants in the financial activity. Different models of financial activities according to principles of the present invention are contemplated, including:

1. Lotteries or other games of chance, such as those activities monitored by state and local governments.

2. Games of skill, preferably where the participants are obliged to demonstrate a level of skill which pertains to the natural events of interest.

3. Property value protection, particularly financial activities in which the participants are screened for eligibility to engage in the financial activity, depending upon some indication of their property rights in a geographical area covered by the financial activity.

4. Derivative tradings type of financial activity, such as those activities directed to derivative securities interests, which are typically monitored by the Securities And Exchange Commission or other oversight bodies, such as the Commodity Futures Trading Commission (an independent agency of the United States government), the New York Stock Exchange, the Chicago Mercantile Exchange, the Iowa Electronic Market, and others.

5. Secondary trading of financial assets developed by a participant of one or more of the financial activities indicated above, particularly secondary trading between a participant of an ongoing financial activity and a third party wishing to deal directly with the participant, rather than the financial activity provider. The financial activity provider may require registration of the secondary trade or impose other controls over the parties involved, including assistance with executing the trade between two or more participants or nonparticipants, such as registration of the instruments traded.

6. Price-oriented competition, preferably in games of skill where participants are charged an "entry fee" to engage in skillful competition with other participants. The distribution or "prize" to qualifying participants is predetermined at the outset of competition, and accordingly is not affected by variability factors. However, if desired, the "entry fee" can be adjusted by variability factors such as those relating to the time interval between investment and event outcome, and the probability of a successful outcome determined approximately at the time of investment.

Financial Activity Network

Referring now to the drawings, and initially to FIGS. 1-4, financial activity system 100 in one instance, takes the form of a financial activity network generally indicated at 10. In one example, network 10 includes a central managing system 12 linked to a plurality of participant terminals 14-18. The terminals can comprise, for example, virtually any device that provides communication with a workstation such as a network or other computers including desktop, portable, lap-top or mainframe computers, data terminals, dumb terminals, personal digital assistants, cellular phones or other electronic devices having communications capabilities. The present invention contemplates that, throughout the description given herein, "computer" refers to a computer system comprising one or more computing devices.

As schematically indicated in FIG. 1, each of the participant terminals communicate directly with central managing system 12 via communication network components 15, allowing concurrent transactions and data transfers to occur. Other types of arrangements are possible. For example, communications between the central managing system and the participant terminals can employ virtually any communications technology known today. The geographical spacing between the central managing system and the participant terminals can have virtually any scale desired. For example, the entire network 10 can be located in a single room, or in a single building or building complex or campus.

As will be seen herein, financial activity can take place according to different models. One model is directed to a derivative tradings type of financial activity, such as those activities directed to derivative securities interests, In this type of financial activity, the central managing system 12 preferably comprises a brokerage system communicating with an exchange system. Preferably, participants' trading is conducted through the brokerage system before being conducted with the exchange. If desired, in this type of financial activity, the brokerage system can be omitted with participants dealing directly with the exchange system. If desired, the central managing system can either be incorporated into, or be provided in addition to, the exchange system.

Alternatively, the financial activity network 10 can be located at various nationwide or international locations, as may be desired. As a further alternative, the financial activity network may take on any form, and may employ wire, cable or wireless components, for example. Network 10 can be configured as an open connection or network such as the Internet network, a wide area network, a telephone network, a satellite network, an on-line network or a closed circuit television network or the like intra-facility network. Network 10 can also take the form of an Ethernet arrangement, a token ring, a token bus or any other suitable communications arrangement or configuration that can link workstations, particularly workstations including one or more data processing computers.

The present invention expressly contemplates that financial activity can, but need not necessarily, take place either within or across local, state, federal, national or international boundaries. For example, participant terminals can be located in one or more boundaries, e.g., political boundaries different from that of the central managing system. As a further example, although the central management system and the participant terminals are located within a given boundary, e.g., a given political boundary, the central management system may communicate with external objective, independent information sources, external credit agencies or other agencies located within one or more different political or geographic boundaries.

The terminals can comprise one of the many different types of electronic devices known today, including a programmable computer, a telephone, a stand-alone machine such as an ATM machine, a television or a set-top box unit, a credit card reader, a kiosk terminal, a point-of-purchase register, or a stand-alone unit resembling an arcade game, for example. The terminals preferably include an input device suitable for receiving a purchase request or other data from a participant, such as those employed by purchasers to obtain goods and/or services from a merchant. The input devices can take many forms, including a keypad, keyboard touch screen or mouse or a remote control device, contactless payment system, or fingerprint or other biometric system, for example. Systems, articles and apparatus contemplated by the present invention preferably comprise digital devices, but could also comprise analog or hybrid electronic or non-electronic devices, as may be desired.

System Apparatus

Figure 2:
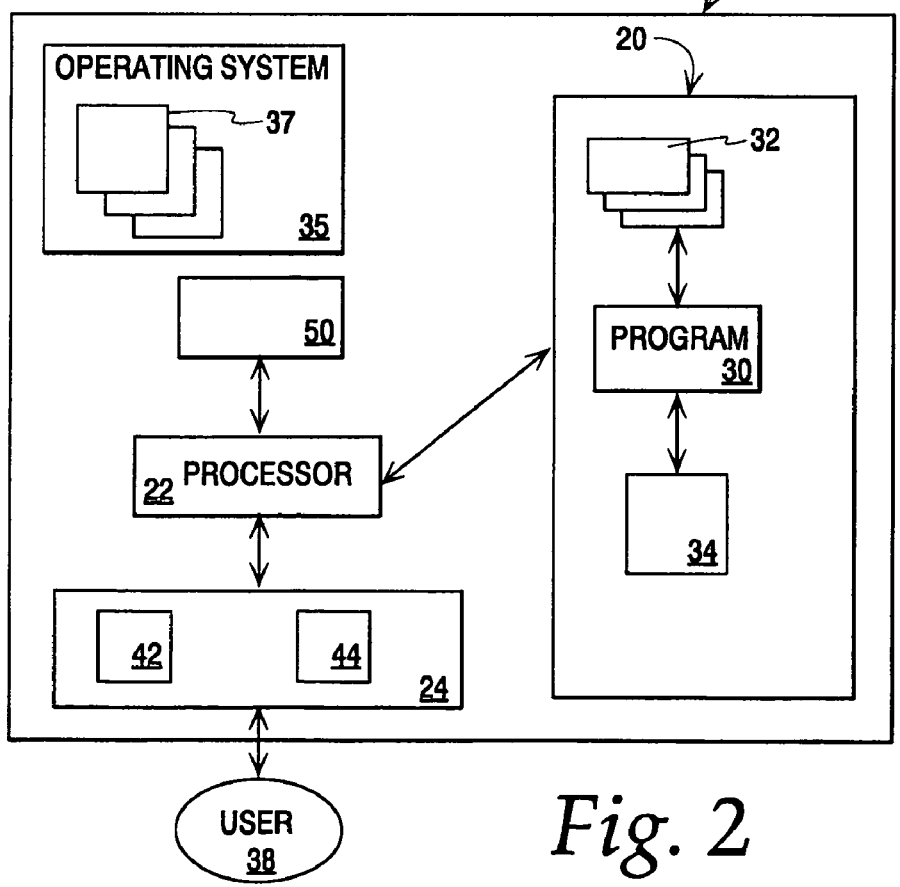
FIG. 2 is a schematic representation of a financial activity system implementing the present invention.

Turning to FIG. 2, financial activity system 100 includes system apparatus 13 embodying the central managing system 12 shown in FIG. 1. In one example, system apparatus 13 comprises one or more storage devices 20, one or more processors 22, and one or more interface components 24. The processor 22 in one example comprises a central processor unit ("CPU"). The processor 22 executes one or more instructions of one or more programs 30, under control of an operating system 35 employing one or more system programs 37. The program 30 in one example comprises one or more subroutines and one or more variables, as will be understood by those skilled in the art. The storage device 20 in one example comprises at least one instance of a recordable data storage medium, as described herein. The storage device 20 stores the program 30, and one or more databases 32, and one or more data files 34.

The interface component 24 in one instance comprises a graphical user interface ("GUI"). In one example, the interface component 24 allows a service provider or other user 38 to execute one or more programs 30. The program 30, in one example, comprises one or more subroutines, to carry out the financial activity methods and operations to be described herein. In one instance, program 30 includes one or more subroutines to collect, publish, interpret or otherwise process information which supports principles and other aspects of operation of the financial activity. In another instance, program 30 includes one or more subroutines for implementing rules of operation for the financial activity.

In another example, the interface component 24 allows the user 38 to verify or otherwise interact with one or more results of the program 30. In yet another example, the interface component 24 allows the user 38 to set one or more input values or operating parameters for the program 30. In the preferred embodiment illustrated in FIG. 2, interface component 24 includes a display device 42 and a data input device 44 which allow a user 38 to set up the central managing system according to desired operating objectives. With the interface component 24, a user can access, read or write to the program 30, the databases 32 and the data files 34

Included in the apparatus 13 embodying system 12 is a communication port 50 which provides two-way communication with the terminals 14-18. Communication port 50 can employ virtually any communications protocol, data format and other organizational, communication or other known content that is in use today. It is generally preferred that the communications network employed between the central managing system and the participant terminals comprise an interactive device taking any suitable form.

The financial activity system 100, in one example, comprises a plurality of components such as one or more of electronic components, hardware components, and computer software components. A number of such components can be combined or divided in the financial activity system 100. An exemplary component of the financial activity system 100 employs and/or comprises a set and/or series of computer instructions written in or implemented with any of a number of programming languages, as will be appreciated by those skilled in the art. The financial activity system 100 in one example comprises any (e.g., horizontal, oblique, or vertical) orientation, with the description and figures herein illustrating one exemplary orientation of the financial activity system 100, for explanatory purposes.

The financial activity system 100 in one example employs one or more machine (e.g. computer)-readable (hereinafter "computer-readable") signal-bearing media. The computer-readable signal-bearing media store software, firmware and/or assembly language for performing one or more portions of one or more embodiments of the invention. Examples of a computer-readable signal-bearing medium for the financial activity system 100 comprise a storage component such as the one or more storage devices 20. The computer-readable signal-bearing medium for the financial activity system 100 in one example can comprise one or more of a magnetic, electrical, optical, biological, and atomic data storage medium. For example, the computer-readable signal-bearing medium can comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the financial activity system 100, for instance, one or more of a telephone network, a local area network ("LAN"), a wide area network ("WAN"), the Internet, and a wireless network.

Data Structures

Figure 3:
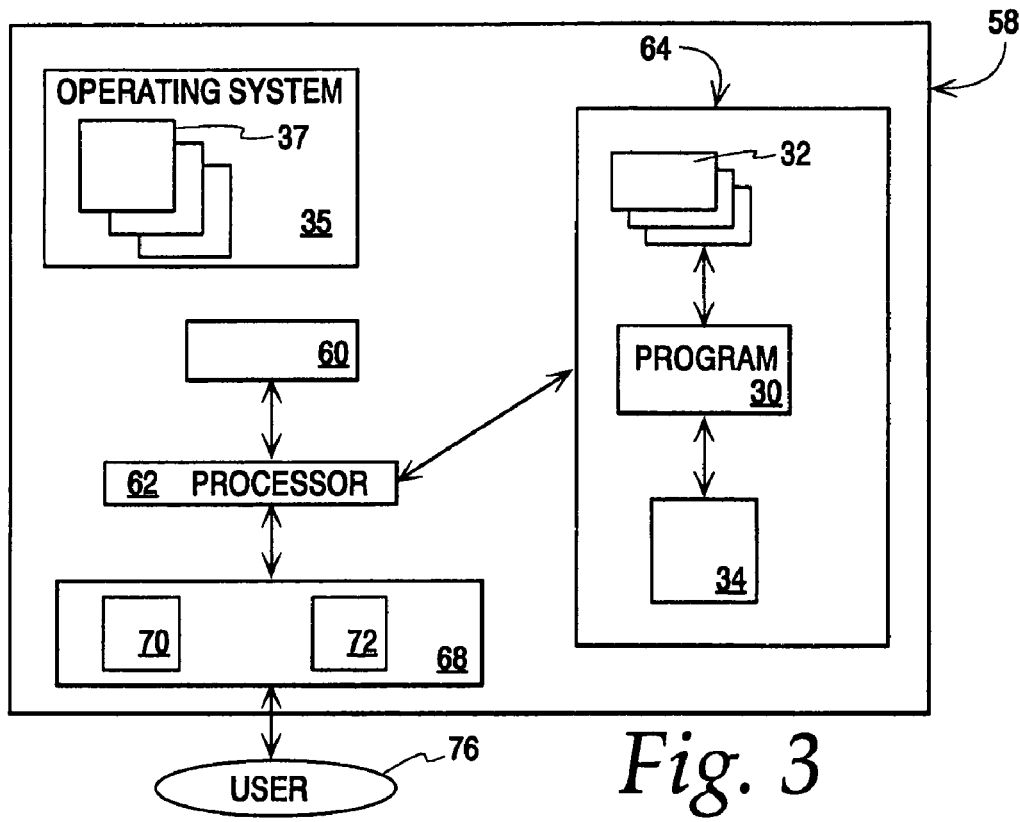
FIG. 3 is a schematic representation of a first participant terminal.
Figure 4:
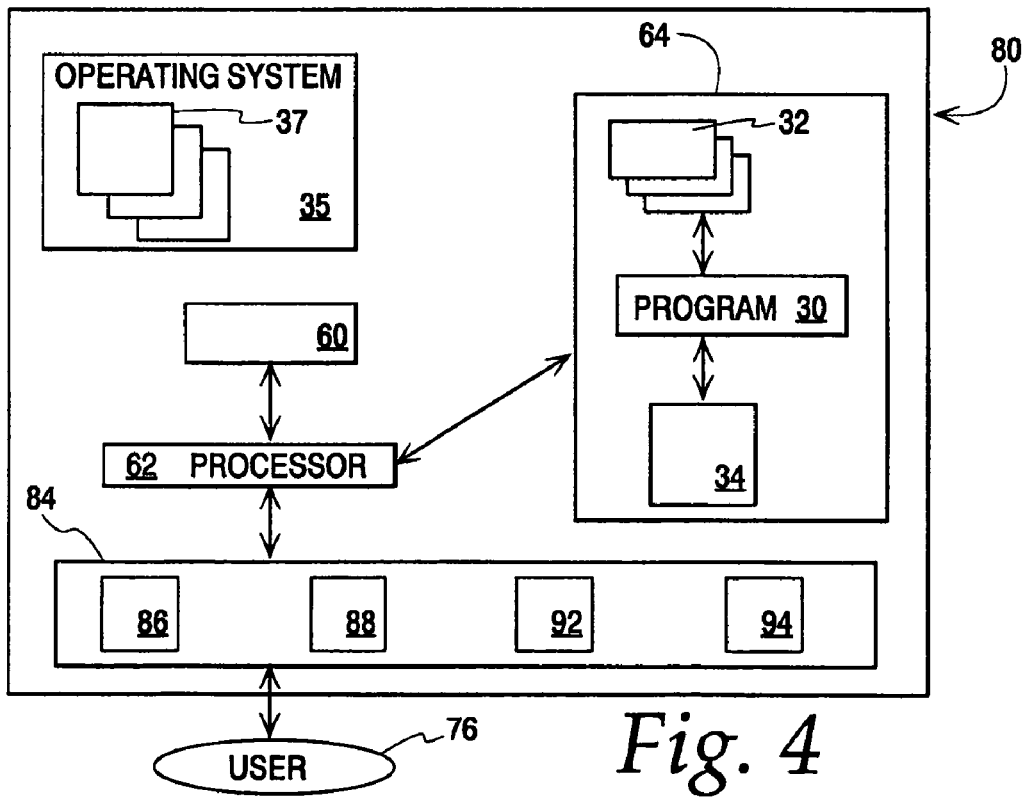
FIG. 4 is a schematic representation of a second participant terminal.

With reference to FIGS. 2-4, the databases 32 in one example comprise a participant database, an administrator or system database, a credit provider's database, a storm watch database, a rules database and a push database. The credit provider database contains a list of credit providers and their accepted methods of payment, as well as any credit related information of any type, such as authorization codes usually provided to merchants or the like to authorize transactions acceptable to a credit provider. The credit provider database may also contain other financial information associated with the credit provider, such as the credit provider's identification number and account information. In the preferred embodiment, the system administrator in one aspect, provides services similar to that of a merchant selling goods and/or services to participants. If desired, the system administrator can comprise a reseller of goods and services such as proprietary weather reports and cartographic or weather information, as well as maps, forms and other materials relating thereto.

The participant database maintains a list of participants and their associated personal financial information. The participant database stores a set of personal payment methods which are registered by the participant with a transaction processing service, which in the preferred embodiment, is engaged by the system administrator as an accommodation to the participant. The participant database further includes information regarding the eligibility of participants to participate in the financial activity. In the preferred embodiment, the system administrator employs a known screening service to enforce those rules set down pertaining to restrictions on participation. For example, the system administrator may choose to implement requests by government officials to curtail or otherwise limit transactions originating in or communicated to those areas subject to an evacuation order or one or more legal restrictions. Further details concerning an exemplary screening service is provided in U.S. Pat. No. 6,508,710, issued Jan. 21, 2003, the disclosure of which is hereby incorporated by reference in its entirety.

The storm watch database tracks storm activity of interest to participants. Included, for example, are circulating storm systems which have not yet matured into hurricanes, but which have the potential for doing so. If desired, historical data concerning previous storm systems may be made available to participants, either on an unrestricted basis or at additional cost to the participant.

The administrator database contains data and other information needed to operate the financial activity. Included, for example, are ongoing "real-time" or "moving" totals of the number of participants, the total of all funds invested, the number of other participants which share a participant's prediction choice, and the amount of funds invested by the other participants. If desired, the administrator database can also include real-time estimates of payout amounts corresponding to the participant's prediction choice, assuming that the choice proves to be accurate. The administrator database can also include a list of known users who are to be barred from participating or otherwise restricted in their participation activity. This information can be contained in a separate database, if desired. Also, the administrator database preferably contains participation statistics and financial statistics, useful in providing an updated estimate of the cost of doing business for operating the financial activity. If desired, adjustments to cover fluctuations in overhead costs can be made with regard to future participants.

The rules database contains rules or other principles of operation for the financial activity. The rules database contains a set of "rules" or principles which govern the ongoing financial activity, in a specific or in a general way (e.g. rules defining the authorities, or external objective independent information sources to be relied upon for a final, factual decision or conclusion). Examples of such authorities include expert governmental agencies responsible for monitoring natural events. The rules also include eligibility requirements, personal financial payment requirements, and sliding scales affecting payouts such as timing and deadlines.

The rules may be wholly or partially public (i.e. available to participants) or private (i.e. available only to those authorized by the system administrator). In one instance, the rules database also governs the course of conduct of specific aspects of the financial activity. For example, in one instance, the rules include definitions relating to the natural events to be considered by the financial activity, the external objective independent information source which manages information and determinations concerning a natural event which will be relied upon during the course of conducting the financial activity, parameters associated with the natural events, especially those parameters which are used to uniquely define each particular natural event as well as parameters for determining remuneration points or other value.

If desired, the points or other value pertaining to the participant's remuneration can be "hidden" or incorporated within a calculation, and need not be expressed in an explicit reference. In another instance, the rules database contains definitions of those participants eligible to engage in the financial activity, as well as those participants which qualify as finalists ("winners") eligible or who otherwise qualify for remuneration. In a further instance, the rules database contains principles of operation governing funds transfers between the financial activity and qualifying participants. The rules database may also govern access that a participant has to certain information concerning the financial activity, such as the number of individuals participating, the average or largest financial investments currently being made, and the raw total of funds currently collected for the event of interest.

In another instance, the rules database can include principles of operation relating to safety and public interest considerations. For example, the rules database can provide for automatic suspension of operation upon public announcement of an evacuation order or recommendations to prepare to evacuate a particular area. The rules database can provide for selective activity based upon the location of the participants. For example, suspension of financial activity can be limited only to those counties or other areas where government safety warnings have been issued, while allowing financial activity to continue for those areas not affected by the government warnings.

The push database contains information useful for generating interest and encouraging participant activity. For example, push data can include recent designations of officially recognized storm systems that may become candidates for future investment opportunities. Push data can also include brief analyses and/or statistics of ongoing or recent natural events. Different amounts of push data and different lists of push participants can be set up by a computer program according to pre-defined "trigger levels" such as storm location, intensity and speed, for example. The push database can also include rules of operation pertaining to push data, such as local times during which push data is or is not sent.

The data files comprise data information which, preferably, is relatively static, such as the official designations of natural events to be issued in an upcoming activity season, official and unofficial historical reporting of natural events activity, and statistics compiled from historical information, for example. This historical data can be combined with climatological probabilities to determine investment price and/or payouts. If desired, the data files can be replaced by one of the available databases, or a special database can be provided, if desired.

A land area database can contain geographic items such as maps and other data relevant to conducting a financial activity. For example, in the United States, maps can be provided for those states at risk to a hurricane strike. Preferably, the maps would be "clickable" to allow a participant to readily indicate the state of interest. In response, more detailed maps such as maps of the counties within the state would be displayed to the participant and again, would be clickable to provide ready indication of the participant's choices of predicted strike areas. If desired, this same functionality can be provided in table form or some other form convenient for user participation. In addition, a cross reference "finder" tool can be provided to receive Zipcode information or the like, and return with a colored or other visually distinctive area on the displayed map, or a textual response to the inquiry, ready for the participants' selection to the indicated. As mentioned, it is generally preferred that the maps, tables, or other geographic location information contain a visual indication of those areas which lie outside of the financial activity, providing a ready indication of ineligibility to participants surveying their possible choices for a prediction entry. If desired, the geographic location data can be linked to meteorological or climatological data for the given area.

A weather database is preferably provided for weather, meteorological or climatological information. The weather database preferably contains historical information helpful to those preparing a prediction of future natural events.

Participant Terminals

Turning now to FIG. 3, terminal apparatus 58 comprises one or more of the participant terminals 14-18 and includes a communications port 60, one or more processors preferably comprising a central processing unit 62 and a memory storage unit 64. Also included is an interface component 68 which preferably comprises a display 70 and a data input device 72. Interface component 68 allows a participant or other user 76 to communicate with apparatus 58 and in turn with apparatus 13 of the central managing system 12.

Turning now to FIG. 4, terminal apparatus 80, comprising another example of the participant terminals, includes a communication port 60, one or more processors preferably comprising a central processing unit 62, a memory storage unit 64 and an interface component 84. In the arrangement illustrated in FIG. 4, interface component 84 includes, in addition to a display 86 and a data input device 88, a card read/write device 92 and an output device 94 for dispensing a printed receipt, confirming a participant's transaction.

Figure 5:
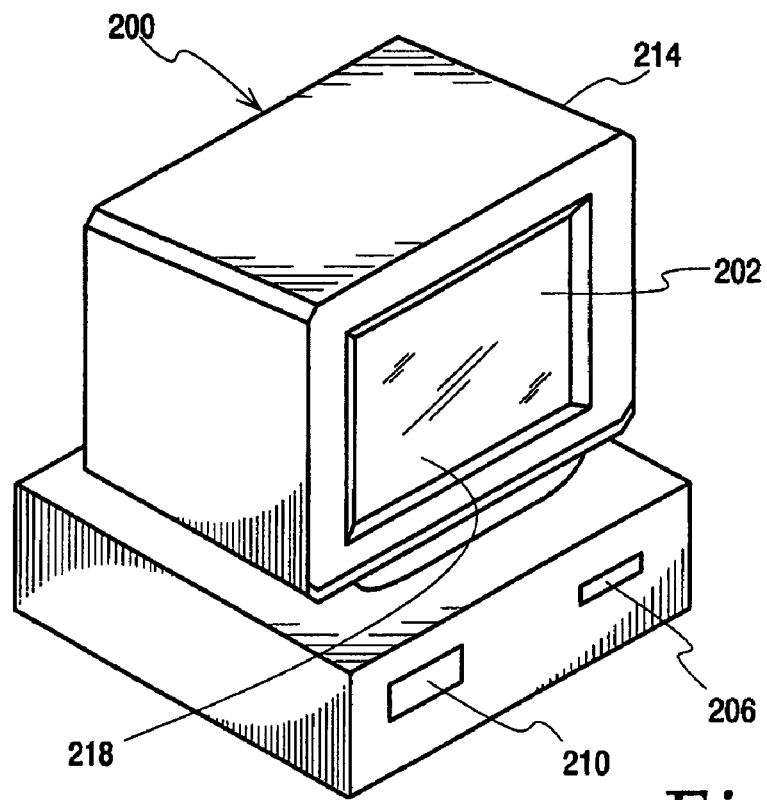
FIG. 5 is a schematic representation of a point-of-purchase participant terminal.
Figure 6:
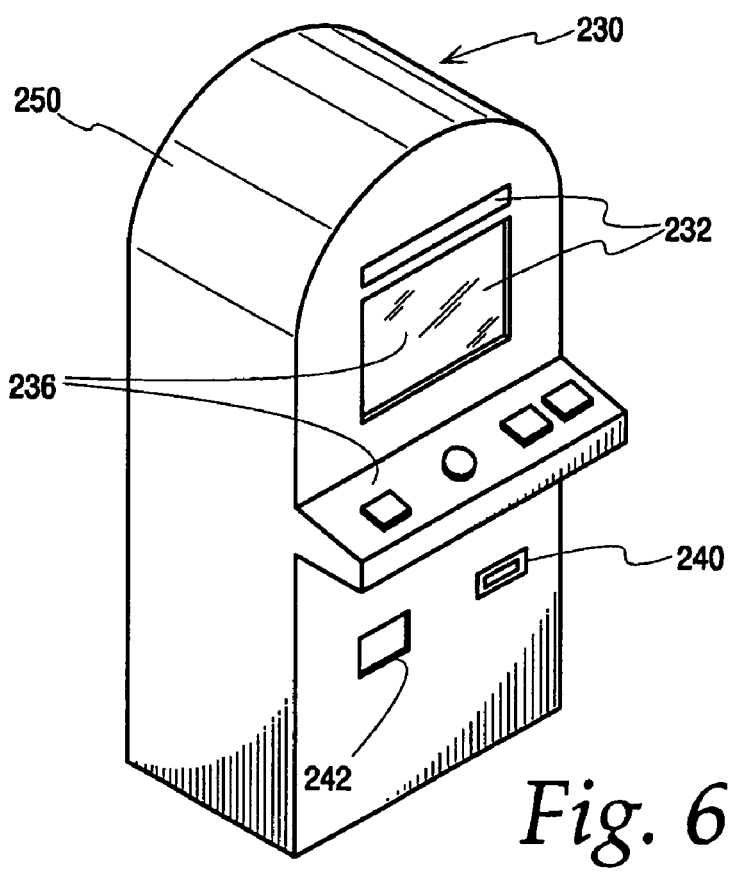
FIG. 6 is a schematic representation of a standalone participant terminal.

With additional reference to FIGS. 5-6, two additional examples of participant terminals are shown. With reference to FIG. 5, participant terminal 200 is shown comprising a display 202 for presenting information about the selected natural events, a user interface integrated with the display for viewing event information and placing investments on a selected natural event, an optional card read/write device 206 for receiving an electronic or magnetic-stripe card encoded with a participant's account information, an optional ticket dispensing device 210 for providing a ticket comprising purchase information for a selected natural event and a housing 214 for retaining the display, the user interface, the card read/write device and the ticket dispensing device.

The participant terminal 200 also includes a processor and may also include a speaker (not shown) for playing audio associated with the financial activity information. The display preferably comprises a CRT or a flat screen display 218 for displaying information regarding the natural events and preferably, the display comprises a touch-sensitive display, including a touch-sensitive membrane (not shown) in communication with the processor for selecting the desired investment information such as the desired investment shares, as well as "scrolling" between next and previous information. As will be apparent to those skilled in the art, any appropriate type of display may be used.

Turning now to FIG. 6, another embodiment of the at least one participant terminal, generally indicated at 230, is shown comprising a display 232 for presenting information about the selected natural event, a user interface 236 for viewing event information and making investments, an optional card read/write device 240 for receiving an electronic or magnetic-stripe card encoded with a user's account information, an optional ticket dispensing device 242 for providing a ticket comprising investment information for a selected natural event and a stand-up type housing 250 for retaining the display, the user interface, the card read/write device and the ticket dispensing device. The participant terminal also includes a processor (not shown) for facilitating financial activity. The participant terminal 230 may also include a speaker (not shown) for playing audio associated with the financial activity information. The examples shown in FIGS. 5 and 6 are only exemplary implementations for the at least one participant terminal, and other configurations are also contemplated. For example, the user interface may include a plurality of hardware or software buttons, each identifying different functions for facilitating various aspects of the financial activity.

Central Managing Apparatus

The central managing apparatus 13 and the participant terminal apparatus (together, referred to as "the apparatus") in one example comprise a plurality of components such as one or more of electronic components, hardware components, and computer software components. A number of such components can be combined or divided in the apparatus. An exemplary component of the apparatus employs and/or comprises a set and/or series of computer instructions written in or implemented with any of a number of programming languages, as will be appreciated by those skilled in the art. The apparatus in one example comprises any (e.g., horizontal, oblique, or vertical) orientation, with the description and figures herein illustrating one exemplary orientation of the apparatus, for explanatory purposes.

The apparatus, in one example, employs one or more computer-readable signal-bearing media. The computer-readable signal-bearing media store software, firmware and/or assembly language for performing one or more portions of one or more embodiments of the invention. Examples of a computer-readable signal-bearing medium for the apparatus comprise the storage components 20, 64. The computer-readable signal-bearing medium for the apparatus in one example comprises one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory. In another example, the computer-readable signal-bearing medium may comprise a modulated carrier signal transmitted over a network comprising or coupled with the apparatus, for instance, one or more of a telephone network, a local area network ("LAN"), a wide area network ("WAN"), the Internet, or a wireless network.

Graphical User Interface

Figure 7:
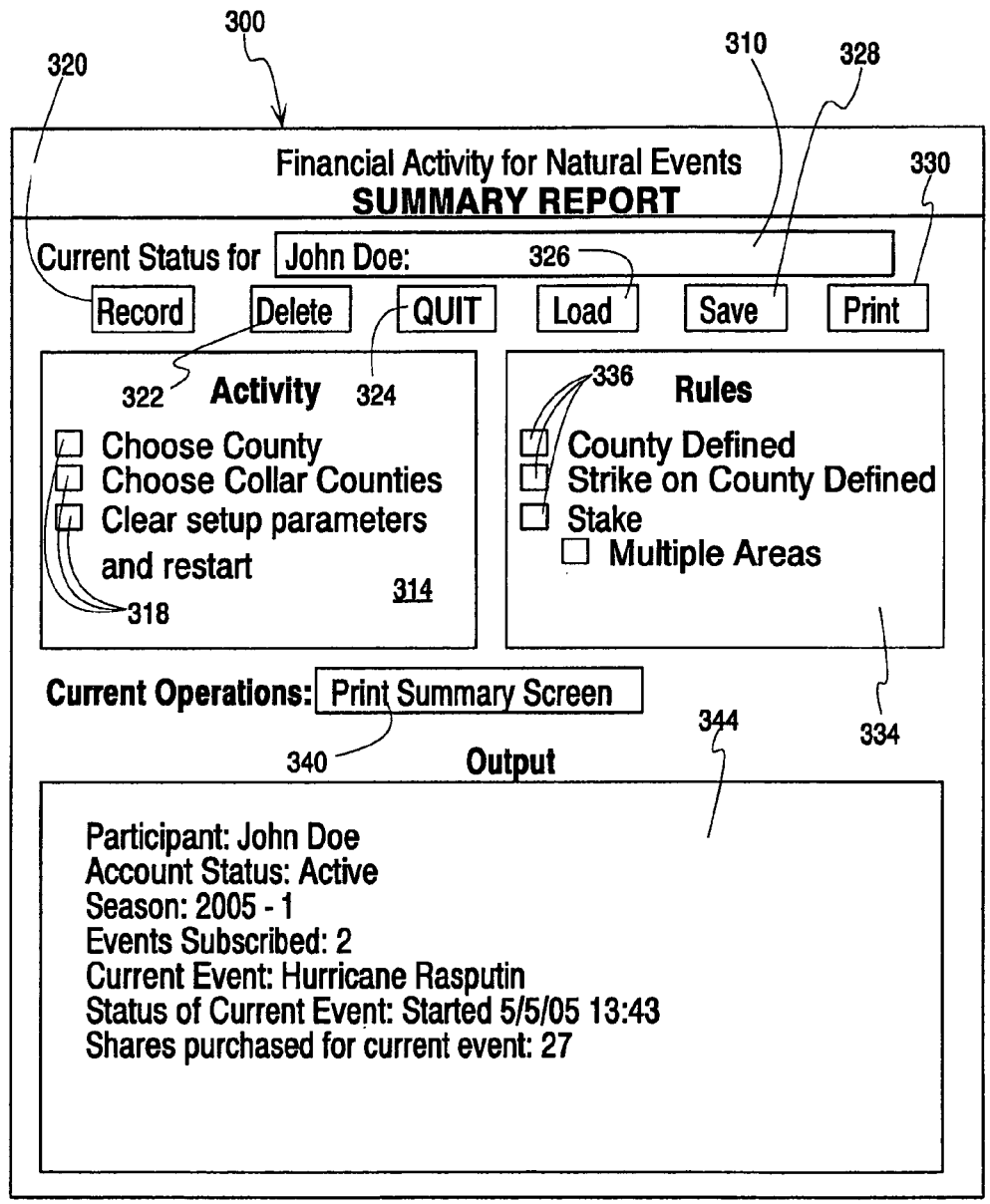
FIG. 7 is a schematic representation of a first data display.

Turning now to FIGS. 7 and 8a-8f, and initially to FIG. 7, program 30 includes one or more subroutines for communicating with a participant located at a remote participant terminal. In one instance, program 30 includes one or more subroutines for generating one or more screens performing a number of functions, including sending information to a participant, and receiving information from the participant. In FIG. 7, window or screen 300 schematically represents a summary screen for participant John Doe, as indicated at 310. As mentioned, screen 300 is a summary screen, and works with a number of supporting screens which query the participant for specific information such as the participant's name, and receives responsive information which is then reviewed for form and content, recorded in one or more databases such as the participant database, and is reported in the area 310.

Other supporting screens receive other participant application information, such as the participant's location of residence or location of other property holdings, along with information regarding the participant's credit information. Upon reviewing the participant's credit and other qualifications, an account is opened for the participant and details concerning the account, credit qualifications and other related financial information are stored in one or more databases, such as the participant database. The summary screen 300 is then presented to the participant, confirming the participant's active status in the financial activity. During this process, one or more queries, multiple-data choices, multiple activity choices or other interactions with the participant are listed in the area 314. If desired, each choice presented to the participant can have an adjoining checkbox 318 provided for the ready data input into program 30. If desired, one or more command buttons 320-330 can be provided for the user, to execute one or more commands or otherwise control some portion of data is stored in one or more databases, or to control some portion of program 30 allocated to the participant by the system administrator. If desired, area 334 can be provided to display context-sensitive rules of play to the participant, or to provide appropriate prompts or other helpful information. If desired, checkboxes 336 can be provided adjacent each entry in window or pane 334 to allow the participant to obtain further information related to the topic of interest.

In the area 340, the participant is alerted to the current operation being performed by program 30. If desired, a sequence of operations appearing in area 340, along with appropriate responsive indications from the participant may be listed in area 344. If desired, information in area 344 can be saved or printed using command buttons 328, 330, thus affording the participant the opportunity to obtain a written record of the activities in either electronic or printed paper form.

Figure 8A:
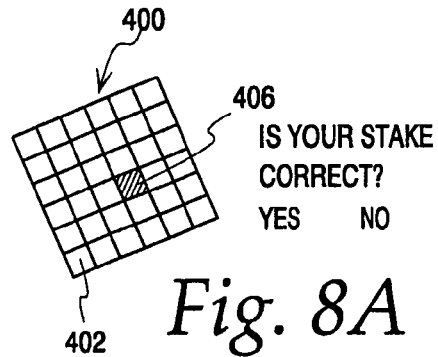
FIGS. 8a-8f are schematic representations of a series of screen displays.

Turning now to FIGS. 8a-8f, a series of exemplary data input screens are shown in schematic form. These screens pertain generally to the selection of the locations chosen by the participant for investment. For example, if the natural event is a hurricane, the location may be the participant's prediction of where a hurricane strike will make terrestrial contact. If the natural event is an tropical storm, the location may be the epicenter of the storm's strike. If the natural event is a tropical cyclone, the location may be the point of landfall, or a point along the over land track of the tropical cyclone. Landfall can be defined in any number of ways. For example, landfall can be measured using the center of the eye of hurricane, or the eye wall of the hurricane or different portions of the structure of the hurricane. Referring to FIG. 8a, a screen 400 presents a map 402 of a land area, which is preferably subdivided into smaller portions, each of which may either be selectable by the participant, or shaded or otherwise made visually distinctive to the participant so as to indicate an area which is not eligible for the financial activity.

If desired, the rules stored in one or more databases may provide further information regarding this topic of ongoing activity. Preferably, each subdivided portion of map 402 is selectable by touch screen, click and point, or by an input pen device, for example. It is also preferable, in one instance, that the area 406 selected by the participant is shaded, colored, or otherwise made visually distinctive so as to indicate graphically the choice made by the participant. In FIG. 8a, area 406 is chosen by the participant and receives a distinctive contrasting color value to provide visual feedback to the participant. As indicated in FIG. 8a, the screen 400 also includes a query to the participant to confirm and finalize the choice of location.

Figure 8B:
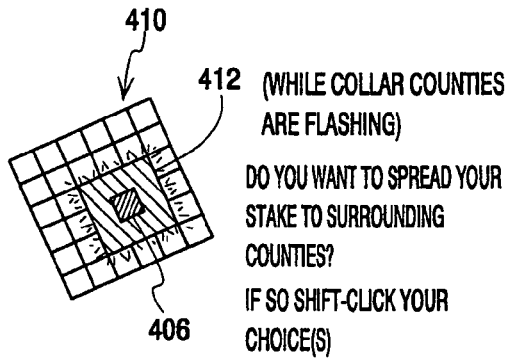

Turning now to FIG. 8b, screen 410 is presented as a prompt to the participant to expand the indicated area so as to include one or more surrounding areas. In screen 410, an enlarged area 412 surrounding the initial chosen location 406 (the "collar countries") is made to flash or blink on and off or undergo a color change. An optional text message is presented to draw the participant's attention to the advantages of enlarging the selected location in which a natural event strike is predicted to occur. The participant can indicate additional locations by shift-clicking, for example.

Figure 8C:
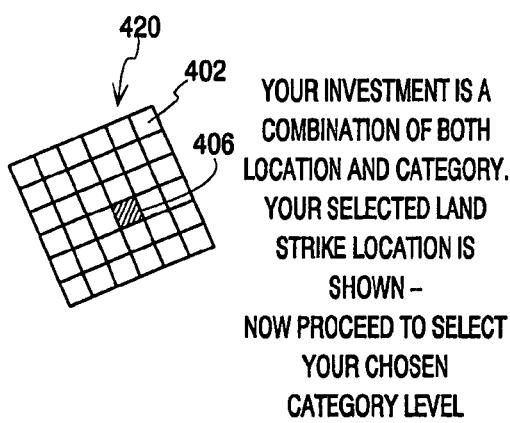
Figure 8D:
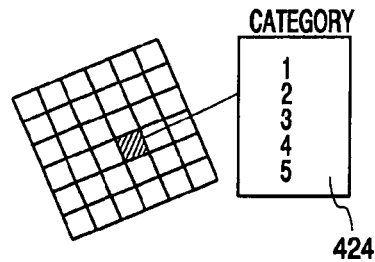
Figure 8E:
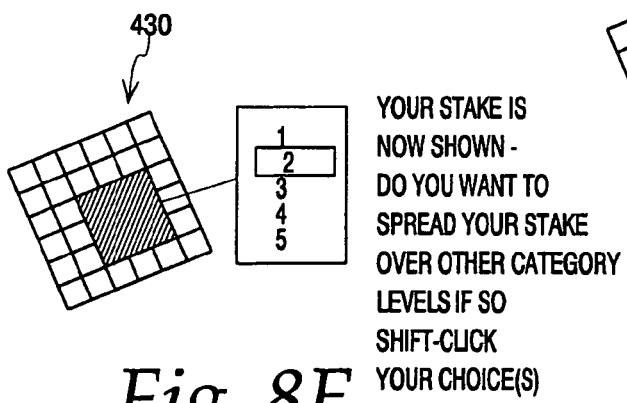
Figure 8F:
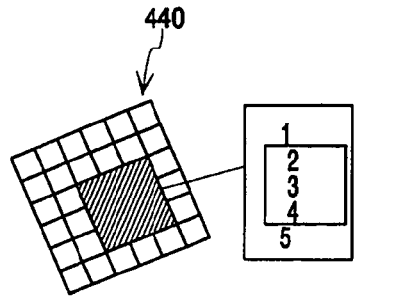
Figure 9:
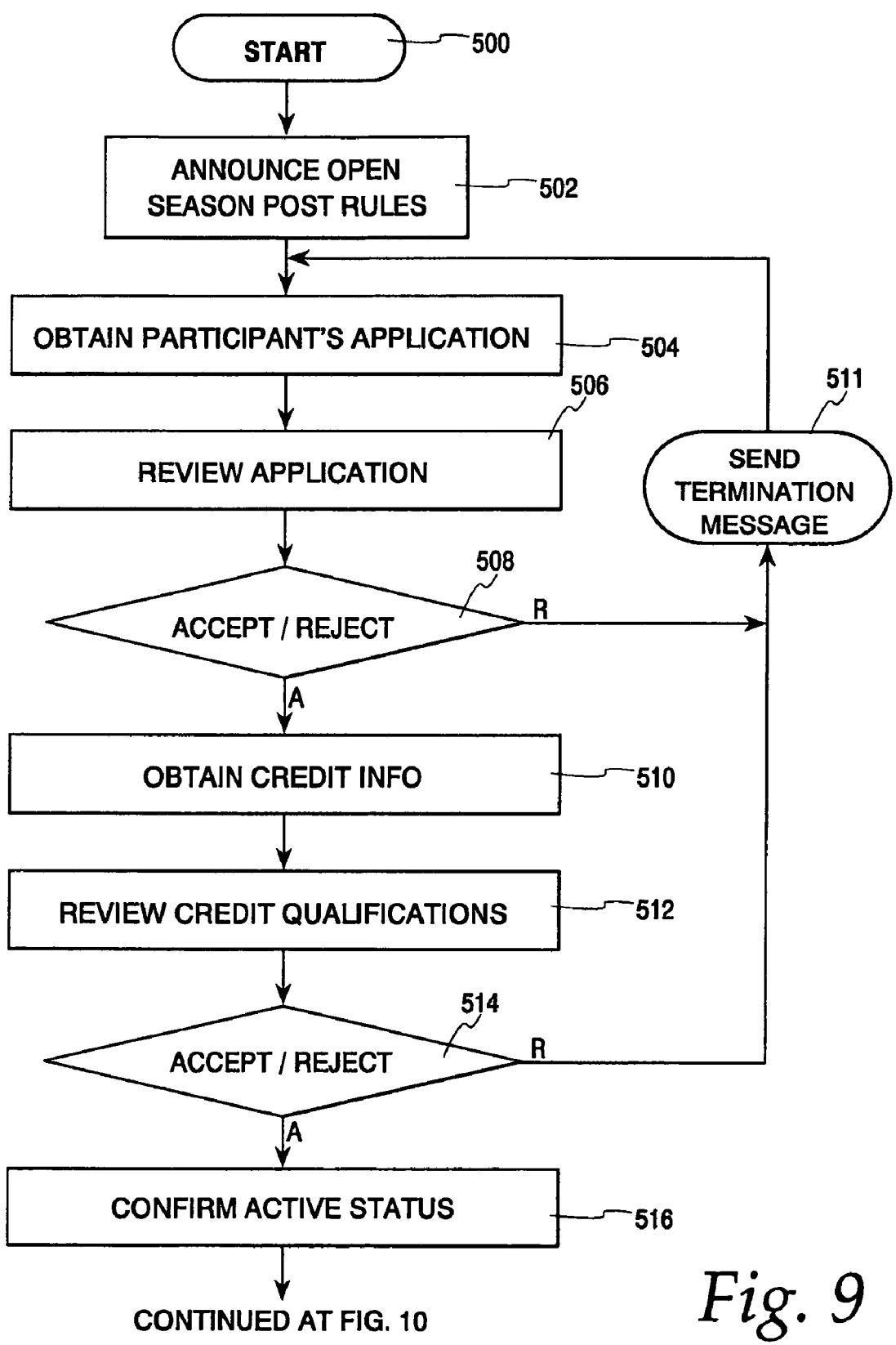
FIGS. 9-12 together comprise a schematic flow diagram representing one example of system operation.

In one instance, it may be desirable to establish a rule of play allowing the use of so-called secondary parameters. These secondary parameters require a participant to select not only a location of strike by a natural event, but also to indicate some characterizing factor associated with the natural event, such as strength of the tropical storm measured according to a numerical category value, according to the Saffir-Simpson scale, for example. Another example of a secondary parameter for an tropical storm could be the strength of the storm, and such is contemplated in FIGS. 8c-8f. Referring to FIG. 8c, screen 420 provides notice to the participant that a secondary parameter is to be provided, in addition to the strike location. In FIG. 8d, a pull-down window 424 is provided in screen 426 to indicate a range of values to be chosen by the participant as the predicted category strength of the hurricane strike. In FIG. 8e, it is assumed that a participant has previously enlarged the area of strike location to be covered by the chosen investment or "stake". In screen 430, the participant's choice of category 2 is confirmed along with an invitation to spread the participant's stake in category strength, as well as in land area. In FIG. 8f, a screen 440 shows the participant's selected range of category strength. Following, is a screen (not shown) which summarizes the participant's stake. For example, for the investment indicated in FIG. 8f, a user has selected nine geographic areas and three category strengths, for a total purchase cost of 27 shares (9 areas×3 strength values). In one instance, it is generally preferred that this summary total of shares purchased is reported in area 344 of screen 300, shown in FIG. 7.

Methods and Operations

An illustrative description of exemplary operation of the system is presented, for explanatory purposes. FIGS. 9-12 indicate a series of steps to be carried out during the course of the financial activity. These method steps may be implemented in a number of different ways, including, for example, but not limitation, execution of program 30 by the central managing apparatus 13, and one or more participant terminals. The program 30 may be implemented by either a general-purpose computer or a special purpose electronic device, for example. The method steps may be incorporated into an article of manufacture such as a data storage device. As will be seen herein, the steps indicated in FIGS. 9-12 indicate that portion of financial activity as taken from the viewpoint of the system administrator.

Referring initially to step 500, the financial activity is initiated by virtually any appropriate means. For example, if the rules of operation provide that the financial activity begins at a given date and time, the start step 500 may be implemented in software that monitors the system clock and executes program code which publishes invitations to participants to engage in financial activity as of the referenced date and time. Alternatively, start step 500 may be initiated by the system administrator pressing a key switch or otherwise activating a switch to initiate transmission to participants indicating that the financial activity season has been opened. According to certain aspects of the present invention, an event season may be related to a single natural event or a number of different natural events or a number of portions of an ongoing natural event. In one instance, an event season is defined by calendar dates, by a number of occurrences of a defined natural event, or by a mixture of both, or may rely upon a report or other dissemination of data from an external objective independent information source.

In step 502 in addition to announcing the opening of the financial activity season, an optional offer is made to make available certain rules of operation which govern financial activity for the season of operation. In step 504 application information is obtained from the participants. This information can include, for example, an indication of the identity of the participant, the participant's residential location or location of property interests, and the participant's credit information needed to allow the system administrator to authorize opening of an account for the participant. Preferably, the system administrator predefines acceptance criteria in the rules which govern the financial activity. These rules may include intervention by an external agency, such as an external credit agency from which credit is purchased by the participant, using the system administrator as a broker, as is currently done by many merchants offering goods or services for sale.

In step 506, the application information is reviewed and the decision made in step 508 is to either accept or reject the participant's application. For example, a participant's application may be rejected because the participant has failed to disclose a property interest needed to base financial activity on property losses caused by occurrence of natural events. If the participant's application is rejected, control is passed to step 511 which sends a termination message to the participant and returns control to step 504.

If the participant's application is accepted, control is passed to step 510 in which credit information is obtained from the participant. The participant's credit qualifications are reviewed in step 512 and a decision is rendered in step 514 to accept or reject the participant based upon the added requirements of appropriate credit qualifications. Again, if the participant fails to meet sufficient credit qualifications, control is passed to step 511 which sends a termination message to the participant and then transfers control to step 504. If the decision in step 514 is positive, indicating acceptance of the participant's application and credit qualifications, control is passed to step 516 which confirms the active status of the participants with respect to the financial activity. Such confirmation may be indicated, for example, by a report rendered by screen 300 as explained above, with reference to FIG. 7.

Figure 10:
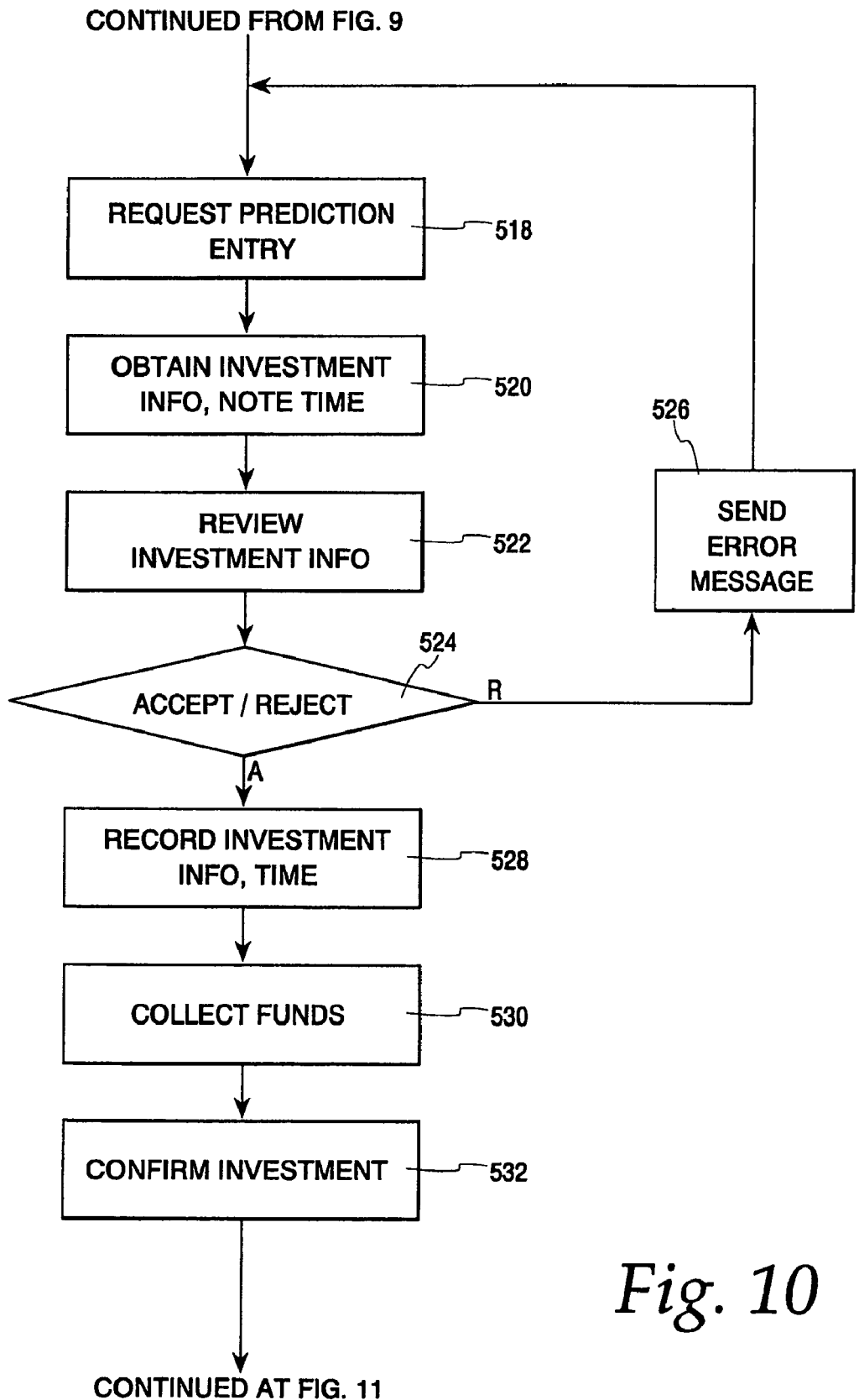

Referring to FIG. 10, in step 518 the prediction entry is requested from the participant. In the step, the participant provides information defining the investment to be made. After confirming the unique identity of the natural event, the participant declares the primary parameter information which, in one instance, comprises the location of the land strike predicted for the natural event. Thereafter, the participant declares any secondary parameters required by the rules of operation, such as the severity of the strike, and the strike duration, for example. In step 520, the prediction entry and other investment information is obtained from the participant and stored in one or more databases, for future reference. In one instance, the time at which the investment information is obtained is noted and stored along with the participant's investment data. In one instance, the amounts of payout or remuneration to a successful participant is weighted according to the amount of time between the investment transaction and occurrence of the event, with greater time durations being weighted more favorably, on the premise that later investments have the benefit of accumulated knowledge which will benefit the ability to predict occurrence of an event.

The investment information is reviewed in step 522 and judgment is made in step 524 as to whether the investment information is acceptable or not. If the investment information is rejected in step 524, control is passed to step 526 which sends an error message to the participant, passing control to step 518 to repeat the information gathering process. If desired, step 526 can cause relevant information to be offered or displayed to the participant to help raise the participant's level of skill in making a prediction. If desired, the participant can be asked to answer a number of questions relating to the skills involved in making a prediction for the particular natural event.

Assuming that the investment information is in the correct form and meets other automated criteria, control is passed to step 528 in which the investment information is recorded along with the current time. The system administrator has the option of determining at what point in the ongoing financial activity a participant is deemed to have completed the investment process for the purpose of determining the time difference between the investment and occurrence of the natural event. For example, the times noted in either steps 520 or 528 (or some other time, if desired) can be used. As a further alternative, a system administrator may wish to defer appointing an investment time to the participant until funds for the transaction have been obtained from the participant. As a concession to the participant, the system administrator may provisionally appoint an investment time at an earlier step.

Figure 11:
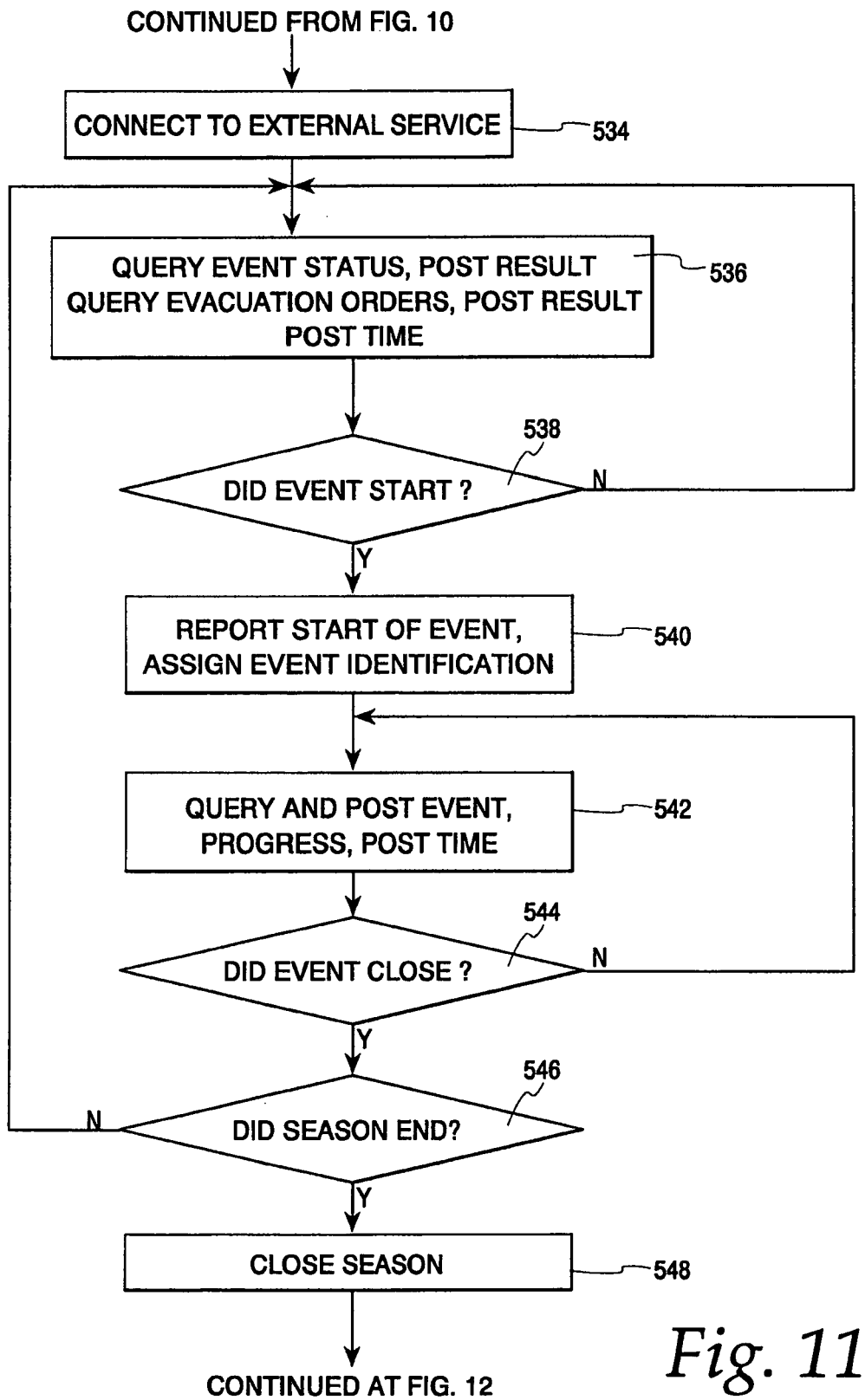

Assuming the investment information has been successfully obtained and recorded, control is passed to step 530 in which necessary funds are collected from the participant. If desired, the participant's ability to pay can be guaranteed before hand to eliminate any time delay at this point in the ongoing financial activity. In step 532, the participant's investment is confirmed by an entry to the summary screen 300, for example. With reference to FIG. 11, control is then passed to step 534 in which contact is made with an external objective independent information source that observes the natural event and manages information concerning the natural event and optionally, renders related decisions, such as assigning a severity level according to established scales of measure.

Generally speaking, it is preferred that the system administrator not be required to render decisions concerning occurrence of a natural event, such as primary and secondary event parameters. In one instance, a system administrator provides in the rules of operation, that a financial activity will rely upon a designated external objective independent information source for information concerning the occurrence and characteristics and other parameters of natural events upon which investments are to be based. In step 534 connection to an external objective independent information source may be initiated or alternatively, data from the external objective independent information source previously obtained may be accessed for use by the financial activity. In step 536 updates to ongoing developments received from the external objective independent information source may be posted for the benefit of existing and prospective participants. In one instance, updates are made on an ongoing "live" basis, either with little or no time delay, or at a minimum, at a time prior to closing of a natural event.

In step 538 information from the external objective independent information source is queried to determine if the external objective independent information source has established start of a natural event of interest to the financial activity. If an event has not yet started, control is passed to step 536. When the external objective independent information source determines that an event has started, a unique identifier for the natural event is assigned and recorded to one more databases. In one instance, the unique identifier is thereafter associated with each investment by a participant concerning the natural event. In step 540, the start of the event is reported to the participants and the time of event starting as "officially" determined under rules of the system administrator is posted or otherwise made available to participants, and is recorded in one or more databases for possible future reference by the financial activity. In step 544, if the event has not yet closed, continuous updates regarding event progress are obtained and in one instance, are reported or otherwise made available to the participants.

Once an event has closed, control is passed to step 546 to determine if financial activity has ceased. In one example, the system administrator provides the rules of operation defining the starting and ending times for a financial activity season. This can be based upon an arbitrary date and time, or upon occurrence of a particular event, such as occurrence of the fourth, fifth, or sixth tropical cyclone since the season opened. In one instance, closing of one season may be followed by an immediate or delayed opening of a subsequent season. For example, a subsequent season can be declared by the system administrator to accommodate financial investments based upon occurrence of the fourth, fifth or sixth tropical cyclone occurring in a given hurricane season, as defined by the National Hurricane Center, for example.

Figure 12:
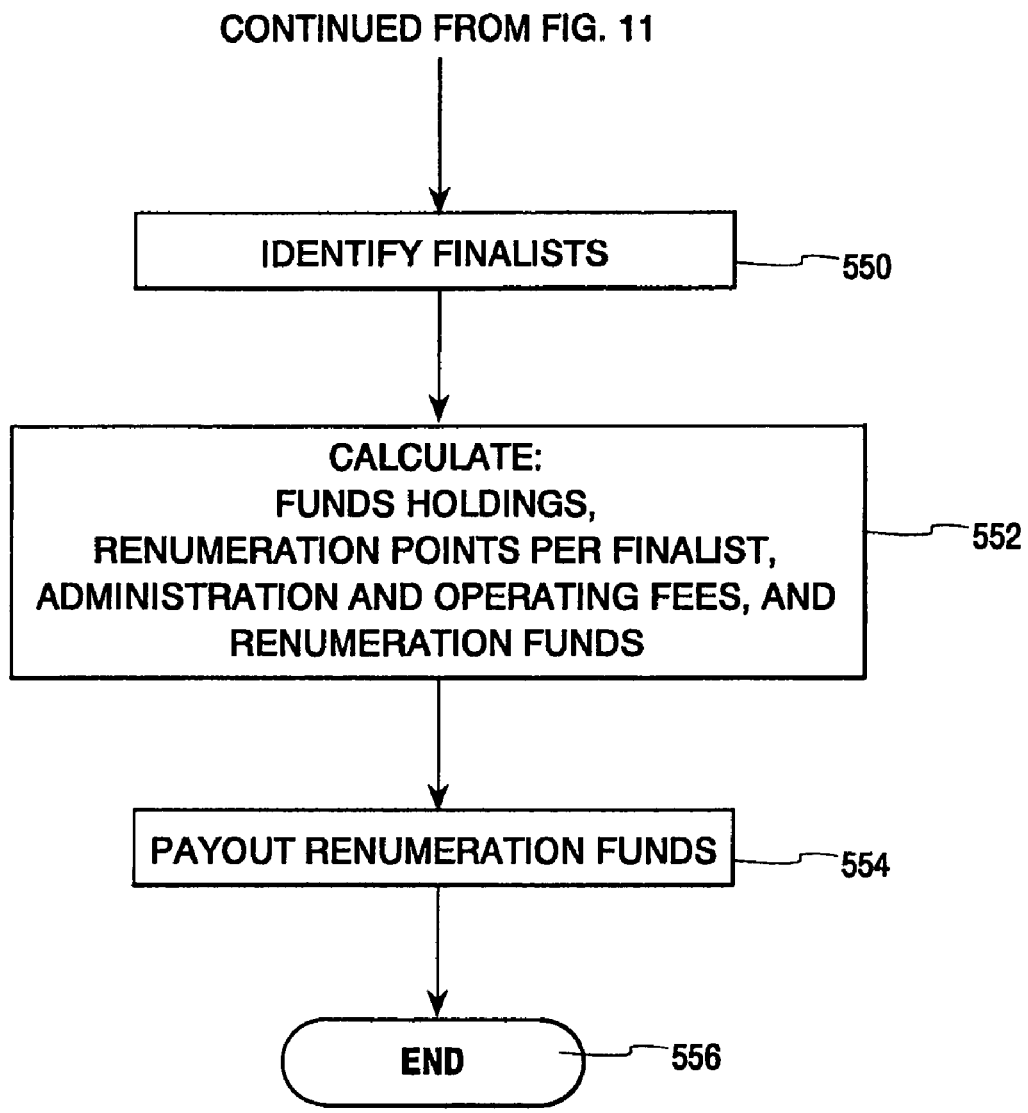

Referring to FIGS. 11 and 12, if it is determined in step 546 that a season has ended, the season of financial activity is closed in step 548 and accumulated data and other information is reviewed in step 550 to determine and identify the finalists which have made successful predictions concerning the natural event, as provided in the rules of operation for the financial activity. In step 552 a number of calculations are made in preparation for making payouts to the successful finalists. In one instance, calculations are made to determine the total funds holdings, the remuneration points per finalist, the administration and operating fees associated with conducting the financial activity, and the amounts of remuneration funds for each finalist. Remuneration points, in one instance, are based solely upon the primary parameter, which is preferably the strike location of the natural event. In another instance, remuneration points are determined not only by the strike location but by other natural event parameters, secondary or otherwise.

In one instance, a single primary parameter is defined by the system administrator in the system rules of operation. In another instance, one or more secondary parameters are also defined in the system rules of operation. In a further instance, secondary parameters are assigned a lesser weighting than the primary parameter. In any event, the primary and secondary parameters, if any, can have equal or unequal weighting, as may be desired. In one example, relating to hurricane events, location of the hurricane's strike is defined as a primary parameter, with time delay between the investment time and the time of the hurricane strike at the investment location being defined as a secondary parameter.

In one instance, the time delay secondary parameter is weighted less than the primary parameter. In another instance, severity of the natural event at the predicted location declared by a participant is defined as a tertiary parameter, and the secondary and tertiary parameters are assigned unequal weighting. The present invention contemplates that remuneration points are determined according to a mathematical formula, algorithm or other operation which does not require human intervention at the time of execution. Thus, the formula, algorithm or other operation may be incorporated in an analog or digital electronic circuit or an hydraulic circuit, for example. If desired, and especially with financial activity providing a hedge against property losses, remuneration points may be determined, contingent upon or otherwise based upon confirmation of the participant's property interests.

In step 554 the remuneration funds are paid out to the successful participants, or finalists. In step 556 the financial activity is closed.

The steps or operations described herein are just exemplary. There may be many variations to these steps or operations without departing from the spirit of the invention. For instance, the steps may be performed in a differing order, or steps may be added, deleted, or modified.

In addition to the above, other types of activities are contemplated by the present invention. As mentioned above, a participant may elect to contact a system administrator or other service provider to engage in a financial activity. Investments are paid into a system account to purchase shares in the financial activity. Assuming a participant's activities are successful and perhaps if certain qualifications are met, payouts are made from the system account to the participant. The present invention also contemplates other types of transactions. For example, shares purchased in the course of the financial activity can either be uniquely assigned to a participating individual, or they can be made freely transferable. Accordingly, a financial activity may be organized such that either payouts must be made to the participant making the investment or payouts can be made to any individual possessing sufficient identification, such as an account number and password.

The present invention also contemplates, in either example, that the investment positions referred to herein as shares or stakes can be bought and sold between various parties, either with or without interaction with personnel associated with the financial activity. If desired, the aftermarket activity in shares transfer can be offered by the operator of the financial activity as a service to members of the public. In any event, the financial activity, from investment to pay out would be carried out by operators of the financial activity. In another embodiment, the present invention also contemplates that financial activities would be carried out between two or more participants, with the operator of the financial activity providing a service that facilitates financial interactions between the parties involved.

Variability Factors

The present invention contemplates the use of different factors affecting price and/or payout of the financial activity. By way of introduction, two considerations are contemplated in one instance, one relating to probability and the other relating to a calendar or timing of events. In particular, the present invention, in one instance, provides a price or cost variation in the purchase of a unit (otherwise termed a "share" or a "stake") representing a quantification of a participant's financial investment.

In one instance, assuming a point in time before occurrence of a natural event, participants are able to invest in a financial activity at prices which are set by the financial activity provider, and which vary depending on time and on one or more probability factors. As a first component of price variability, the present invention, in one instance, keeps track of the timing of the investment. It should be borne in mind that investments can be made a long time (e.g. months) before a natural event, such as the time a hurricane would be likely to occur. One purpose of this variability factor (namely that of timing), is to encourage investments to be made earlier, rather than later. This variability factor, in effect, preferably operates as a price discount factor, although the variability factor could also be applied to payout distributions.

According to the present invention, one or more probability assessments are preferably made at the time of a participant making an investment in the financial activity. One probability assessment preferably takes the form of a probability calculation based on current conditions, of the likelihood of a "hit," "successful outcome" or "qualification" that a participant's prediction will occur. For situations involving hurricane natural events, the price of a unit available for purchase by a participant at a given time is calculated based upon a probability that the county (or other geographical designation for a purchase unit) chosen by the participant will suffer a hurricane strike. If desired, probabilities can be based upon storms other than hurricanes and if desired the strength of the storm or other factor can be employed to alter the purchase price at any given time.

As a further consideration regarding probabilities, financial activities according to principles of the present invention can take into account conditional probabilities. For example, the average number of hurricane landfalls on the U.S. in a given year is 1.7. This value is sufficient to define a Poisson distribution, according to conventional techniques, for numbers of U.S. landfalls, which yields a probability of 0.817 that at least one US landfalling hurricane will occur in a given year. Similarly, from this Poisson distribution, the conditional probability that there will be at least two US landfalling hurricanes, given that one has already occurred, is 0.620.

In one instance, shares in later funds can be priced more cheaply than earlier funds according to conditional probabilities of K strikes, given that K−1 strikes have already occurred, so that, in addition, prices go up in subsequent funds when an earlier fund closes.

According to another aspect of the present invention, the financial activity incorporates multiple stages of probability assessment, with different probability treatments being given at each stage. Preferably, three probability treatments are applied to investment price, but could also be applied to payout distributions if desired. In a first stage of probability assessment, no storms or other precursors to hurricanes are in existence, and the first stage probabilities preferably are based on climatalogical relative frequencies.

Second stage probabilities are in play where at least one storm exists in the field of interest (e.g. the Atlantic basin) but is far enough away from the area of interest (preferably, the coastline of the continental United States and adjacent coastlines) that no forecasts of imminent landfall can be made. Preferably, for hurricane natural events, attention is paid at this stage to tropical depressions, and tropical cyclones such as hurricanes and to their location and tracks at sea. Preferably, in addition to the distance between the tropical depression and the area of interest, attention is paid to the historical tracks or paths of storms in previous years that subsequently made landfall in the area of interest.

In the third stage, occurrence of a natural event such as the landfall of a hurricane, is imminent. It is generally preferred that the existence of the third stage is declared, based upon an indication of an independent objective information source, such as the National Hurricane Center/Tropical Prediction Center. For example, a provider of a financial activity may look to the issuance of hurricane watches, and especially hurricane warnings from the National Hurricane Center. For example, a hurricane watch is issued when it is determined that hurricane conditions may threaten an area within 24 to 36 hours. At this point, preparations may be made for an imminent evacuation, if one is ordered. A hurricane warning is issued when hurricane conditions (i.e. maximum sustained wind speeds of 74 mph or more) are expected in a specified coastal area within 24 hours or less. Local government agencies make independent assessments and independently issue evacuation orders for people in the affected areas. Notification of these types of events to the financial activity provider can be used to close further participant activity, or alternatively to trigger a shift from stage two probability assessments to stage three probability assessments. The NHC forecasts go out 72 or 120 hours into the future, depending on the nature of the forecast product. It should be noted that in this scenario, the effect of stage three probability assessments is intentionally weakened by the calendar or the timing variability factor. Since the natural event is imminent, price discounts for unit purchases is preferably very low or nil. If desired, payout penalties can be assessed for stage three investments because of their close timing to occurrence of the natural event.

Considerations Regarding Payout

If desired, financial activities relating to hurricane natural events can be structured around hurricane landfall or hurricane land tracks, either individually, one exclusive of the other, or in combination. A question arises, for example when a hurricane landfall is made on or close to a border between two unit areas (i.e. geographical areas, such as counties used to define purchase units). An arbitrary width can be assigned to the point of landfall if desired, by the provider of the financial activity.

The passage of a hurricane over inland geographical areas can raise a number of different possibilities made available to the provider of a financial activity. For example, if the National Hurricane Center is designated as the external objective independent information source, one report currently available to providers of financial activities is the so-called "best track" report which issues after a hurricane event is concluded. The "best track" report defines the inland path of a hurricane according to a table of discrete position values. Thus, it is left to the provider of the financial activity to determine the best way to define the hurricane path between published points on the "best track" table. If desired, the points of the "best track" table can be connected by straight lines or by curved lines according to a predefined curve-fitting method, for example. As a further possibility, an arbitrary width can be assigned to the hurricane path.

If desired, other sources of information can be employed since the "best track" report is not the only possible source of scoring information, and may not be desirable in certain instances because of the time delay associated with issuance of the report after conclusion of the natural activity. For example, the same kind of information (lat/lon and maximum sustained winds) are available in near-real time in what are called "advisories" issued by the National Hurricane Center, which do not suffer from prolonged time delays. Preferably, the most rapid satisfactory resolution of the outcome of the natural event is preferred, so that distributions can be made promptly to individuals who suffer from the natural event.

Different possibilities are presented when considering a particular geographical land unit. For example, payout for a geographical land unit can be based upon one or more external factors, such as a simple hit/no-hit treatment for the land unit of interest. In another example, payout for a land unit of interest can be based upon the published strength of the hurricane according to the "best track" or other table. As a further possibility, it is recognized that the strength of a hurricane can vary in intensity or strength when passing over a given geographical land unit of interest. The possibility is thus presented for a mathematical treatment taking into account the difference of strengths at entry and exit points of the hurricane with respect to the geographical unit of interest. As a further possibility, the geographical unit of interest can lie between points published on the "best track" table, and some manner of interpolation of values can be made with respect to the geographical unit of interest. If desired, payouts can be calculated based upon the strength of the hurricane for the qualifying geographical unit. For example, one payout possibility is to award greater payout for geographical units suffering greater strengths of hurricane activity, under the premise that more help will be provided for those participants that suffer greater damage, as measured by hurricane strength.

Variability factors other than those presented above can also be considered when calculating payouts to qualifying participants. For example, in addition to timing factors and probability factors discussed above (which are preferably employed for price variability) as well as strength variability, an account can be made of the residence time of a hurricane in a given geographical unit of interest, under the premise again that more help will be provided for those participants that suffer greater damage as measured by the time that a hurricane is present in a given geographical unit of interest.

Modularity

In one instance, the present invention includes one or more systems, one or more methods, and/or one or more devices for carrying out the financial activity. A number of important issues are addressed by the databases and/or program. In one instance, it is a generally preferred that these issues be addressed as much as possible, on a modular basis. In this manner, a system administrator is able to quickly and easily tailor the financial activity to meet a number of particular needs, and can modify the financial activity on an ongoing basis, if necessary. A brief description of some of the "modular" issues will now be given.

1. Definition of an external objective independent agency which monitors a natural event, measures, observes, or otherwise obtains and records data concerning a natural event, as well as drawing conclusions and making analytical determinations concerning a natural event. In one instance, it is generally preferred that the external objective independent agency be independent of the participant's financial activity, and in another instance be readily observable by the public, or at least the participants. For example, the external objective independent agency can comprise a unit of the United States government which routinely makes public announcements and which is subject to Freedom Of Information inquiries from members of the public.

2. Definition of an event eligible for payout. For example, relating to hurricane natural events, it is generally preferred, in one instance, that the event be "officially" declared a "hurricane" as defined by the National Hurricane Center. However, in other instances, other recognized pre-hurricane stages can be treated by the financial activity, with or without weighting the points upon which payout is based. In one instance, payout for the financial activity can be based upon an occurrence of a natural event or a termination of a natural event.

3. Definition of participant eligibility needed to be permitted to engage in the financial activity. Included, for example, is the level of skill of the participant (needed, to qualify to participate in a financial activity structured as a game of skill), or the property rights of participant (needed, for example, to qualify to participate in a financial activity structured as a vehicle for recouping losses to property rights caused by a natural event).

4. Definition of a "season" for the financial activity. The financial activity season can, for example, coincide with a particular time interval such as a "hurricane season" as defined by the National Hurricane Center. In another instance, the financial activity season can be chosen to lie outside of a recognized or customary time period such as the National Hurricane Center "hurricane season" and that this is preferred for hurricane natural events.

5. Number and length of financial activity seasons in a given year. In one instance, there can be but one financial activity season. In one instance, the financial activity season can begin at the beginning of a calendar year. In another instance, the financial activity season can begin at any time during a calendar year. In one instance, the length of a financial activity season can be a predefined number of natural events. In another instance, a financial activity season can be defined to comprise a predetermined number of natural events, which is either concluded or is followed by a subsequent financial activity season upon the occurrence of those predetermined number of natural events.

6. Defining the types of natural events and activities upon which payouts are based. For example, for hurricane events, recognized activities can include coastal strikes, inland strikes and near-shore hurricanes which do not make landfall (such as hurricanes which come within one quarter mile of eligible coastal shore). Other definitions of "sub-characteristics can be made for other types of natural events, other than hurricanes.

7. Defining areas or regions eligible for inclusion in the financial activity. In one instance, only terrestrial areas or regions may be declared eligible for inclusion in the financial activity. In another instance, the terrestrial areas or regions eligible for inclusion in the financial activity are geographically defined according to convenient delineations, such as established political boundaries. In a further instance, portions of geographic regions can be declared ineligible for inclusion (for example, some of the many island areas of the Eastern Seaboard of the United States can be declared ineligible for inclusion, because of small size, few or no inhabitants, or for other reasons which are or are not stated).

8. Defining the areas stricken by a natural event. In one instance, the stricken areas can be defined according to external objective independent agencies such as the National Hurricane Center. In one example, stricken areas eligible for the financial activity include those areas as defined by the National Hurricane Center "best-track" or other, interim reports which are typically published either during or shortly after the conclusion of a hurricane event. In one instance, the size or width of the National Hurricane Center "best track" (preferably, of the center of the eye of the hurricane) can be infinitely thin, or it can be of a predetermined width. In one instance, stricken areas eligible for the financial activity can be calculated by connecting points given in the National Hurricane Center table data of a hurricane's "best-track" or other table with either a straight line, or a curved line preferably defined by a predetermined curve-fitting method.

9. Defining the nature of the natural event to be eligible for the financial activity. For example, events officially determined to be well-defined "hurricanes" by the National Hurricane Center can be declared by the rules of operation as the only eligible natural event recognized by the financial activity. In another instance, the financial activity can treat "hurricanes" defined by the National Hurricane Center according to their storm intensity as defined by the National Hurricane Center. For example, only a hurricane defined as reaching category three severity by the National Hurricane Center can be declared eligible for the financial activity. In one instance, payouts can be based upon hurricane strikes, weighted according to their storm intensity as defined by the National Hurricane Center. For example, distributions based upon a hurricane's "best track" can pay out different amounts for different qualifying participants, depending upon the severity of the hurricane at the time and/or point of contact with the hurricane, or other primary, secondary, tertiary or other criteria. In one instance, observed information from an independent external source regarding the land track of a tropical weather event may not be continuously reported. For example, the use of a "best track" or other table inherently assumes discrete points of data spread out over a time interval. Questions can arise when the reported data does not correspond to boundaries of geographical areas defined by the financial activity. Various treatments can be given. For example, an average value can be established between two adjacent data points (e.g. two adjacent points of a "best track" or other table) and this average value can be used to determine the value of the natural event as it passed through a given geographical area. In another treatment, if a data point (e.g. a point on the "best track" or other table) occurs within a geographical area of financial activity, the value attributed to the data point can be used for all investments made within the geographical area predicted by a participant. Other treatments are also possible.

10. Determining the amount of payout for those participants eligible to receive payouts. Several instances of payouts varied according to a number of different factors and considerations are given herein. These variations can be accounted for in a number of different ways including, for example, a simple linear weighting or a more complex algorithm. In another instance, variations in payout between different participants can be based upon one or more related or independent factors, as may be desired. In one instance, determining the amount of payout for qualifying participants can be based upon primary, secondary and if desired, tertiary and other criteria. For example, for tropical weather events, primary criteria can be chosen to be the "locus" of landfall of a tropical weather event. If desired, the land track of a tropical weather event can be treated as another primary criterion (especially where an equal weighting among primary criteria is assumed) or can be treated as a secondary criterion (especially where unequal, preferably a lesser, weighting is assigned, relative to the primary criteria). In another instance, other secondary or lower level criteria can be chosen, such as residence time in a given geographical area, or wind speed or range of wind speed associated with a tropical weather event, preferably while the tropical weather event is resident in the geographical area predicted by the participant. As a further possibility, multiple criteria can be established in tertiary or other additional levels (preferably assuming unequal weighting among the levels of the criteria).

Other examples of variability factors have been discussed herein, and will be summarized below.

Derivative Trading Financial Activity Model

As mentioned above, financial activities according to principles of the present invention may, in one instance, be modeled to resemble financial trading of derivative securities interests (e.g. options), such as those monitored by the Commodity Futures Trading Commission (an independent agency of the United States government), the New York Stock Exchange, the Chicago Mercantile Exchange, the Iowa Electronic Market, and others.

Generally speaking, compared to other types of financial activities considered herein, activities under the "derivative trading type" financial model incorporate price controls driven more by market conditions and less by direct control via the rules, principles of operation and other structures of the financial activity being undertaken.

According to one example of this financial activity model, and assuming a hurricane or tropical weather type of natural event, initially all geographical areas (e.g. counties) in play are available for individual investments at the beginning of the declared financial activity season at some predefined minimum investment amount (i.e. purchase price). Once an investment is made for a particular geographical area, the next investment to be made for that same geographical area is set at a higher purchase price. For example, the rules of the financial activity can provide that the second investment will undergo a flat rate pricing increase, such as $0.25 per share. If desired, pricing increases can be assigned in steps according to step increases in the volume (either dollar amount or number of shares traded) of trading. If desired, other types of increases can be employed, including linear and nonlinear mathematical treatments of purchase price. The prices for subsequent investments in a particular geographical area may either continue to increase or will plateau at a constant price until a set point minimum number of shares is reached.

Preferably, the set point is chosen to reflect a substantial "pot size", which would justify a substantial step in price increase. If desired, several steps of price increases can be employed, and related to similar or different sized blocks of shares. If, for example, a particular geographical area suffers a lull in trading, the purchase price can be reduced, based on the time value since the last trading activity. Once activity resumes for a particular geographical area, price increases can go into effect. Each geographical area will have different initial prices and could have different step sizes or blocks, as shares are traded, if desired. Thus, in this example, share price varies according to market activity (e.g. a stepwise or a smoothly varying increase as trading activity increases). Optionally, in this example share price can also vary according to time factors, such as factors centered around a falloff (or optionally a rise) in trading activity.

It is generally preferred that pricing follows a number of principles. For example, it is generally preferred that trading begin with a set minimum price which could be different for each geographical area. In one instance, it is generally preferred that the minimum price depends on market activity. In a second instance, it depends on the climatological probability, (as currently estimated), of the particular geographical area being hit, and, as trading progresses, how many shares have been sold for a particular geographical area, and also the total amount of money in the pot. If desired, each of these principles can be applied in different amounts, (e.g. according to different increments, different rates or other mathematical treatment). It is generally preferred that the minimum price increases as the probability for a hit in the geographical area increases, and the minimum price should also go up as the total dollars in the pot goes up. In one instance, it is generally preferred that the minimum price goes down as the number of shares potentially splitting the pot (i.e. for a particular geographic area) goes up.

As an alternative, the "derivative trading" type of financial activity can be operated according to a different structure. In this second example, the financial activity in a maturing market can be alternated (less preferably, replaced) with an "auction" form of financial activity. In one instance, the auction form of financial activity, once initiated, is scheduled to occur at different intervals. For example, multiple auctions would preferably occur periodically throughout the season, in one instance, with the time spacing between auctions being sparser (e.g. weekly or monthly) early in the process, and more frequent (e.g. multiple auctions per day) when tropical cyclones are in existence and especially when hurricanes are threatening imminently.

In one instance, the reserve price for an auction is preferably made proportional to the probability that a particular geographic area will be hit, multiplied by the funds available, and that product divided by the number of shares outstanding for that particular geographical area. If desired, the proportionality constant applied could be unity, or some number smaller or greater than one.

In another variation, researchers set out trading contracts corresponding to different geographical sections, with contract prices being set by participants, rising and falling based on their degree of confidence of where landfall will occur. The value of these contracts will rise and fall based on market acceptance of a forecasted storm occurrence.

EXAMPLES OF THE DERIVATIVE TRADINGS TYPE MODEL

Example 1

Assuming a first auction has concluded at a time in January, before the conventional "hurricane season", the "stage 1" probability, calculated as set forth herein, is 0.02. Assuming the previous financial activity sold 5000 shares for the geographical area of interest, and that collectively, all the auctions took in $25 million overall. The minimum unit price would then be (0.02)×($25 million)/5000=$100, and therefore, nobody could bid less than a $100 minimum price. If there were more takers than shares, some or all of the bidders at $100 would be out of luck.

Example 2

Assuming a time in July, when there is a tropical storm in existence, in a location that is favorable for hitting the geographical area (e.g. county of interest. The "stage 2" probability for that area is calculated as set forth herein to be 0.10. There are now 100,000 shares that have been bought for the geographical area of interest, and the total pot is $2 billion. Minimum bid price would be (0.10)×($2 billion)/100,000=$2000.

Example 3

That tropical storm contemplated in example 2 has dissipated and now poses no threat to the geographical area of interest. Also, there are currently no other storms that are threatening, and the probability drops back to 0.02. There's now $2.1 billion in the pot and 105,000 shares have been bought for the geographical area of interest. The minimum bid price has gone down because the probability has gone down: (0.02)×($2.1 billion)/105,000=$400.

In each of the examples above, there would preferably be separate auctions for each geographical area in play (with one or more auctions for each geographical area), with the degree of investor interest determining whether and/or how much the price would rise above the levels indicated. Also, it is generally preferred that the number of units on offer at any one time would be limited to a fixed number, it being expected that, if the total offer is unlimited, there would be no incentive to bid higher than the reserve price.

If desired, special treatment could be given later in a financial activity season when it becomes clear that certain geographical areas are unlikely to ever be perceived as generating substantial investor interest (e.g. inland geographical areas that historically have not, or only very rarely, been hit.

"Hurricane Funds" Example

I. Summary

The following is one example of financial activity according to principles of the present invention. As mentioned, the present invention contemplates different types of financial activity models. The following example is given in terms of a financial activity model of the type comprising a game of skill, although many of the principles set forth herein are applicable to other financial activity models, as well. The financial activity contemplated herein is generally referred to as "Hurricane Funds", emphasizing the investment nature of the financial activity as a hedge against unforeseen loss. In the example given, the Hurricane Funds are games of skill that focus on a particular type of natural event, namely hurricanes making landfall in the United States. That is, in this example, only tropical cyclones having a strength meeting the minimum criteria to be termed "hurricanes" are considered.

It is recognized that a tropical cyclone originates at sea, and grows in intensity over time, before making landfall. It is possible that the intensity of the tropical cyclone may rise and fall. The criteria chosen here is that the tropical cyclone have a minimum category one hurricane intensity at the time of landfall. The Hurricane Funds are structured to allow "participants" or "investors" to use them in a way that can augment hurricane insurance, while simultaneously providing income to participating states to help defray costs associated with disaster management. Homeowners and business insurance policies typically contain deductible provisions ranging from 2% to 15% of a home's value. In addition, these same policies do not provide any coverage for the outside areas of a home or business, such as landscaping, outside lighting, docks, fencing and the like. Often, property owners do not have sufficient flood insurance and have other omissions or insufficient coverage which result in catastrophic financial losses in even the lowest rated hurricanes. Also, losses are suffered when rates are lost and also, where temporary housing is needed.

Because financial activities according to principles of the present invention can be carried out according to different financial models. The Hurricane Funds, as an example of financial activities according to principles of the present invention, can be distinguished from insurance instruments, with payouts for qualifying investments not being tied to actual property losses, and thus being dispensed more quickly. Payouts here do not involve inspection by adjusters, and therefore can be made much more promptly—(e.g. within a few weeks). This promptness and flexibility can be achieved because the Hurricane Funds operate in a way that emphasis is placed on payouts that primarily depend upon apportioning Hurricane Funds that have been invested into a particular Hurricane Fund, and on the amounts and timing of Hurricane Fund entries for counties that experience a hurricane strike.

As mentioned above, financial activities may be constructed around models that cover the natural event activity either on an event by event basis, or on a "seasonal" basis for events occurring during a predefined span of time. In the example given above, choice was made to operate on the "seasonal" basis. Accordingly, the number of Hurricane Funds in which investors may participate can vary from year to year. Initially, two or three Hurricane Funds are opened to investment, beginning on 1 January. Each of these initial Hurricane Funds relate to one of the first two or three tropical cyclones passing over a portion of the U.S. with at least hurricane-force winds during the upcoming calendar year, as determined, in one instance, from the tropical cyclone Advisories issued by the National Hurricane Center (NHC). The overwhelming majority of these events occur during the span of time, popularly referred to as the "hurricane season" (1 June through 30 November). In active hurricane seasons, additional Hurricane Funds may be opened as the hurricane season progresses.

Each investment in a Hurricane Fund is preferably made in the form of shares purchased for one or more of the approximate 1155 counties (or county equivalents, for example Louisiana parishes) that are plausible hurricane targets. When these shares have been purchased for counties that later receive a hurricane strike, they qualify their owners to receive payouts from that Hurricane Fund. All of the investments in a given Hurricane Fund, less items which may be defined in a given instance (e.g. portions designated for participating state governments and fees for Hurricane Fund management), are paid to investors in the qualifying county or counties. The formula determining these payouts accounts both for the chances of a hurricane striking the qualifying county(s), as assessed at the time a Hurricane Fund investment is made, and a reward for earlier investments into that Hurricane Fund.

II. Structure of Hurricane Fund Investments

A. Hurricane Fund Shares

Entries in the Hurricane Funds are made for individual counties, in the form of "shares" in one of the specific Hurricane Funds available for investment. The first Hurricane Fund relates to the first tropical cyclone to make landfall as a hurricane over the U.S., including Puerto Rico and the U.S. Virgin Islands; the second Hurricane Fund relates to the second hurricane striking the same area; and so on. For example, suppose the first U.S. hurricane landfall in a hypothetical year is at Galveston county, Texas, and the second is at Miami-Dade county, Florida. Shares purchased in Hurricane Fund #1 for Galveston would qualify their owners for a portion in all of the money invested in that Hurricane Fund, but investors in Hurricane Fund #1 for Miami-Dade would receive nothing from that Hurricane Fund. On the other hand, investors in Hurricane Fund #2 for Miami-Dade would be entitled to a portion of all of the money invested in that Hurricane Fund, whereas Galveston investors in Hurricane Fund #2 would receive nothing from that Hurricane Fund.

Figure 13:
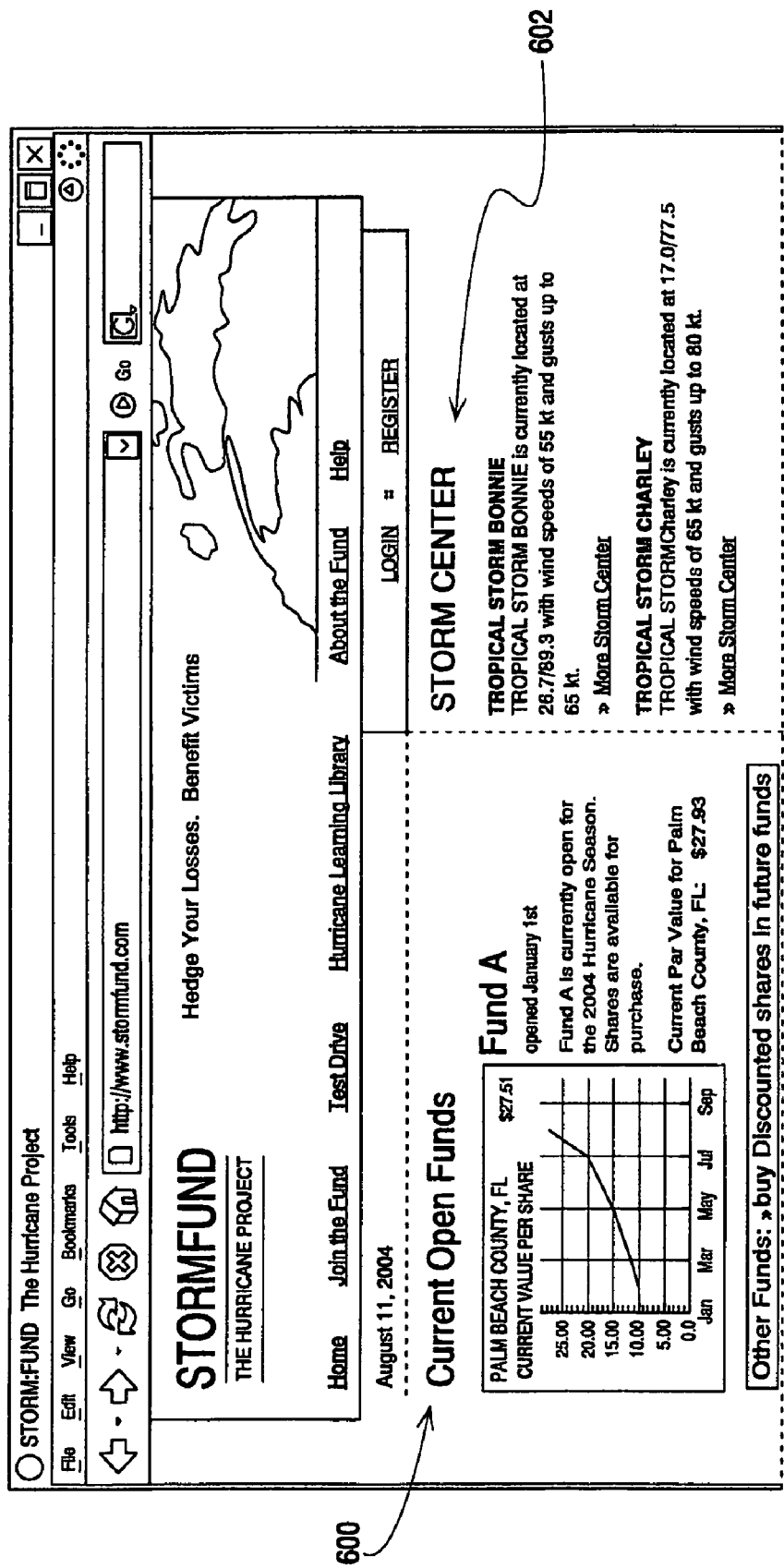
FIGS. 13-18 are graphical depictions of data screens implementing a financial activity according to principles of the present invention.
Figure 14:
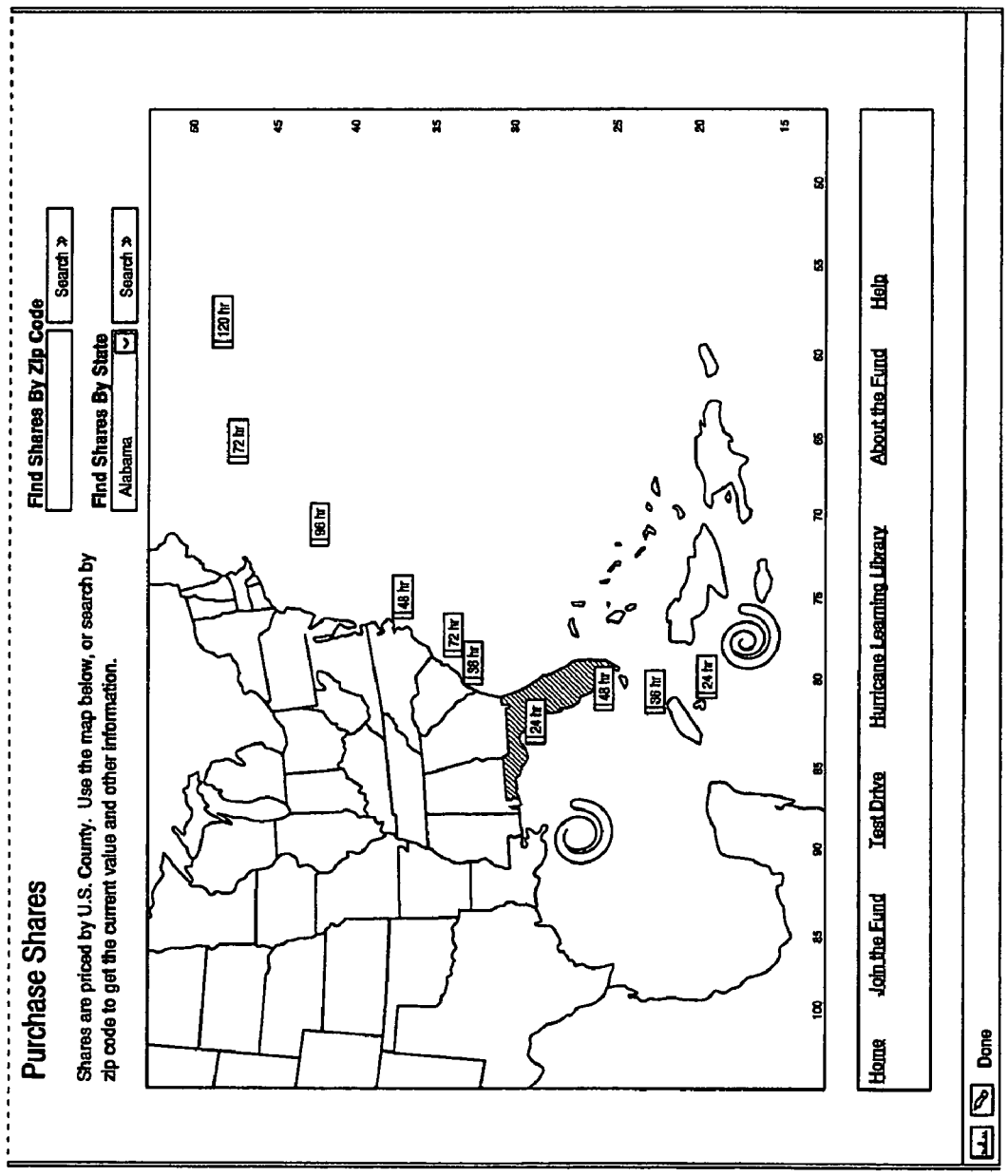
Figure 15:
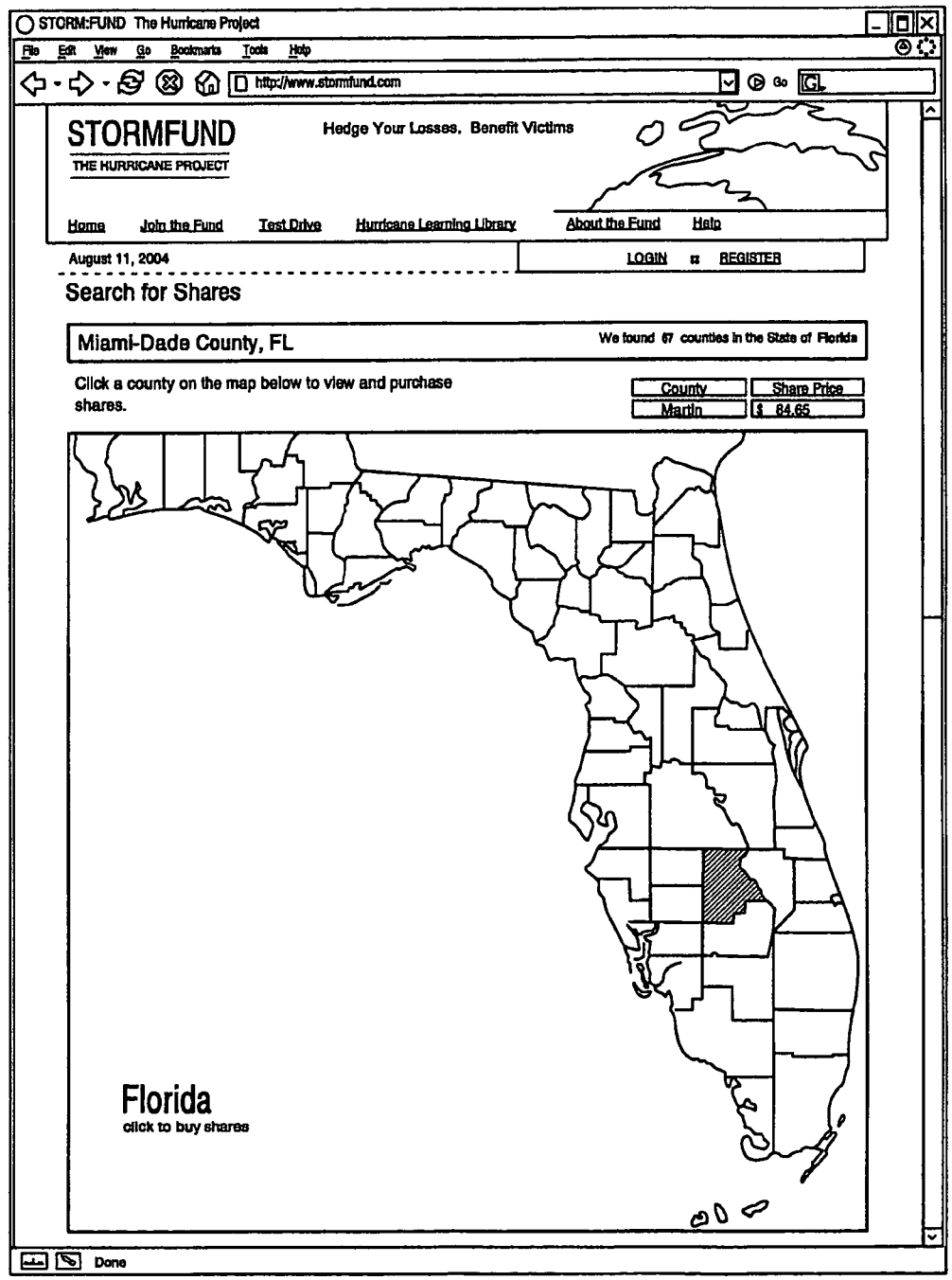

The primary means of making Hurricane Funds investments will, in one example, be by credit card, through a Hurricane Funds website. One example of a web site is given in FIGS. 13-18, which shows a "StormFund" web site implementing a Hurricane Fund financial activity. FIG. 13 shows a web site screen which serves either as a welcome page or one of the first pages that a participant will encounter upon acquiring the web site. Included in the screen depicted in FIG. 13 is an indication 600 of the current open Hurricane Funds and a brief summary 602 of current tropical cyclone activity.

In one instance, in addition to providing web site access, the present invention also provides that individuals who do not have internet access will be able to participate in the Hurricane Funds by using touch screen displays located at convenience stores, gas stations and the like. Individuals will make selections by touching an interactive screen, for example, and pay for their investment by swiping a credit card or providing a cash payment to the retail establishment. Preferably, the display will automatically generate a printed receipt (including identification number) for both credit card and cash purchases. A social security number and perhaps a biometric device such as a fingerprint scan may be required to participate in the Hurricane Fund.

Figure 16A:
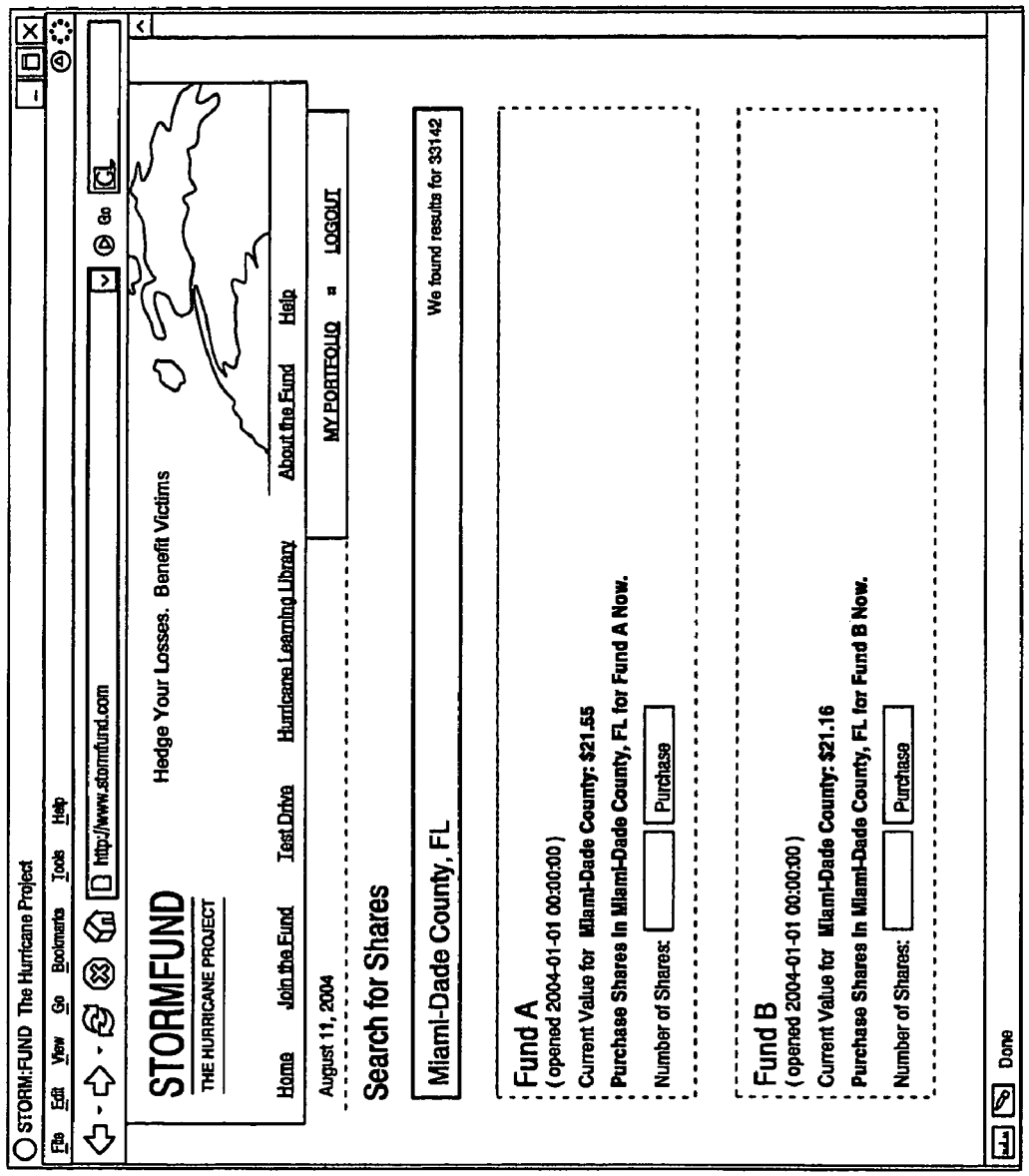
Figure 17:
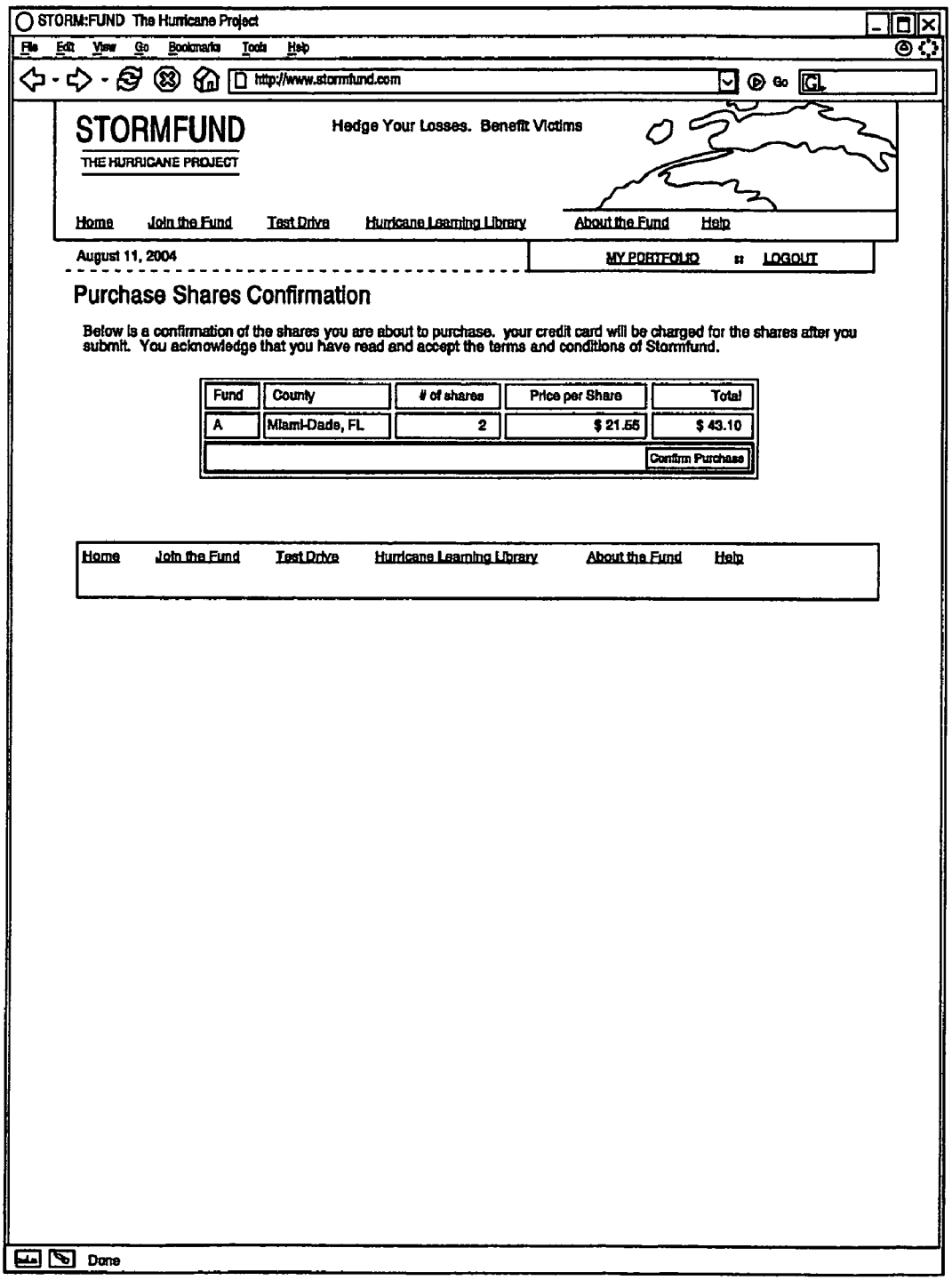
Figure 18:
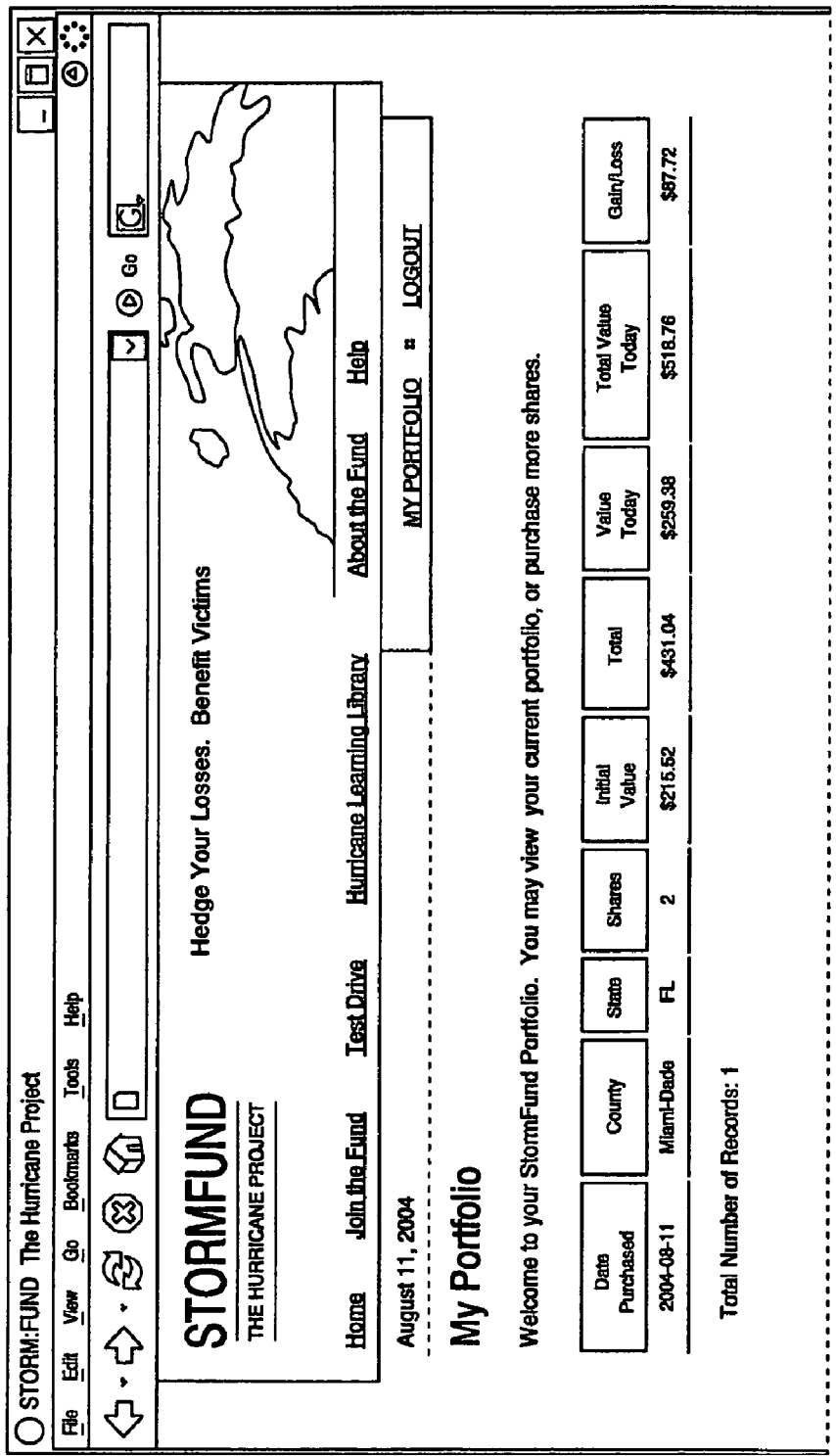

FIGS. 16-18 show share purchases for the StormFund web site implementation of a Hurricane Fund. In FIGS. 16a and 16b-16c two screens are shown for purchasing shares and in FIG. 17 a confirmation is given for shares purchased. In FIG. 18, a summary or "portfolio" of all transactions for a participant is shown.

Once an investment in a Hurricane Fund is made, the investment preferably cannot be reversed as these would affect the value of the shares purchased by others. In one instance, an investment is not considered to have been accepted until the investor's credit card company credits that investment in the Hurricane Fund. If the credit card company later reverses that payment to the Hurricane Fund, the value of the shares purchased in the Hurricane Fund will be preferably set to zero.

B. Share Prices

The price of a Hurricane Fund share for a particular county is, in one instance, determined by a mathematical formula involving both the probability of that county being hit, and price discounts for early investments. Therefore, share prices in Hurricane Funds will be different at different times, and different for different counties at a particular time. The price incentives for early investment may be substantial, and are designed to encourage investments before any tropical events are in existence, and indeed well before the beginning of hurricane season. It is anticipated that much of the early investment activity will come from investors who may want to use the Hurricane Funds to supplement conventional insurance, or from insurers using the Hurricane Funds as a reinsurance vehicle. One purpose of financially penalizing later investments is to obtain the greatest amount of money in the Hurricane Fund as possible, by encouraging early investing and discouraging procrastination.

Share prices are preferably higher when hurricane strike probabilities are higher, and lower when hurricane strike probabilities are lower. Specific details of the pricing formula will preferably be made available on the Hurricane Funds website, for those who may be interested. Factors influencing the pricing probabilities include the following:

1. The location of the county for which the investment is being made. For example, counties in south Florida are historically more likely to be hit than are counties in Massachusetts, on average, and so share prices for Florida counties will usually be higher.
2. The size of the county. Larger counties present bigger targets, and so shares in larger counties will generally be more costly.
3. Which of the Hurricane Funds an investment is made in. For example, shares in Hurricane Fund #2 cost less than shares in Hurricane Fund #1, other factors being equal, because it is more likely for one U.S hurricane to occur in a given year than for two such events to occur.
4. The location(s) and strength(s) of tropical cyclones in the Atlantic Ocean, Caribbean Sea, and/or Gulf of Mexico, that potentially threaten the United States.

Such storms in some locations are more likely to affect particular counties as hurricanes, based on a historical climatological analysis of more than a century of hurricane data, and share prices for such counties will increase accordingly. Once a tropical depression is announced by the National Hurricane Center, and continuing through the intensification of the storm, share prices continue to increase each time a storm is upgraded in strength, because threats to land are larger for stronger storms. This aspect of the share pricing is intended to prevent persons who now have knowledge of a currently existing storm from being unfairly rewarded by having this information, relative to early Hurricane Fund investors.

C. Opening and Closing Hurricane Funds

The number of Hurricane Funds that may be opened to investment is at the discretion of the Hurricane Funds management or provider. It is anticipated that two or three Hurricane Funds will be opened on January 1st of each year. These Hurricane Funds pertain to possible U.S. hurricane landfalls during that calendar year, whether or not they occur during the generally recognized "hurricane season" (June 1st through November 30th). At the discretion of the Hurricane Funds Administrators, additional Hurricane Funds may be opened before the beginning of the "hurricane season," for example if an unusually large number of hurricanes may be forecast to occur in that year. Similarly, additional Hurricane Funds may be opened to investment during the hurricane season, particularly if previously open Hurricane Funds have all been closed by hurricane landfalls (preferably, measured by the eye of the hurricane hitting land), or by imminent possible hurricane landfalls.

Hurricane Funds will preferably be closed to further investment when the storm to which they pertain is sufficiently close to landfall, according to the current NHC Advisories for that storm. Preferably, persons should leave home and not participate in the Hurricane Funds activity, when told to evacuate. The exact trigger for Hurricane Fund closings preferably strikes a balance between public safety (not discouraging prudent evacuation by remaining open too long) and broad participation (not cutting off investments before a given storm is an imminent threat). A possible compromise could be to trigger a Hurricane Fund closure when its tropical cyclone is both at hurricane strength and has generated NHC hurricane warnings for one or more of the counties for which Hurricane Fund investments may be made. In addition, for fast-moving and/or rapidly developing hurricanes, Hurricane Funds would be closed when the operational estimate of its track, as published in the relevant NHC Advisory, has traversed at least one of the counties for which Hurricane Fund investments may be made.

Because Puerto Rico and the U.S. Virgin Islands are relatively far from the U.S. mainland, a Hurricane Fund may be closed for these two territories without it necessarily being closed for the rest of the U.S. In such cases, shares for counties in the conterminous U.S. that are subsequently traversed by the same storm at hurricane strength will also qualify to receive payouts from that Hurricane Fund. However, a Hurricane Fund that is closed because of storm proximity to or landfall on the U.S. mainland will preferably also close for Puerto Rico and the U.S. Virgin Islands.

III. Hurricane Fund Payouts

A. Disbursements to Qualifying Shares

Preferably, all of the money invested in a given Hurricane Fund, less fixed percentages for participating state governments (to help support emergency management efforts) and for Hurricane Fund management, is divided equally among Qualifying Shares. A Qualifying Share is a share purchased for a county that is subsequently hit by the hurricane to which that Hurricane Fund pertains. Therefore early investors, whose Qualifying Shares were purchased relatively cheaply, will realize larger returns on their investments than will later investors, for whom the share prices were higher. To the extent possible, disbursements from Hurricane Funds to holders of Qualifying Shares will preferably be made by posting the amounts to the credit card account from which the investment was originally made. This mechanism has the advantage that the disbursements will be available very quickly, to people who may need these financial resources for rebuilding or other hurricane-related expenses. For example, individuals who may be displaced by extended evacuation from their homes may have especially acute needs for these payouts. These problems are magnified by loss of jobs. It may be necessary to withhold portions of large disbursements on behalf of the IRS.

B. Determination of Qualifying Shares

For the purposes of determining Qualifying Shares in Hurricane Funds, counties are considered to have been "hit" in one instance if the track of the center of the hurricane as determined from the NHC Forecast, Public, or Special Advisories for that storm (or, e.g. within, +/−20 nautical miles) passes through some portion of that county. The basic information in the NHC Advisories that is used to determine Qualifying Shares in this exemplary instance are the storm positions (latitude and longitude) and strengths (maximum sustained winds), that are reported to have occurred at particular times. These location points will preferably be connected by straight-line segments (or, optionally curves calculated from a formula in operational use at NHC or otherwise made public, and preferably mentioned by reference on the Hurricane Fund website). Shares in counties traversed by a track so calculated, between two consecutive positions at which the storm was at hurricane strength (maximum sustained wind of 64 kt, or 74 mph), will, in this instance, be Qualifying Shares. For this purpose, the geographical extent of counties will be defined for example by the Cartographic Boundary Files of the U.S. Census Bureau, that are published at http://www.census.gov/geo/www/cob/co2000.html. These definitions could also be modified to allow shares in counties affected by stronger hurricanes (Category 2+ hurricanes, as indicated by maximum sustained winds reported in the NHC Advisories) to return a larger share of Hurricane Fund assets to their investors.

Preferably, it should be pointed out to Investors in Hurricane Funds that these rules for determining Qualifying Shares have been somewhat idealized, relative to real-world hurricane behavior, in the interest of having a promptly available, clear, explicit and automatic way of disbursing Hurricane Fund assets to Qualifying Shares. In particular, a few points should be noted. The first point is that: there will often be counties experiencing hurricane-force winds and/or other hurricane impacts that nevertheless do not qualify as having been "hit" according to the definition used by the Hurricane Funds. This will be the case especially for the larger and more powerful storms. Hurricane Fund investors whose intention is to, in effect, supplement their insurance coverage are therefore encouraged to invest in surrounding counties also. To encourage investors to protect themselves, the Hurricane Funds site will automatically flash or change color for several counties which border the county initially selected and urge our investors to spread their investment to include surrounding (collar) counties. In this manner, the investor will, in this instance, have greater opportunity to collect from the Hurricane Funds actively if damage occurs, but the eye of the hurricane does not enter their county.

The second point is that, because qualifying counties are determined on the basis of storm positions only at particular, and possibly irregular times, small discrepancies between the calculated track (used to determine Qualifying Shares) and the actual track (as determined some months later in the official NHC Tropical Cyclone Report for that storm, or that might be evident at the time of the storm from a series of weather-radar images, for example) can and will occur. Again, it may be advisable for some individuals to invest in nearby counties, in addition to the county(s) in which they have the most interest.

As a third point, the U.S. Census Bureau data files are only approximations to the true geographical outlines of many counties. They consist of a collection of line segments, and so will not accurately follow curving county boundaries. In addition, portions of some counties (particularly relatively small islands) are not included in the Census Bureau's Cartographic Boundary Files. For example, the Dry Tortugas are not included in the Cartographic Boundary File for Florida, so that a hurricane passing over this portion of Monroe county, Florida, would not by itself constitute a "hit" on Monroe county for the purpose of determining Qualifying Shares.

In cases where there may be multiple tropical cyclones in existence at the same time, an explicit rule deciding which storm pertains to which Hurricane Fund is needed, if more than one of them eventually affects the U.S. as a hurricane. Priority can be determined according to the time of landfall on at least one of the counties for which Hurricane Funds investments may be made. For example, if the hypothetical hurricane "Bob" makes U.S. landfall ahead of hypothetical hurricane "Alice," "Bob" would be assigned to Hurricane Fund #1, and "Alice" would be assigned to Hurricane Fund # 2. It is anticipated that payouts to Qualifying Shares will be made within two weeks of the final NHC Advisory for the storm in question. In unusual cases, such as for storms that may have the potential to reintensify and affect the U.S. again, Hurricane Fund payouts may be delayed beyond two weeks at the sole discretion of the Hurricane Funds Administrators. In all cases, Hurricane Funds disbursements will preferably be made on the basis of the best and most recent information available from the National Hurricane Center at that time about the storm in question, and will not be subject to revision in the event of subsequent updates to that information.

IV. The Hurricane Funds Website

With reference to FIGS. 13-18, the Hurricane Fund's activity, in one instance, will be administered through a website that calculates share prices automatically, according to information from NHC Advisories that are updated at least 4 times daily when one or more Atlantic tropical cyclones are present, and receives payments from investors' credit card accounts. Preferably, first-time entrants will need to register. Password protection will preferably be employed for credit-card accounts associated with each registration, to facilitate any eventual payouts that may need to be made to that account. Social Security information will preferably be required as part of the registration, in order for state and national government agencies to track tax liability on any payouts.

Current share prices for all available counties can be displayed both graphically and in tabular form. With reference to the schematic screen depictions of FIGS. 14 and 15, clickable maps (coastal area, and individual state) are made available, with share prices indicated approximately with a color code. Preferably, state-by-state pulldown menus (not shown) are also provided. Participants are to be given the option of specifying their entries either in terms of shares bought, or dollars to be entered, for each county selected. Choices made by a participant are shown in shaded form in FIGS. 14 and 15.

The sums entered to date in each Hurricane Fund (and available for subsequent payout) will be posted on the Hurricane Funds website and continuously updated. For Hurricane Funds that are currently open for investment, it will be possible for site visitors to determine potential payouts for a share in any county, under various assumptions about the track of the hurricane to which that Hurricane Fund pertains. These "what if" calculations can be made available for any historical hurricanes that have crossed a county in question, or for any hypothetical hurricane track that a website visitor might be interested in.

For Hurricane Funds that have been closed to further investment, the actual hurricane track and Hurricane Fund payouts per share will preferably be listed, together with a variety of official NHC information about that storm. Until a given tropical cyclone has fully dissipated, and so has no chance of reintensifying and subsequently affecting a portion of the U.S., these estimates will be subject to revision. Because share prices will be updated (preferably at least four times daily according to the most current Advisory information from NHC), it will be necessary for the site to be unavailable for accepting investments for short, pre-scheduled, periods of time (e.g. every 6 hours). When an Atlantic tropical cyclone is relatively close to the U.S., these blackout times will be more frequent, in order to accommodate the additional NHC Advisories and to perform other necessary duties. In addition, some or all of the parts of the website may close from time to time on an unscheduled basis, in order to incorporate new information that is occasionally provided by NHC at times other than the usual Advisory schedules. These additional blackout periods will also allow time for the new information to be disseminated to interested parties. In one instance, the lengths of website blackout times will depend on the speed with which the NHC advisories can be obtained, and their information transformed to updated hurricane probabilities for the Hurricane Funds. Even when there are no Atlantic tropical cyclones in existence, share prices will preferably be updated during the regular (e.g. 6-hourly) blackout periods, with decreasing of the early-entry discount by a small amount.

When choosing to purchase shares for a particular county or neighboring counties, it is preferable to encourage investors to thoroughly familiarize themselves with as much data on hurricanes as is publicly available. To assist in this effort, helpful weather-related links may be provided on the Hurricane Funds website, as well as other educational information that might be helpful. For example, a graphical history of storms which have occurred during the last 113 years and their associated tracks may be provided to investors and other participants.

V. Disposition of Hurricane Fund Assets When No U.S. Landfalling Hurricane Occurs It can happen that a Hurricane Fund will be closed by the imminent approach of a hurricane which subsequently fails to pass over any U.S. land area, according to the definition of a "hit" used by the Hurricane Funds (e.g. Hurricane Ophelia (2005) would have been one such case). The Hurricane Funds need to have a clear and automatic rule for the disposition of the assets of such Hurricane Funds. Some possibilities are:

1. Transfer all assets and share ownerships to the next Hurricane Fund. For example, if Hurricane Ophelia had closed Hurricane Fund #3 in 2005, all investments made in Hurricane Fund #3 would be transferred to Hurricane Fund #4. Shares in Hurricane Fund #4 would then include those reflecting previous investments in Hurricane Fund #4, in addition to those purchased by investments in (the now closed) Hurricane Fund #3. Assets of the combined Hurricane Fund #4 would then have been paid to shares for counties qualifying according to the path of Hurricane Rita, regardless of whether they represented investments in Hurricane Fund #3 or Hurricane Fund #4.
2. Transfer the assets, but not the share ownership, to the next Hurricane Fund. Here, the money invested in Hurricane Fund #3 for the hurricane that eventually turned out to be Ophelia would have been transferred to Hurricane Fund #4 and paid according to the track of hurricane Rita, but shares purchased in the original Hurricane Fund #3 in this example, would not qualify for any disbursements.
3. Another rule will be needed to govern assets of Hurricane Funds remaining open at the end of the year. If desired, one of the above options, (although not necessarily the same as that governing mid-season Hurricane Fund closures) or perhaps, some other option could be chosen for fund disposition.
4. The funds can be returned to participants, less management costs, if desired.

Detailed Consideration of the "Hurricane Funds" Example
I. Introduction

The following is a detailed consideration of the Hurricane Funds example given above. In one example, the number of hurricane funds in which players may participate varies from year to year. Initially, K hurricane funds are opened, beginning on 1 January of the year before the hurricane season in question. Each of these relate to one of the first K tropical cyclones passing over a portion of the U.S. with at least hurricane-force winds, as determined by the National Hurricane Center or its successors, during the hurricane season (1 June through 30 November). In relatively active years, additional hurricane funds may be opened as the hurricane season progresses. The Hurricane Funds entered in a given natural event, less portions for state participation and hurricane fund management, are paid to entrants according to a formula that accounts both for the chances of each hurricane striking the qualifying county(s), as assessed at the time a participant entry is made.

II. Structure of the Hurricane Funds
A. One Example of Hurricane Fund Shares

Entries (investments) in the Hurricane Funds may be made for individual counties, in the form of "shares." The price of a share varies in one instance, according to the probability of a hurricane strike on the county for which the entry is made, using information available at the time the entry is made, and modified by a discount factor that encourages early entries and penalizes later entries. Shares are priced relative to a benchmark, or "par" value, defined by an entry for the most vulnerable county historically, (Palm Beach, Fla.) made at the beginning of the hurricane season (1 June). Choice of Palm Beach county as the par level is arbitrary because all of the share values are relative; but this choice may have investor appeal, in that the prices of entries for all other counties will then reflect an apparent discount.

The reference probability for a hurricane strike on Palm Beach county, as well as reference probabilities for the other n counties for which entries are accepted, has been derived from a climatological analysis of U.S. landfalling hurricanes that occurred from the late $19^{th}$ century through the present. This type of analysis can specify the probability that the center of a hurricane-force tropical cyclone will pass within 75 nautical miles (86.25 statute miles) of the county center in a given year. These values can be adjusted for the size of a county by estimating the probability that a hurricane will track through the county in a given year, assuming that the county has a circular shape. Defining the probability of passage within 75 n. mi. of county i as $Q_i$, the size-adjusted annual climatological hurricane strike probability is, according to the following Equation (1):

$$Q_i^* = Q_i \frac{2(A_i/\pi)^{1/2}}{2 \cdot 87.25} = 0.006541 \, A_i^{1/2} Q_i, \quad (1)$$

where $A_i$ is the area of the county, in square statute miles. The 87.25 mile counting radius is used to smooth the somewhat erratic historical record of hurricane tracks.

Figure 19:
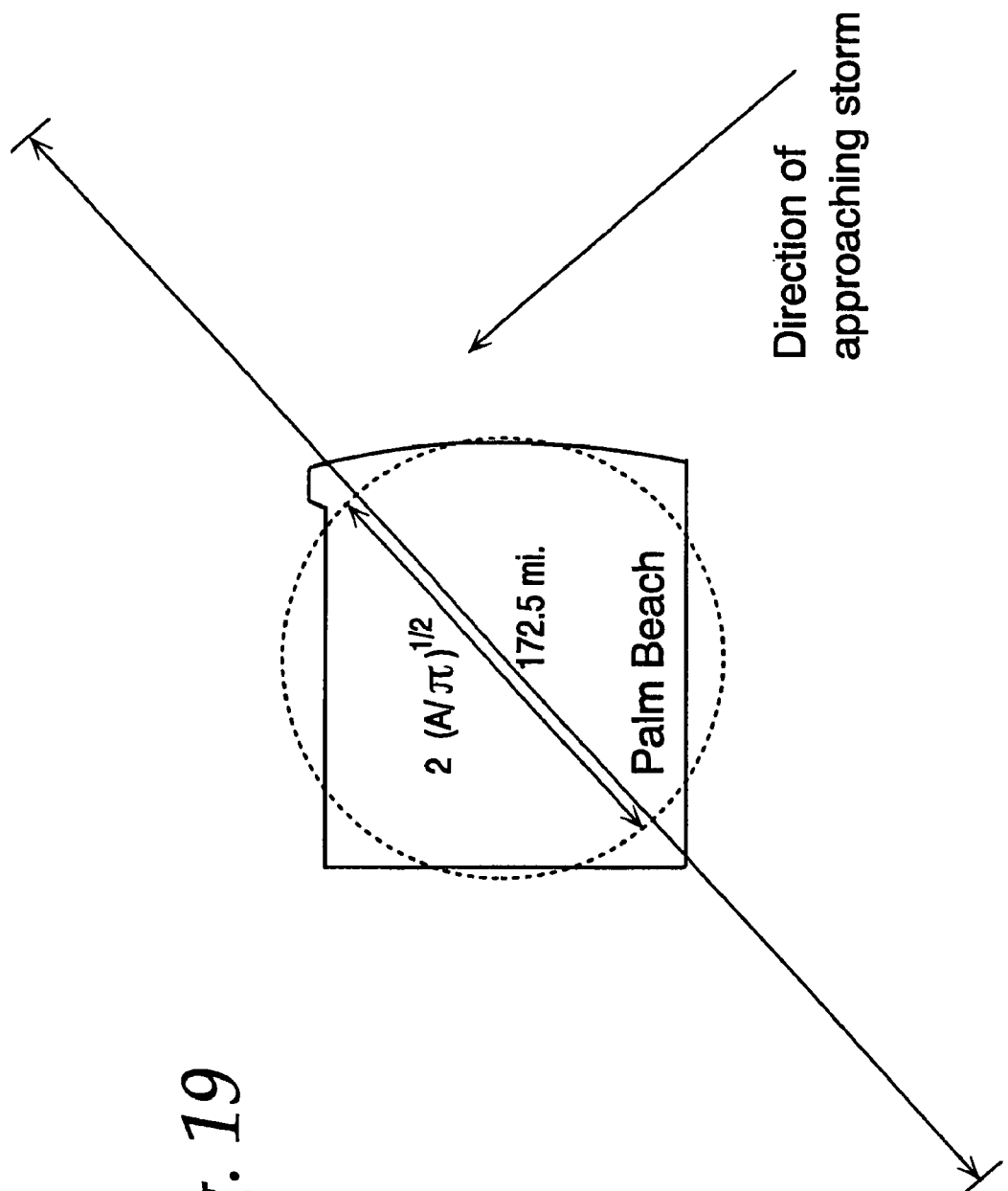
FIG. 19 is a schematic drawing illustrating treatment given to a unit area addressed in an exemplary financial activity.

Referring now to FIG. 19 a schematic diagram indicates a preferred treatment of a geographical unit, herein, Palm Beach county, FL, with an area of approximately A=2230 sq. mi., represented by a circle of the same area (dashed). Hurricane centers passing within 86.25 miles of the county center (long arrows) have a probability of about 0.31 (ratio of the dashed circle diameter to 172.5 ml) of passing through the county itself.

FIG. 19 illustrates the geometry behind Equation (1), for the case of Palm Beach county. The area of this county is approximately A=2230 sq. mi., and the annual probability of a hurricane track within 86.25 ml. of the county center is Q=28.74%. Many storms tracking within this distance of the county center will fail to pass through the county, but the proportion that will do so is given approximately by the ratio of the diameter of the circle approximating the county (=2[A/□]$^{1/2}$=53.3 mi.) to twice the search radius defining Q, or 172.5 ml. Therefore, for this county, Q*=28.75% (53.3/172.5)=8.88%. The counties included in the Hurricane Lottery, their approximate areas, and their Q and Q* climatological values are calculated and made available for future reference.

The reference probability for a hurricane strike on Palm Beach county in any single hurricane fund is smaller than Q*/100=0.0888, because there are more than one U.S. hurricane landfalls in an average year. This average number of U.S. hurricane landfalls is □=1.7 hurricanes/year, so the Palm Beach county reference probability is, according to the following Equation (2):

$$p_{ref} = \frac{Q^*}{100\ \mu} = \frac{8.88\%}{(100)(1.7)} = 0.0522. \quad (2)$$

In addition to depending on hurricane likelihoods for a county of interest in relation to the reference probability for Palm Beach county in Equation (2), share prices also increase gradually through the time period that entries are accepted, according to daily compounding of an annualized discount rate D that is multiplied in the share pricing formula, according to the following Equation (3):

$$\text{Time-of-entry adjustment} = (1+D)^{\frac{jdate-152}{365}}. \quad (3)$$

Here jdate is the Julian date (consecutive numbering of the days of the year), so that the exponent in Equation (3) is zero, and Equation (3) produces no change in the share price, for 1 June (jdate=152). Julian days in the year prior to the hurricane season in question are negative. If the annual discount rate is 5%, then D=0.05.

Figure 20:
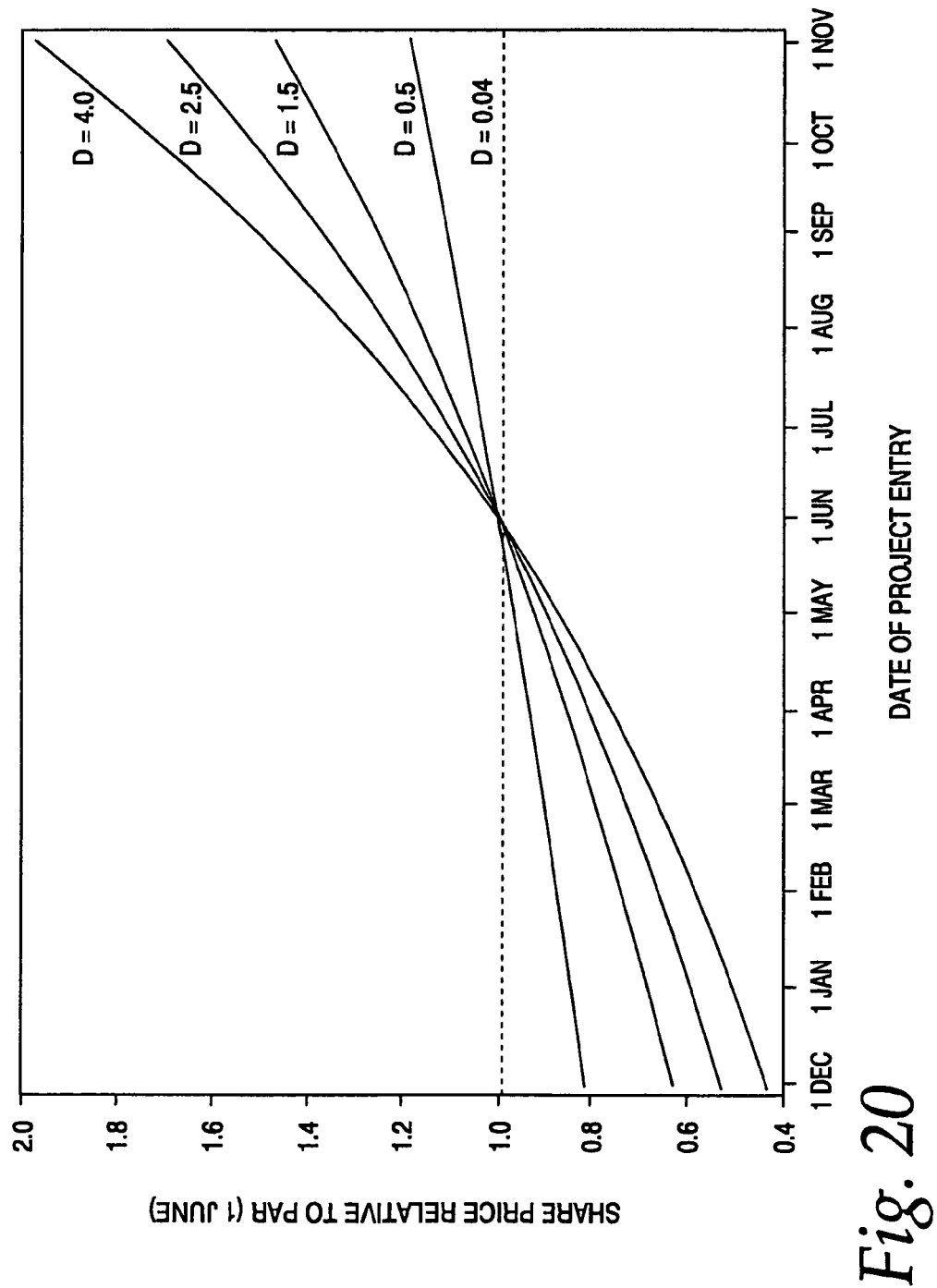
FIG. 20 is a schematic representation of the relationship between share prices and dates of participation in a financial activity, prior to occurrence of a natural event.

Adjusting share prices by multiplying by Equation (3) rewards early entries and penalizes late entries, in part as a compensation for opportunity costs. An appropriate value for the discount rate D needs to be determined, and might be varied from year to year to reflect values in then-current financial markets. However, D should also include a very substantial premium over short- or medium-term interest rates in order for this factor to have a significant effect on share prices, and so to encourage contributions to the Hurricane Funds well in advance of the beginning of hurricane season. Referring now to FIG. 20, a graphical plot shows share price, relative to par on 1 June, for five values of the annual discount rate, D. FIG. 20 indicates values of Equation (3) as a function of date of entry into the Hurricane Fund, for a range of values of D. The relative share price is 1.0 for all discount rates at the par date of 1 June. For current market rates on short-term money (D≈0.04, or 4%) the effect on share price, shown by the dashed line, is negligible. An annual discount rate of D=4.0 (i.e., 400%) is necessary to produce (for example) a price differential of approximately 15% between 1 May and 1 June.

The price per share for a particular county, i, is determined by the probability of a hurricane strike on that county, $p_i$, at the time the entry is made; and in relation to the par value for an entry on Palm Beach county (Equation 2) as of 1 June (Equation 3). These factors are combined to determine the share price using the following Equation (4):

$$\text{Price per share} = F(1+D)^{\frac{jdate-152}{365}} \frac{\ln(1-p_i)}{\ln(1-p_{ref})}. \quad (4)$$

This equation is the basic pricing tool for the hurricane funds. Here F is an arbitrary pricing factor, that could be chosen according to marketing considerations. It is the par price for one share, for Palm Beach county on 1 June. For example, F=1 corresponds to $1/share. A higher pricing factor, such as F=100 ($100/share) might have the effect of subtly encouraging some participants to enter more money in the Hurricane Fund. The second factor in Equation (4) specifies that entries made before 1 June will be cheaper, and entries made after 1 June will be more expensive, as indicated in Equation (3) and in FIG. 20. FIG. 21, table 1, shows an example of illustrative share prices, in round numbers, for a range of strike probabilities $p_i$, assuming purchase on 1 June, with F=$100/share.

Finally, Equation (4) indicates that the share price for county i depends on the probability $p_i$ relative to the reference climatological probability $p_{ref}$ for Palm Beach county, through the function –ln(1–p). This functional form has been chosen in order to obtain share prices that are economically logical, particularly toward the extremes of the probability range. For $p_i$=0, Equation (4) produces a zero share price: shares in a county are free if there is absolutely no chance for the Hurricane Fund to pay off for that county, and shares are extremely cheap for counties where the probabilities of being affected by hurricanes (e.g., in west Texas) are vanishingly small. At the other extreme, the share price approaches infinity as the probability that a hurricane will affect the county approaches 1, so that the hurricane funds offer no reward for betting on a sure thing. FIG. 21, table 1 shows the dependence of share prices (purchased on 1 June, with F=$100/share) on the strike probability $p_i$, for a few illustrative cases. According to equation (4), unless there are Atlantic tropical cyclones currently in existence, counties for which the climatological probability $Q_i^*/(100□)=p_i<p_{ref}$ (i.e., all counties except Palm Beach), the price per share will be less than F, and accordingly most participants will receive a discount in the purchase price.

III. Determination of Strike Probabilities for Equation (4)

The hurricane strike probabilities $p_i$ in Equation (4) are based on the best information available at any given time, that can reasonably be obtained in an automated way by the Hurricane Fund's website software. If no Atlantic tropical cyclones are in existence at the time of a Hurricane Fund entry, that best information will be the unconditional climatological probability of a hurricane strike on the county in question for the k$^{th}$ hurricane fund. These will be referred to in the following as "Stage I" probabilities.

Sharper probability information about hurricane strikes can be obtained when one or more Atlantic tropical cyclones are in existence, but are too far from the U.S. for probability forecasts of hurricane-force winds for counties of interest to be issued by the TPC. In such cases, the probabilities $p_i$ in Equation (4) are obtained from climatological values for each county, conditional on the existence of a tropical depression, or tropical cyclone such as a hurricane, in a given sector of ocean. These conditional climatological probabilities will be referred to as "Stage II" probabilities.

Finally, the TPC issues probability forecasts for hurricane-force winds during the upcoming 5 days. These forecasts provide the "Stage III" probabilities, when they extend over land areas of interest. To the extent that there may be more than one Atlantic tropical cyclone in existence at a given time, Stage II and/or Stage III probabilities for each need to be combined in order to evaluate $p_i$ in Equation (4).

A. Stage I Probabilities

The Stage I probabilities are obtained from climatological values, in a way that follows Equation (2) for the reference strike probability for Palm Beach county. In Equation (2), the size-corrected annual strike probability Q* is divided by the average number of strikes per year, □, to reflect the fact that more than one hurricane affects the U.S. per year, on average, and is converted from percentage to fractional probability. The Stage I probabilities are further corrected to reflect the fact that, for the second and subsequent hurricane funds, it is less likely for there to be a corresponding U.S. hurricane landfall. That is, entering the first hurricane fund is less uncertain than is entering the second hurricane fund with respect to the Stage I probabilities, and so the share prices for the first hurricane fund should be higher. Similarly, the share prices should be higher for the second hurricane fund than for the third and any subsequent hurricane funds. These adjustments are included in the calculation of the Stage I probabilities using probabilities for different numbers of landfalling hurricanes, as calculated using the Poisson distribution. This distribution is a conventional and well-accepted probability model for allocating probability among the possible numbers of hurricanes in a given year when the average number per year is □. Specifically, the Poisson probabilities for each possible number, X, of U.S. landfalling hurricanes are, according to Equation (5):

$$Pr\{X = x\} = \frac{\mu^x e^{-\mu}}{x!}, x = 0, 1, 2, \ldots \quad (5)$$

Using these Poisson probabilities with □=1.7 U.S. landfalling hurricanes per year, on average, the Stage I probabilities for the $i^{th}$ county in $k^{th}$ hurricane fund are, according to the following Equation (6):

$$p_i^{(I)} = \frac{Q_i^*}{100\,\mu} \frac{Pr\{X \leq k\}}{1 - Pr\{X = 0\}}, i = 1, \ldots, n. \quad (6)$$

When a Stage I probability is the appropriate risk estimate for county i, $p_i(1)$ is substituted for $p_i$ in Equation (4) to determine the share price. For the $k=1^{st}$ hurricane fund, the ratio of Poisson probabilities in Equation (6) is 1, so that Equation (6) for County i is exactly analogous to Equation (2) for the reference county, Palm Beach. That is, $p_{ref}$ in Equation (2) is nothing more than the Stage I probability for Palm Beach county in the first hurricane fund. For the second and subsequent hurricane funds, these Stage I probabilities are reduced to reflect the fact that the corresponding hurricanes are less likely to occur. The purpose of this second factor in Equation (6) is to provide a further price advantage to early entrants in the second and subsequent hurricane funds, which may not pay off at all, relative to entrants who wait until after the formation of what may become the $k^{th}$ landfalling hurricane before entering. FIG. 22, table 2 shows Poisson probabilities from Equation (5), calculated with μ=1.7 landfalls/year, the corresponding cumulative probabilities Pr{X≤x}, and the ratio of probabilities on the right-hand side of Equation (6). FIG. 22, table 2 shows Poisson probabilities for μ=1.7 hurricane landfalls per year, with corresponding cumulative probabilities and ratios of probabilities used in Equation (6).

B. Stage II Probabilities

When an Atlantic tropical cyclone is in existence, the Stage II probabilities $p_i^{(II)}$ associated with county i being affected by a hurricane may increase from the respective Stage I value, depending on the location and intensity of the storm. These Stage II probabilities are obtained by combining the Stage I probabilities, with conditional climatological relative frequencies of hurricane-force winds occurring within 120 n.mi. (138 statute miles) of each county center, given that a tropical cyclone that is or will eventually become a named storm (i.e., at least tropical storm strength) exists in one of 406 2.5 by 2.5 degree regions of the Atlantic ocean, Caribbean Sea, or Gulf of Mexico. These conditional relative frequencies denote one of these ocean regions in which there is a tropical cyclone as j, and the conditional probability that hurricane force winds due to this storm will eventually occur within 120 n. mi. of the center of county i as $Q_{ij}$. That is, for each ocean region j, there is a data table similar to that for the unconditional climatological values $Q_i$, although the conditional $Q_{ij}$ climatological values are calculated with a larger smoothing radius (120 vs. 75 n. mi.) because there are fewer storms from which to calculate the conditional relative frequencies. Accounting for this larger smoothing radius, the size-adjusted conditional relative frequencies $Q^*_{ij}$ are calculated, analogously to Equation (1), using the following Equation (7):

$$Q_{i,j}^* = Q_{i,j} \frac{2(A_i/\pi)^{1/2}}{2 \cdot 138} = 0.004088\, A_i^{1/2} Q_{i,j}; \quad (7)$$

$$i = 1, \ldots, n; j = 1, \ldots, 406.$$

Stage II probabilities are computed by combining these area-adjusted conditional relative frequencies with the corresponding Stage I probabilities, according to the following Equation (8):

$$p_i^{(II)} = p_i^{(I)} + q_{ij} - p_i^{(I)} q_{ij}, i=1, \ldots, n; j=1, \ldots, 406; \quad (8)$$

where, according to the following Equation (9):

$$q_{i,j} = \begin{cases} \frac{.837 Q_{i,j}^*}{100}, & \text{if the storm in ocean sector } j \text{ is a unnamed depression} \quad (9a) \\ \frac{Q_{i,j}^*}{100}, & \text{if the storm in ocean sector } j \text{ is a tropical storm} \quad (9b) \\ \frac{1.72 Q_{i,j}^*}{100}, & \text{if the storm in ocean sector } j \text{ is a hurricane.} \quad (9c) \end{cases}$$

Here, 0.837 is the proportion of tropical depressions that have gone on to at least tropical weather strength (1991-2004, reflecting current operational practice at NHC), and 1.72 is the ratio (1886-1998) of the numbers of tropical storms to hurricanes in the Atlantic basin. The purpose of Equation (9) is to reflect the fact that the existence of a hurricane is more threatening, on average, than the presence of a tropical storm, which is in turn more threatening than the presence of a tropical depression. The probability from Equation (8) is substituted for $p_i$ in Equation (4) when the Stage II risk assessment is appropriate for county i Equation (8) reflects the increase in risk, over and above the baseline risk to county i expressed by $p_i^{(I)}$, attributable to the presence of a tropical cyclone in ocean sector j. The conditional probabilities $q_{ij}$ are combined with (rather than replace) the Stage I probabilities in Equation (8), because county i continues to be at (climatological) risk for being struck by a hurricane, even if the storm in ocean sector j fails to make landfall as a hurricane. If the conditional probability $q_{ij}$ is substantial, $p_i(II)$ will be appreciably larger than $p_i(I)$. If the tropical cyclone in ocean sector j has negligible probability of affecting county i as a hurricane, Equation (8) implies $p_i^{(II)} \approx p_i^{(I)}$.

C. Stage III Probabilities

Stage III probabilities will be based on the NHC hurricane wind forecasts provided as part of the official advisory for each tropical cyclone. The system that is expected to be in place for these forecasts for the 2006, 2007, and later hurricane seasons (currently described by TPC as "experimental") will produce probability forecasts for windspeeds of at least hurricane force within the upcoming 120 hours (after each advisory), when these probabilities are at least 2.5%. Examples are shown at www.nhc.noaa.gov/feedback-pws-graphics2.shtml?.

Denote the current TPC forecast for hurricane-force winds in county i as $f_i$. Analogously to Equation (8), the Stage III probabilities are computed by combining these forecasts with the Stage I probabilities from Equation (6), again because failure of the current tropical cyclone to affect the U.S. as a hurricane does not preclude the $k^{th}$ hurricane fund from paying out for some subsequent storm. Specifically, the Stage III probabilities are computed using the following Equation (10):

$$p_i^{(III)} = p_i^{(I)} + f_i - p_i^{(I)} f_i, f_i > q_{i,j}, \quad (10a)$$

or $$p_i^{(III)} = p_i^{(II)}, f_i < q_{i,j}. \quad (10b)$$

Equation (10b) includes the possibility that the storm in question may affect a county for which $f_i = 0$, because these TPC forecasts are set to zero if the probability is smaller than 2.5%. Again the Stage III probabilities from Equation (10) are substituted for $p_i$ in Equation (4) when explicit TPC forecasts for hurricane-force winds are current for some portion of the U.S.

D. Combining Stage II and Stage III Probabilities

It can happen that two or more Atlantic tropical cyclones are in existence at the same time. In such cases, their strike probabilities for each county i need to be combined in some way, to yield the larger probability that either one or the other might affect the county in question. Let $p_i(1)$ be the probability of the first of these storms for county i, calculated using either Equation (8) or Equation (10), as appropriate. Similarly, let $p_i(2)$ be the corresponding value for the second of these storms. If there are only two such cyclones present, the combined probability $p_i$ to be used in the pricing Equation (4) is obtained using the following Equation (11)

$$p_i = p_i(1) + p_i(2) - p_i(1)p_i(2). \quad (11)$$

This probability would be applied equally to the next two hurricane funds (assuming that there are two or more) that are still active and accepting entries.

If there is a third such tropical cyclone, denote its probability for county i, calculated from the Equation appropriate to its Stage, as $p_i(3)$. The combined probability for county i in Equation (4) would then be, according to Equation (12)

$$p_i = p_i(1) + p_i(2) - p_i(3) - p_i(1)p_i(2) - p_i(1)p_i(3) - p_i(2)p_i(3) + p_i(1)p_i(2)p_i(3) \quad (12)$$

This probability would be applied to the next (up to) three hurricane funds still accepting entries.

IV. Closing Hurricane Funds

Hurricane funds cease to be available for further entries when the corresponding hurricane is sufficiently close to a U.S. land area. "Sufficiently close" could mean that either a hurricane watch or hurricane warning has been issued for a U.S. coastal county. Because Puerto Rico and the U.S. Virgin Islands are relatively far from the U.S. mainland, a hurricane fund can be closed for these two territories without it necessarily being closed for the rest of the U.S. Because of the prevailing westward tracks of tropical cyclones at low latitudes, a hurricane fund that is closed because of storm proximity to the U.S. mainland is also closed for Puerto Rico and the U.S. Virgin Islands.

V. Payout Algorithm

Shares purchased in the $k^{th}$ hurricane fund for counties traversed by the $k^{th}$ U.S. landfalling hurricane are "qualifying shares." In one instance, these countries are defined by the NHC operational adversaries. In another instance, these counties are defined as those containing a "best track" hurricane position, or a portion of a line connecting two "best track" hurricane positions, as portrayed in the "best track" Table of the official TPC Tropical Cyclone Report for that storm. Payouts are preferably determined by dividing the available Hurricane Funds (e.g. participant entries less state and management percentages) by the number of qualifying shares, and paying that amount for each qualifying share.

In cases where there may be multiple tropical cyclones in existence at the same time, priority is determined according to time of first U.S. landfall. For example, if the hypothetical hurricane "Alice" makes landfall after hurricane "Bob," "Bob" would be assigned to Fund 1 and "Alice" would be assigned to Fund 2.

It is anticipated that payouts to Qualifying Shares will be made within two weeks of the final NHC Advisory for the storm in question. In unusual cases, such as for storms that may have the potential to reintensify and affect the U.S. again, Fund payouts may be delayed beyond two weeks at the sole discretion of the Funds Administrators. In all cases, Funds disbursements will be made on the basis of the best and most recent information available from the National Hurricane Center at that time about the storm in question, and will not be subject to revision in the event of subsequent updates to that information.

Caveats Regarding Fund Payouts

The above rules for determining Qualifying Shares have been somewhat idealized, relative to real-world hurricane behavior, in the interest of having a promptly available, clear, explicit and automatic way of disbursing Fund assets to Qualifying Shares. In particular:

There will often be counties experiencing hurricane-force winds and/or other hurricane impacts that nevertheless do not qualify as having been "hit" according to the definition used by the Hurricane Funds. This will be the case especially for the larger and more powerful storms. Fund investors whose intention is to, in effect, supplement their insurance coverage will therefore be encouraged to invest in surrounding counties also. To encourage investors to protect themselves, the Funds site will automatically flash several counties which border the county initially selected and urge investors to spread their investment to include surrounding counties. In this manner, which we call a "collar" the investor will have greater opportunity to collect funds if damage occurs but the eye of the hurricane does not enter their county.

Because qualifying counties are determined on the basis of storm positions only at particular, and possibly irregular times, small discrepancies between the calculated track (used to determine Qualifying Shares) and the actual track (as determined some months later in the official NHC Tropical Cyclone Report for that storm, or that might be evident at the time of the storm from a series of weather-radar images, for example) can and will occur.

Again, it may be advisable for some individuals to invest in nearby counties, in addition to the county(s) in which they have the most interest.

The U.S. Census Bureau data files are only approximations to the true geographical outlines of many counties. They consist of a collection of line segments, and so will not accurately follow curving county boundaries. In addition, portions of some counties (particularly relatively small islands) are not included in the Census Bureau's Cartographic Boundary Files. For example, the Dry Tortugas are not included in the Cartographic Boundary File for Florida, so that a hurricane passing over this portion of Monroe county, Florida, would not by itself constitute a "hit" on Monroe county for the purpose of determining Qualifying Shares.

VI. Website Features

The Hurricane Fund will preferably be run through a website that calculates share prices automatically, according to information from TPC advisories that are updated four times daily. Accordingly, it will be necessary for the site to be unavailable for accepting entries for short, pre-scheduled, periods of time every 6 hours for example. In addition, the website may need to be able to close from time to time on an unscheduled basis, in order to incorporate new information that is occasionally provided by the TPC at other than the scheduled 6-hourly update times. The lengths of these website blackout times will depend on the speed with which the NHC advisories can be obtained, and their information transformed to updated hurricane probabilities for the hurricane fund. Even when there are no Atlantic tropical cyclones in existence, share prices will be updated during the regular blackout periods, by incrementing the date, jdate in Equation (4), by 0.25, four times daily.

Preferably, first-time entrants will need to register. Password protection will be preferred if a single credit-card account is to be associated with each registration, in order for any eventual payouts to be made to that account. SSN information is preferably made part of the registration in order for the IRS (and possibly also some states) to track tax liability on any payouts.

Current share prices for all available counties are preferably displayed both graphically and in tabular form. Clickable maps (whole-coast, and individual state) are also preferably made available, with share prices indicated approximately with a color code. State-by-state pulldown menus could also be provided if desired. Participants are preferably given the option of specifying their entries either in terms of shares bought, or dollars to be entered, for each county selected.

Preferably, a whole-state entry can be defined by automatically issuing an equal number of shares for each county in play, within the state in question. This approach would place more money on counties more likely to be affected, and so would severely down-weight essentially zero-probability counties, such as those in west Texas. Here the number of shares bought for each county is simply the dollar amount to be entered, divided by the sum of share prices according to Equation (4), over all counties in that state.

The sums entered to date in each hurricane fund (and available for subsequent payout) are preferably posted and continuously updated. However, it may be difficult to calculate for potential entrants the possible payoffs for particular entries that they are contemplating, because those payoffs will depend on the track of the eventual storm in question.

VII. Algorithm Parameters

As noted above, several parameters in the share price algorithm are adjustable. In one example these parameters could be defined before the beginning of a given year's hurricane funds as follows. These exemplary parameters are:

K=# of hurricane funds that will be opened initially.
n=# of counties in the game
D=discount rate (as discussed above)
F=pricing factor (as discussed above)

The choice for the number, K, of initial hurricane funds to be run involves a tradeoff between numbers of years when one or more hurricane funds do not pay off, versus numbers of years when there are more U.S. landfalling hurricanes than initial hurricane funds. Using the Poisson probabilities from FIG. 21 table 1, these tradeoffs are approximately as indicated in FIG. 23, table 3.

If all counties in an included state will be in play, it is necessary only to specify the states to be considered in order to determine n. For example Oklahoma has a single county with $Q \neq 0$, and Kentucky has seven. All eight of these have $Q=0.01$. Accordingly, it is preferred that these states not be included in the financial activity. A large number of effectively irrelevant counties may also be excluded under this plan, especially in Texas, but also in Arkansas and Tennessee.

Preferred Characteristics

As noted above, a number of different alternatives and variations in conducting financial activities according to principles of the present invention are possible. The following discusses representative alternatives and variations which are preferred, but not necessarily required, when conducting financial activities according to principles of the present invention. Although the following exemplary preferred characteristics may, generally speaking, be compatible with one another, it is possible that any number of these characteristics could be made inconsistent with, or mutually exclusive of other characteristics. These exemplary characteristics include:

1. Variability factors affecting at least one of said investment price and said distribution/payout. It is generally preferred that variability factors include, at least a consideration of the time interval between investment and event occurrence and a defined probability of predicted outcome, preferably set at the time of investment. Other variability factors may also be incorporated.
2. Prices charged to participants for their chosen investments preferably continually change due, for example, to the variability factors at play at a given time. In general, it is preferred that there be no elimination of price changes to shorten processing delays, or for other reasons.
3. Prices at any given time for any predicted outcome are preferably made to be the same for all participants.
4. Payouts to successful, qualifying participants are preferably made according to the same set of rules which apply to all participants. Generally speaking, it is preferred that no rewards be given for preferred participants.
5. All winners (qualifying participants) share the pot. That is, it is generally preferred that there are no odds multiplying a participant's investment. Also, it is generally preferred that payouts are not made from the provider's personal account—unlike the "House" of certain gambling activities which pays out winning bets from its own account.
6. Provider does not engage as a participant. For example, it is generally preferred it that there be no hedging where, for example, there may be excessive bidding.
7. Participants do not compete against the "house" i.e. the provider.

8. It is generally preferred that financial activity not be altered in response to the amount of investment activity.
9. Financial activity encompasses a single event or type of event over a given "season".
10. It is generally preferred that the participants be able to objectively and independently observe the events for themselves, as they unfold.
11. It is generally preferred that, apart from financial responsibility, a participant's investment be "accepted" only in terms of data format. Optionally, acceptance can be related to an optional investment cap. It is generally preferred that there be no extra qualification for each investment occurrence.
12. It is generally preferred that financial activity be carried out as much as possible in real-time, and that this be made possible by virtue of rules definitions, especially definitions of events and event outcomes which occur in a well defined environment/system. It is generally preferred that the selection of events for the financial activity be limited to an absolute minimum—i.e. a single event.
13. It is generally preferred that the financial activity be restricted to tropical weather events, and in one instance, only to hurricane events.
14. It is generally preferred that the financial activity be further restricted to events comprising at least one of said landfall and said land track. It may also be preferable in certain instances to limit financial activity to hurricanes having a certain category strength at some defined time during the ongoing financial activity.
15. It is preferable, in certain instances, that multiple stages of probability assessment be applied to at least one of said investment and said payout.
16. It is preferable in certain instances that the external objective independent information source be limited to the National Hurricane Center (NHC), and optionally to its subsidiary and/or related agencies (e.g. TPC).
17. In certain instances, it may be preferable to limit financial activity to only the United States and its territories and possessions.

Other Preferences

In addition to the above preferred characteristics, it is generally preferred that the graphical user interface be used to convey educational information to participants, on an ongoing, developing basis. For example, it is generally preferred that the participants be provided with a rich source of information to inspire further interest in the financial activity and the skills which it sharpens. For example, it is generally preferred that live feeds of various external objective independent information sources be relayed to the participants on an ongoing basis. For example, storm locations and changing intensities, along with their projected path can be displayed on a flat map. This type of data can be obtained from the National Hurricane Center, for example. Other competing predictions from other independent sources could also be displayed, preferably in different colors on a common map.

As storms advance and locations change, it is preferred that calculations of updated current pricing be displayed on an ongoing basis, with any necessary qualifying assumptions being made available to the participants.

Also, it is generally preferred that the current dollars invested for particular geographical areas be displayed along with historical odds or probabilities for the geographical area, thus making it possible for participants and interested observers to determine what the payout will be under the specified conditions, if the storm should develop as predicted. For example, payoffs for a given geographical area can reflect different times of investment, different total amounts of money invested in the overall financial activity, different severity levels or other characteristics of the storm and the probability that the storm will hit the area of interest, based upon historical data and/or near term predictions. It is also generally preferred that the participants and interested observers be able to access a data window showing the current total of funds invested, and a profile of geographical areas with the number of investments being made for that local area.

In general, it is preferred that the financial activity have an educational study component to sharpen a participant's knowledge and skills useful for improving their financial position. This knowledge and skill level will also help the participants cope with the reality of being subjected to potentially harmful storm activity. It is also generally preferred that the financial activity display helpful information to participants, such as checklists of items needed to prepare for an oncoming threatening event. These checklists can help organize participant's activities in the decreasing preparation time available. If desired, checklist information can be solicited from participants and posted in a public viewing area. In another example, a display area can also be provided showing constantly updated damage estimates, threats to life and similar public safety-related information.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims. For example, various communication functions can be grouped into one or more communication units to perform one or more communication tasks.

I claim:

1. A computerized method of offering for purchase, positions predicting a future hurricane landstrike resulting from a substantially continuous ongoing natural process culminating in a future hurricane landstrike, comprising:
    providing a computer graphical user interface having an output for a display that has first and second regions;
    providing a database containing 1) a map of geographical areas corresponding to the positions to be offered for purchase, the geographical areas being at least one of the coastal and the inland type; 2) strike probabilities of future hurricane landstrikes for the geographical areas; 3) offer prices for purchasing positions predicting future hurricane landstrikes in respective geographical areas, that are based at least in part on respective strike probabilities; 4) current level of severity of the continuous ongoing natural process; and 5) the level of severity of the future hurricane landstrike;
    displaying the map in the first region of the graphical user interface with user selectable items corresponding to the geographical areas of the map;
    during the substantially continuous ongoing natural process, electronically obtaining updated data including the location and level of severity of the continuous ongoing natural process culminating in a future hurricane landstrike so as to provide at least part of the basis for electronic calculations of damage probabilities of a future hurricane landstrike for the geographical areas;
    in response to a user selecting a user selectable item and thereby indicating a geographical area for selection, displaying in the second region of the graphical user interface, an offer price, electronically updated in substantially real time so as to be based at least in part on an updated damage probability, for purchasing a position predicting the location and level of severity of a future hurricane landstrike in the indicated geographical area; and providing a payout value for users successfully predicting the location and level of severity of a hurricane landstrike resulting from the substantially continuous ongoing natural process.

2. The method according to claim 1, further comprising, in response to the user selecting the user selectable item, displaying in the second region of the graphical user interface, a strike probability of a future hurricane landstrike for the indicated geographical area.

3. The method according to claim 1, wherein the second region of the graphical user interface displays data in the form of a table.

4. The method according to claim 1, further comprising a third region of said graphical user interface for entry of order data including a designation of the indicated geographical area and the offer price for purchasing a position predicting a future hurricane landstrike in the indicated geographical area.

5. The method according to claim 4, further comprising a fourth region of said graphical user interface for confirming a commitment to purchase a position corresponding to the order data entered.

6. A system for offering purchase positions predicting a future hurricane landstrike resulting from a substantially continuous ongoing natural process culminating in a future hurricane landstrike, comprising:
   a computer interface module for electronically providing a graphical user interface having an output for a display that has first and second regions;
   a database containing 1) a map of geographical areas corresponding to the positions to be offered for purchase, the geographical areas being at least one of the coastal and the inland type; 2) strike probabilities of future hurricane landstrikes for the geographical areas; 3) offer prices for purchasing positions predicting future hurricane landstrikes in respective geographical areas, that are based at least in part on respective strike probabilities; 4) current level of severity of the continuous ongoing natural process; and 5) the level of severity of the future hurricane landstrike;
   the interface module communicating with the database to display the map in the first region of the graphical user interface with user selectable items corresponding to the geographical areas of the map;
   the database further containing electronically updated data obtained during the substantially continuous ongoing natural process, that includes the location and severity of the continuous ongoing natural process culminating in a future hurricane landstrike that provides at least part of the basis for electronic calculations of damage probabilities of a future hurricane landstrike for the geographical areas;
   the interface module, in response to a user selecting a user selectable item and thereby indicating a geographical area for selection, displaying in the second region of the graphical user interface, an offer price, electronically updated in substantially real time so as to be based at least in part on an updated damage probability, for purchasing a position predicting the location and level of severity of a future hurricane landstrike in the indicated geographical area; and
   the interface module providing a payout value for users successfully predicting the location and level of severity of a hurricane landstrike that is proportional to the level of severity of the future hurricane landstrike resulting from the substantially continuous ongoing natural process.

7. The system according to claim 6, wherein the interface module, in response to the user selecting the user selectable item, also displays in the second region of the graphical user interface, a strike probability of a future hurricane landstrike in the indicated geographical area.

8. The system according to claim 7, wherein the second region of the graphical user interface is displayed in the form of a table.

9. The system according to claim 6, wherein the graphical user interface further has a third region for entry of order data including a designation of the indicated geographical area and the offer price for purchasing a position predicting a future hurricane landstrike in the indicated geographical area.

10. The system according to claim 6, wherein the graphical user interface further has a fourth region for confirming a commitment to purchase a position corresponding to the order data entered.

11. An article of manufacture including a machine readable non-transitory tangible medium for causing a computer to perform a computerized method of offering for purchase, positions predicting a future hurricane landstrike resulting from a substantially continuous ongoing natural process culminating in a future hurricane landstrike, comprising:
   providing a computer graphical user interface having an output for a display that has first and second regions;
   providing a database containing 1) a map of geographical areas corresponding to the positions to be offered for purchase, the geographical areas being at least one of the coastal and the inland type; 2) strike probabilities of future hurricane landstrikes for the geographical areas; 3) offer prices for purchasing positions predicting future hurricane landstrikes in respective geographical areas, that are based at least in part on respective strike probabilities; 4) current level of severity of the continuous ongoing natural process; and 5) the level of severity of the future hurricane landstrike;
   displaying the map in the first region of the graphical user interface with user selectable items corresponding to the geographical areas of the map;
   during the substantially continuous ongoing natural process, electronically obtaining updated data including the location and level of severity of the continuous ongoing natural process culminating in a future hurricane landstrike so as to provide at least part of the basis for electronic calculations of damage probabilities of a future hurricane landstrike for the geographical areas;
   in response to a user selecting a user selectable item and thereby indicating a geographical area for selection, displaying in the second region of the graphical user interface, an offer price, electronically updated in substantially real time so as to be based at least in part on an updated damage probability, for purchasing a position predicting the location and level of severity of a future hurricane landstrike in the indicated geographical area; and
   providing a payout value for users successfully predicting the location and level of severity of a hurricane landstrike resulting from the substantially continuous ongoing natural process.

* * * * *